(12) United States Patent
Cossins et al.

(10) Patent No.: US 7,469,247 B2
(45) Date of Patent: Dec. 23, 2008

(54) GEOGRAPHIC MANAGEMENT SYSTEM

(75) Inventors: Robert N. Cossins, Spring Hill, KS (US); Scott A. Evans, Lenexa, KS (US)

(73) Assignee: CeleritasWorks, LLC, Overland Park, KS (US)

( * ) Notice: Subject to any disclaimer, the term of this patent is extended or adjusted under 35 U.S.C. 154(b) by 765 days.

(21) Appl. No.: 10/838,886

(22) Filed: May 3, 2004

(65) Prior Publication Data

US 2005/0004945 A1 Jan. 6, 2005

Related U.S. Application Data

(63) Continuation of application No. 10/004,346, filed on Nov. 1, 2001, which is a continuation-in-part of application No. 09/470,553, filed on Dec. 22, 1999, now Pat. No. 6,343,290.

(51) Int. Cl.
G06F 17/30 (2006.01)
(52) U.S. Cl. .......................... 707/10; 709/223
(58) Field of Classification Search .................... 707/10
See application file for complete search history.

(56) References Cited

U.S. PATENT DOCUMENTS

| | | | |
|---|---|---|---|
| 4,932,022 A | 6/1990 | Keeney et al. |
| 5,095,500 A | 3/1992 | Tayloe et al. |
| 5,285,494 A | 2/1994 | Sprecher et al. |
| 5,451,839 A | 9/1995 | Rappaport et al. |

(Continued)

FOREIGN PATENT DOCUMENTS

EP 0 412 692 2/1991

(Continued)

OTHER PUBLICATIONS

CeleritasWorks, LLC v. WatchMark, Corp., d/b/a WatchMark-Comnitel, Complaint filed Feb. 3, 2004, in the United States District Court for the District of Kansas, 3 pages.

(Continued)

Primary Examiner—Matthew B Smithers
(74) Attorney, Agent, or Firm—Polsinelli Shalton Flanigan Suelthaus PC

(57) ABSTRACT

A geographic management system (GMS) comprises a web server, a database server, and a map server. A user browser connected to the GMS transmits a search criteria to the web server. The web server transmits the search criteria to the map server. The map server geocodes the search criteria, obtains network data and geospatial data from the database server corresponding to the geocode, and transmits the geocode, the network data, and the geospatial data to the web server. The web server transmits the geocode, the network data, and the geospatial data to the user browser. The network data and the geospatial data are displayed on the user browser as a map displaying network elements of a telecommunication network relative to other network elements, geographic elements, and customers. One or more of the network elements have associated performance elements or sectored performance elements that display performance characteristics or sectored performance characteristics that signify performance attributes associated with the network element. The user browser can navigate through other network data and geospatial data by selecting network elements on the map or by selecting navigation tools or navigation tabs displayed in conjunction with the map.

51 Claims, 49 Drawing Sheets

U.S. PATENT DOCUMENTS

| | | | |
|---|---|---|---|
| 5,488,715 A | | 1/1996 | Wainwright |
| 5,490,285 A | | 2/1996 | Ahlenius et al. |
| 5,610,839 A | | 3/1997 | Karolak et al. |
| 5,712,899 A | | 1/1998 | Pace |
| 5,726,979 A | | 3/1998 | Henderson et al. |
| 5,742,762 A | | 4/1998 | Scholl et al. |
| 5,761,429 A | | 6/1998 | Thompson |
| 5,774,689 A | | 6/1998 | Curtis et al. |
| 5,796,951 A | | 8/1998 | Hamner et al. |
| 5,799,154 A | | 8/1998 | Kuriyan |
| 5,812,750 A | | 9/1998 | Dev et al. |
| 5,848,373 A | | 12/1998 | Delorme et al. |
| 5,870,558 A | | 2/1999 | Branton, Jr. et al. |
| 5,884,147 A | | 3/1999 | Reudink et al. |
| 5,909,217 A | | 6/1999 | Bereiter |
| 5,920,257 A | | 7/1999 | Commerford |
| 5,930,474 A | | 7/1999 | Dunworth et al. |
| 5,946,687 A | | 8/1999 | Gehani et al. |
| 5,960,439 A | * | 9/1999 | Hamner et al. .......... 707/103 R |
| 5,966,135 A | | 10/1999 | Roy et al. |
| 5,990,886 A | | 11/1999 | Serdy et al. |
| 5,991,690 A | | 11/1999 | Murphy |
| 6,006,161 A | | 12/1999 | Katou |
| 6,049,827 A | * | 4/2000 | Sugauchi et al. ............ 709/223 |
| 6,091,956 A | | 7/2000 | Hollenberg |
| 6,151,309 A | | 11/2000 | Busuioc et al. |
| 6,266,529 B1 | | 7/2001 | Chheda |
| 6,266,615 B1 | | 7/2001 | Jin |
| 6,330,008 B1 | | 12/2001 | Razdow et al. |
| 6,343,290 B1 | | 1/2002 | Cossins et al. |
| 6,587,787 B1 | | 7/2003 | Yokota |
| 6,625,132 B1 | | 9/2003 | Boettger et al. |
| 6,681,231 B1 | * | 1/2004 | Burnett .................... 707/104.1 |
| 7,107,286 B2 | * | 9/2006 | Burnett .................... 707/104.1 |
| 7,142,820 B1 | * | 11/2006 | Rajala ........................ 455/67.7 |
| 7,243,054 B2 | * | 7/2007 | Rappaport et al. ............. 703/2 |
| 2002/0152303 A1 | | 10/2002 | Dispensa |
| 2004/0260720 A1 | | 12/2004 | Cossins et al. |
| 2005/0004944 A1 | | 1/2005 | Cossins et al. |

FOREIGN PATENT DOCUMENTS

| | | |
|---|---|---|
| EP | 0 614 151 | 9/1994 |
| JP | 8-87234 | 4/1996 |
| WO | WO 99 15950 | 4/1999 |
| WO | WO 99 15976 | 4/1999 |
| WO | WO 99 16207 | 4/1999 |
| WO | WO 99/20034 | 4/1999 |
| WO | WO 99/20034-2 | 4/1999 |

OTHER PUBLICATIONS

*CeleritasWorks, LLC* v. *WatchMark, Corp., d/b/a WatchMark-Comnitel*, Answer, Affirmative Defenses and Counterclaims filed Jul. 21, 2004, in the United States District Court for the District of Kansas, 7 pages.

*CeleritasWorks, LLC* v. *WatchMark, Corp., d/b/a WatchMark-Comnitel*, Answer to Defendant WatchMark Corp.'s Counterclaim filed Aug. 10, 2004, in the United States District Court for the District of Kansas, 3 pages.

*CeleritasWorks, LLC* v. *WatchMark, Corp., d/b/a WatchMark-Comnitel*, Stipulation of Dismissal with Prejudice and Without Costs, filed in the United States District Court for the District of Kansas, 2 pages.

International Search Report, dated Jul. 26, 2002, PCT/US00/34500, Geographic Network Management System, 13 pages.

Written Opinion, dated Jan. 8, 2002, PCT/US00/34500, Geographic Network Management System, 2 pages.

International Preliminary Examination Report, dated Feb. 10, 2002, PCT/US00/34500, Geographic Network Management System, 3 pages.

International Search Report, dated Dec. 10, 2002, PCT/US02/34610, Geographic Management System, 5 pages.

International Preliminary Examination Report, dated Nov. 18, 2003, PCT/US02/34610, Geographic Management System, 10 pages.

Official Communication from European Patent Office, dated May 7, 2006, Application No. 03 000689.4, Geographic Network Management System, 3 pages.

Official Communication from European Patent Office, dated May 7, 2006, Application No. 00 992 114.9, Geographic Network Management System, 6 pages.

Hildebrandt et al., *Dynamic Geospatial Image Mosaics Using JAVA, JAI, RMI and COBRA*, IEEE, Nov. 1999, pp. 254-264.

Stojanovic et al., *GeoTT Geographic Information System Support for Telecommunication Network Planning and Design*, IEEE, Oct. 13, 1999, pp. 548-551.

*US West ISG Launches WatchMark, a New Wireless Network Management Suite*, Press Release, US West International Systems Group, United States of America, Feb. 23, 1998, pp. 1-5.

Official Communication from European Patent Office, dated Feb. 27, 2008, Application No. 00 992 114.9, Geographic Network Management System, 8 pages.

\* cited by examiner

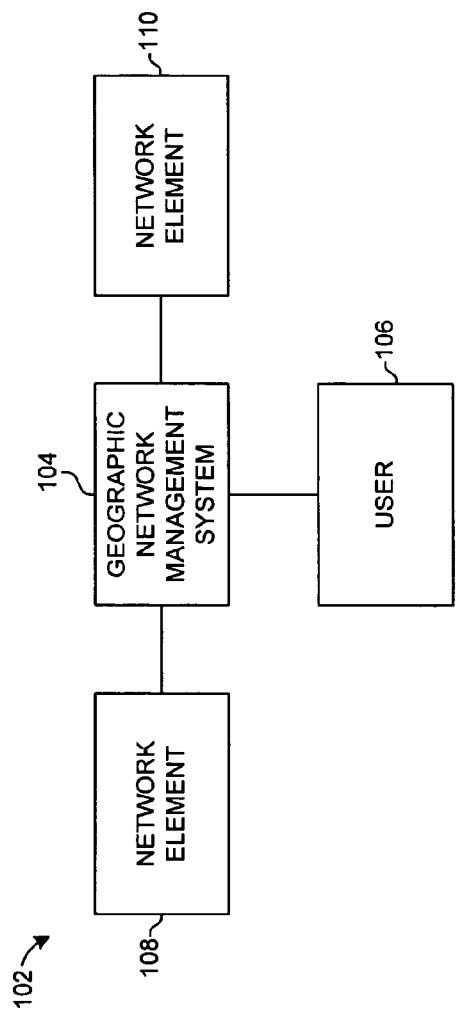
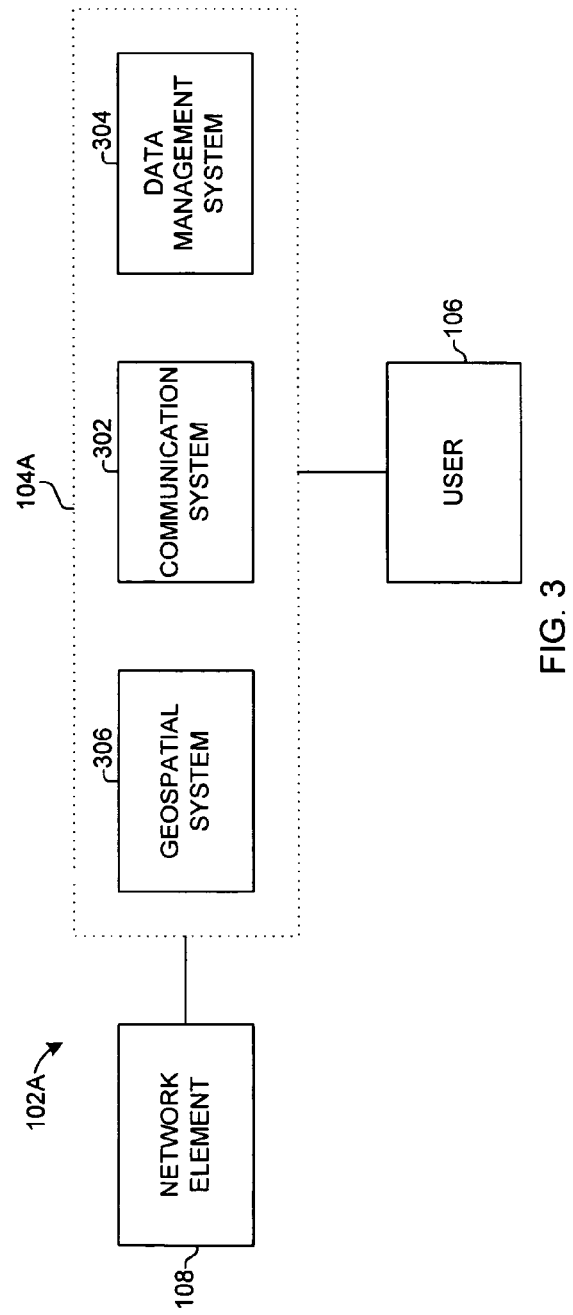

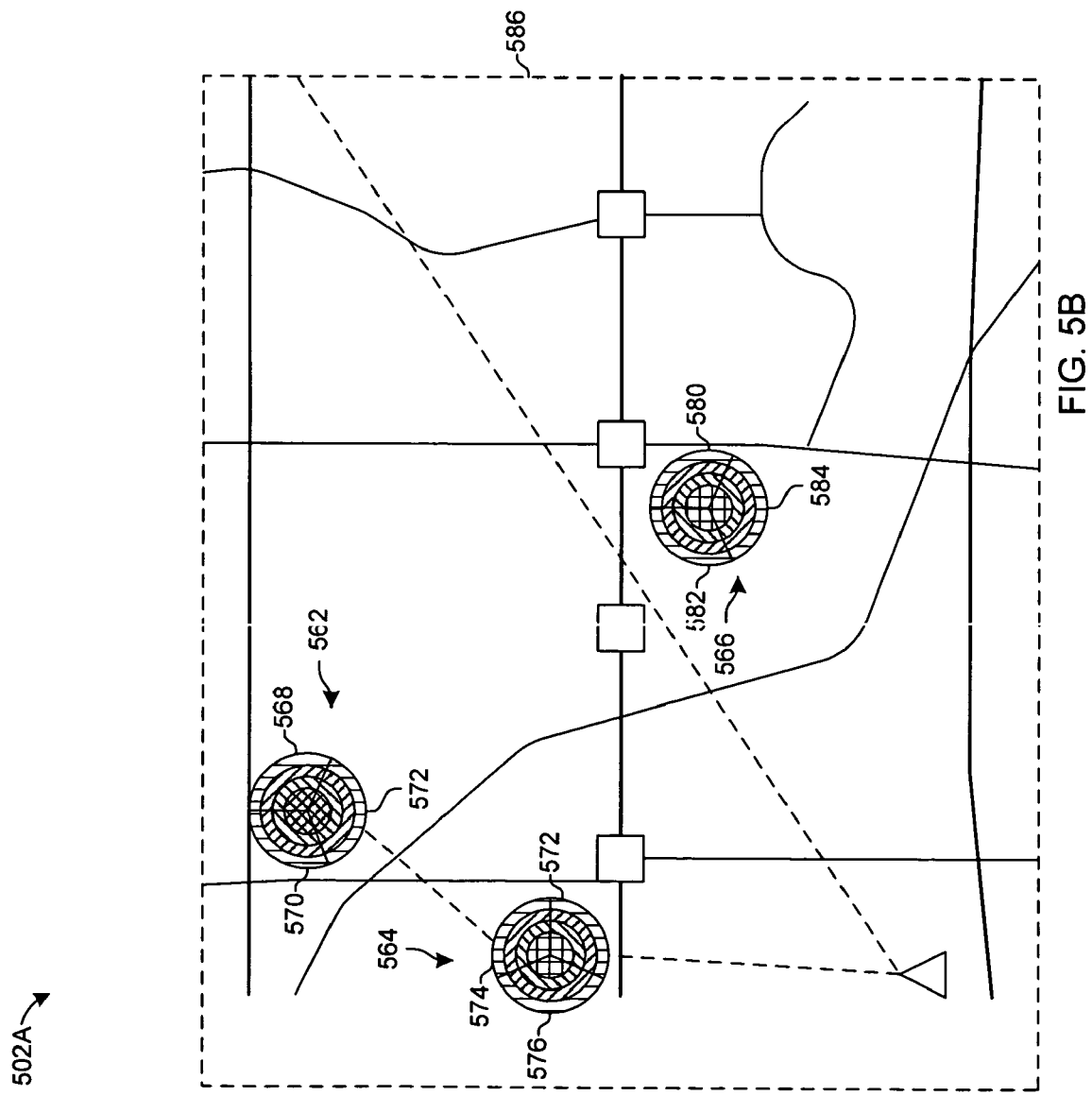

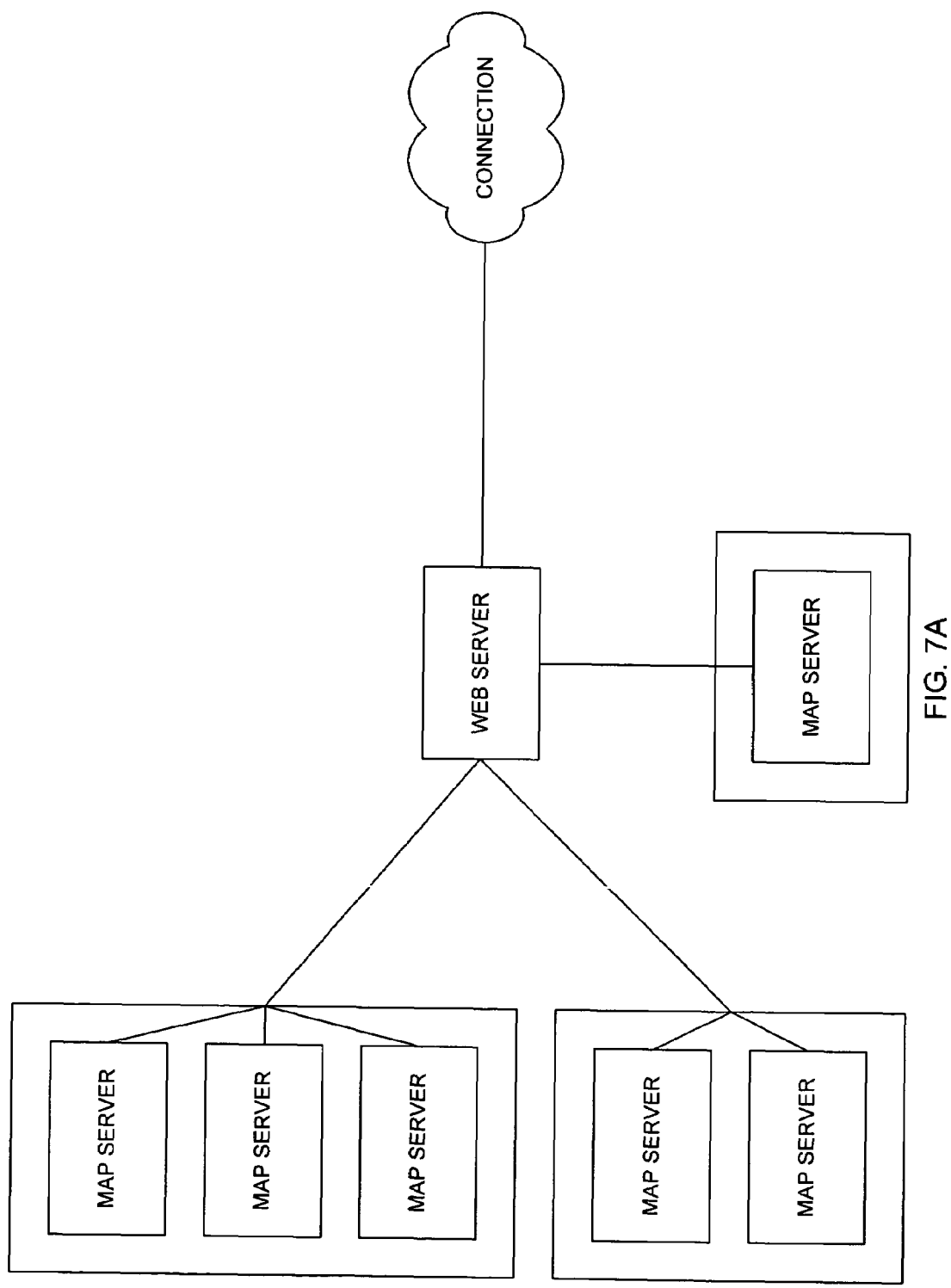

FIG. 27

SpatialObjects Trouble Ticket Entry Utility

Ticket ID: 2692
Cross Street 1: 87th and Antioch
Cross Street 2:
City: lenexa
State: KS
Zip:
Ticket Type: FAST BUSY
Customer Email: me@yourcomp.com

[Geocode Ticket]

Geocode Results

Ticket ID: 2692
Latitude: 38.963539
Longitude: -94.78846
Coverage Attributes: Unknown
Trouble Area Attributes: No
Other tickets at this location?: No
Neighboring Cell Count: 1
Neighboring Ticket Count: 0
Search Radius: 5

[Commit Ticket]

GEOGRAPHIC MANAGEMENT SYSTEM

RELATED APPLICATIONS

This application is a continuation of U.S. patent application Ser. No. 10/004,346, filed on Nov. 1, 2001, entitled Geographic Management System which was a continuation-in-part of U.S. patent application Ser. No. 09/470,553, filed on Dec. 22, 1999, entitled Geographic Network Management System, now U.S. Pat. No. 6,343,290, all of which are incorporated fully herein.

FEDERALLY SPONSORED RESEARCH OR DEVELOPMENT

Not Applicable

COMPACT DISK APPENDIX

Not Applicable

BACKGROUND OF THE INVENTION

The present invention relates to the field of network configuration and management using geographic data and network data.

Managing wireline and wireless networks has become increasingly difficult. Service providers now connect calls for digital wireless communications and/or analog wireless communications ("wireless communications") and/or wireline communications. The service providers must provide expansive coverage, adequate capacity, high reliability, and quality customer service to be competitive in the market and to meet consumer needs. As used herein, the terms "customer" and "consumer" are used synonymously to mean a subscriber of a telecommunication service from a telecommunication service provider. An example of a customer is a person or a company subscribing to (i.e. purchasing) wireless telephone service from a wireless telephone service provider. Therefore, a system is needed to view, configure, and manage wireline and wireless networks and to provide network data to a user of the system in a context that makes the network data useful and efficient for viewing, configuration, and management.

SUMMARY OF THE INVENTION

A time series viewer is operable using a processor and is configured to generate a plurality of time sequenced maps to depict a performance of a system over a selectable time period. In one embodiment, each time sequenced map includes a plurality of geographic elements, a plurality of network elements in relation to the geographic elements, and a plurality of performance elements, each corresponding to at least one network element and each having a performance characteristic for a corresponding performance attribute. Each time sequenced map corresponds to a specific point in time within the selectable time period. Each performance characteristic of each performance element generated for the time sequenced map at the specific point in time corresponds to the corresponding performance attribute at the specific point in time.

BRIEF DESCRIPTION OF THE DRAWINGS

FIG. 1 is a block diagram of a geographic management system in accordance with an embodiment of the present invention.

FIG. 3 is a block diagram of an expanded geographic management system in accordance with an embodiment of the present invention.

FIG. 5B is a diagram of network elements, geographic elements, and sectored performance elements in a telecommunication system for a screen display in accordance with an embodiment of the present invention.

FIG. 7A is a block diagram of an orientation of a geographic management system in accordance with an embodiment of the present invention.

FIG. 27 is a screen view of a screen in accordance with an embodiment of the present invention.

FIG. 28 is a screen view of a screen in accordance with an embodiment of the present invention.

FIG. 29 is a screen view of a screen in accordance with an embodiment of the present invention.

FIG. 36 is a screen view of a screen in accordance with an embodiment of the present invention.

FIG. 41 is a screen view of a screen in accordance with an embodiment of the present invention.

FIG. 44 is a screen view of a screen in accordance with an embodiment of the present invention.

DETAILED DESCRIPTION

Figure 2:
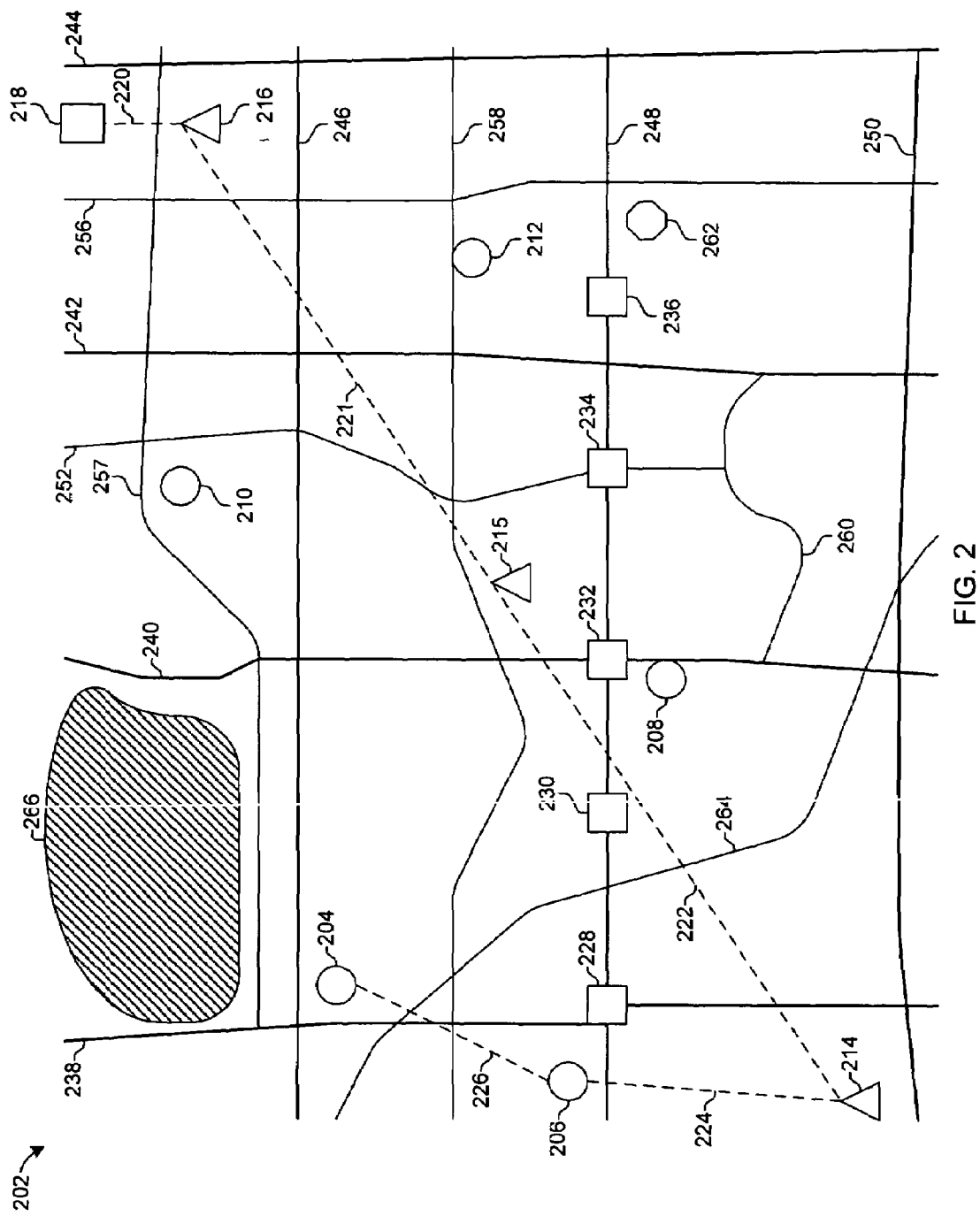
FIG. 2 is a diagram of network elements and geographic elements in a telecommunication system in accordance with an embodiment of the present invention.

The present invention provides a system for managing one or more networks. As used herein, the term "network" may identify one or more different types of geographic areas in which one or more types of data are to be depicted. For example, a network may include an oil or gas industry network configured to identify one or more oil wells. Also, a network may include a communication network or a store network.

The present invention may be configured to manage networks using network data and geospatial data to provide a geographical representation of a network through a graphical interface for a user. The system is used to view, monitor, configure, and manage networks. As used herein, network data comprises performance data, equipment data, performance data, including trouble ticket data, event data, alarm data, customer service data, and/or configuration data for calls, for network elements, and/or for performance elements.

A trouble ticket is an entry of data for a reported problem in service. For example, a customer may call customer service of a service provider to report that the customer's call has been dropped. The customer service user then enters data regarding the customer or the call, including the geographic location of the customer and the call and the service problem, such as a trouble ticket. Service problems may include, among others, blocked calls, dropped calls, fast busy, unspecified, or others. As used herein, geospatial data comprises geographic data and/or spatial data. Geographic data includes location data comprising data identifying latitude, longitude, addresses, city, state, county, streets, street crossings, and/or other location data. Spatial data comprises data of or representing geographic elements, including streets or highways, streams, lakes, other bodies of water, parks, mountains, terrain, land marks, structures, and/or other geographic identification data, including image data and/or text data.

The present invention can be used to display network elements, with or without performance elements, relative to each other, relative to customers, and relative to geographic elements. This allows users of the invention to provide factual, data-based feedback to customers. For example, a user can inform a customer that a cell site is not operational or that trouble areas are existent and known and when the service will be restored.

FIG. 1 illustrates an exemplary embodiment of the management system 102 of the present invention. The management system 102 comprises a geographic management system (GMS) 104 communicating with a user 106 and one or more network elements 108 and 110.

The GMS 104 receives and stores network data. Typically, the GMS 104 has geospatial data or can receive and store geospatial data. The GMS 104 organizes the network data and the geospatial data to be output to a user, when needed, in a context that allows the user readily to view, monitor, configure, and manage the network data and the network elements. The GMS 104 generates data for display of network data with relation to the geospatial data to illustrate the physical locations of network elements and associated performance elements, geographic elements, and customers in a telecommunication system, configures network data and geospatial data for respective network elements and geographic elements in a telecommunication system, configures performance parameters and operational parameters and components associated with network elements, and manages network data and performance and operational parameters and components associated with network elements.

In addition to providing configuration of network elements, the GMS 104 tracks and manages trouble tickets, trouble areas, and performance of network elements for a telecommunication network. A user of the GMS 104 may enter trouble tickets for problems reported by customers. The user also may select one or more trouble tickets to close when the problem is resolved. The GMS 104 can be configured to transmit explanations of problem resolutions to customers by, for example, an email, a text pager, an automated voice response, a voice mail, or other transmission mechanisms. This notification serves to build customer loyalty.

The GMS 104 automatically creates customer defined "trouble areas" when a new trouble ticket is created within a specified range of a specified number of other trouble tickets. The range and the number can be defined by a user or pre-set. In addition, the GMS 104 allows entry of an engineer defined or user defined trouble area. The engineer defined/user defined trouble area is a known trouble area whose problem, parameters, and perimeters are defined and described by an engineer or another user. A script describing the problem of the trouble area or the anticipated resolution of the problem may be entered by an engineer or another user. If a new trouble ticket is entered for the trouble area, the script will be displayed to the user so the resolution explanation can be relayed to the customer. The defined trouble area is depicted on a geographic display to the user.

The user 106 is hardware or software that communicates with the GMS 104. The user 106 transmits and receives network data and geospatial data to and from the GMS 104. The user 106 has a display that displays the network data and the geospatial data in a graphical display. Therefore, the user 106 displays the network elements and other network data, including trouble tickets, the geographic elements, and any defined areas, such as customer defined trouble areas or known engineer defined trouble areas.

The network elements 108 and 110 comprise a cell site, an element of a cell site, such as an antenna, a base transceiver, or a switch, such as a local exchange carrier (LEC) switch, an interexchange carrier (IXC) switch, or a tandem switch, a wireline circuit, a wireless circuit, a phone, a service platform, a legacy based information system, a network data supplier, or any other device or medium capable of transmitting or receiving communications or signaling, including network data and geospatial data, to or from the GMS 104. A service platform can be, for example, a computer platform capable of processing calls. Examples of service platforms include operator services platforms, directory assistance platforms, prepaid call processing platforms, voice mail platforms, and digital service unit platforms.

FIG. 2 illustrates an exemplary embodiment of a telecommunication system 202 having network elements and geographic elements with network data and geospatial data for which network elements may be viewed, monitored, configured, and managed. FIG. 2 illustrates network elements relative to their respective physical locations and relative to geographic elements and customers in a geographic location of a telecommunication network 202. The telecommunication network 202 of FIG. 2 comprises cell sites 204-212, switches 214-216, another network element 218, wireline circuits 220-224, and a wireless circuit 226. Trouble tickets 228-236 are depicted relative to the telecommunication network 202 with its network elements 204-226 and relative to geographic elements in a geographic location of the telecommunication network, such as major roads 238-250, minor or other roads 252-260, a land mark 262, a stream 264, and a park 266. For simplicity, not all network elements capable of being in the telecommunication network 202 are depicted in FIG. 2. Those skilled in the art will appreciate that different network elements, more network elements, or fewer network elements may be included in the telecommunication network. Likewise, not all geographic elements capable of being in a geographic location of the telecommunication network 202 are depicted in FIG. 2. Those skilled in the art will appreciate that different geographic elements, more geographic elements, or fewer geographic elements may be included in the geographic location.

The management system 102 of FIG. 1 operates as follows. A user 106 connects to the GMS 104 and logs into the GMS. The user 106 may enter a search criteria, such as a base transceiver station (BTS) event, an address, an intersection, a trouble ticket, a major trading area, or a cell site, to obtain a map display of an area or a telecommunication network. The map is generated by the GMS 104 and includes an identification of the network elements, such as cell sites, other network data, such as trouble ticket data, and geographic elements, such as streets and streams within a search range. The user 106 may select one of the network elements, such as a cell site or a trouble ticket. This action will initiate a process to populate network data for the selected cell or trouble ticket.

Based upon the search criteria entered by the user and the selection on the generated map, network data is output for one or more of a cell and cell status, a trouble ticket and trouble ticket problem type, cell site information, specific trouble ticket data, event and alarm data for cell sites and trouble tickets, and network statistics. In addition, the user 106 has the ability to identify and specify high traffic or high trouble areas.

The user can use the display as a mechanism to enter configuration information for the selected network element or for a new network element. Other capabilities and embodiments of the GMS 104 are described more fully below.

FIG. 3 illustrates an exemplary embodiment of a GMS 104A in a management system 102A of the present invention. The GMS 104A comprises a communication system 302, a data management system 304, and a geospatial system 306. The GMS 104A is in communication with the user 106 and the network element 108. The term "system" means software and/or hardware that may be implemented as one or more components. Thus, the communication system 302, the data management system 304, and the geospatial system 306 represent logical components that are scalable and that may be implemented as software and/or hardware individually, as a single component, or as multiple components.

The communication system 302 receives and processes communications, such as queries and data, from the data management system 304 and the geospatial system 306. The communication system 302 transmits communications, such as queries and data, to the data management system 304 and the geospatial system 306. The communication system 302 receives images and text information of geospatial data from the geospatial system 306 and receives network data from the data management system 304.

The communication system 302 transmits communications to, and receives communications from, the user 106. The communications include data and/or signaling. The communication system 302 may obtain the data or signaling from the data management system 304 and/or the geospatial system 306. The communication system 302 processes communications received from the user 106, including network data for network element configuration and management and other data, and, if necessary, communicates the processed network data to the data management system 304 or the geospatial system 306. The communication system 302 materializes a graphical interface to the user 106.

The data management system 304 receives and processes communications, such as queries and data, from the communication system 302 and the geospatial system 306. The data management system 304 transmits communications, such as queries and data, to the communication system 302 and the geospatial system 306. The data management system 304 retrieves data from, or stores data in, an associated database (not shown).

The geospatial system 306 receives and processes communications, including queries and data, from the communication system 302 and the data management system 304. The geospatial system 306 transmits communications, including queries and data, to the communication system 302 and the data management system 304. The geospatial system 306 communicates with the data management system 304 to obtain geospatial data. The geospatial system 306 identifies and generates a geocode, such as a latitude and longitude, for a search criteria, identifies network elements and any associated performance elements and geographic elements located within a search range of the search criteria, and generates images and text representing the identified network elements, any associated performance elements, and the identified geographic elements. The images and/or the text are displayed as a map.

As used herein, generating a map also can be construed to mean generating data and/or signaling to be used by the user 106 to display a map, depending on context. Likewise, generating geospatial data, network data, or geographic data also can be construed to mean generating data to be used by the user 106 to display the geospatial data, network data, or geographic data, depending on context. Similarly generating network elements, performance elements, geographic elements, or data thereof, display elements, or display characteristics also can be construed to mean generating data and/or signaling to be used by the user 106 to display the network elements, performance elements, geographic elements, or data thereof, display elements, or display characteristics, depending on context. Thus, generating any data also means generating data and/or signaling to be used by the user 106 to display representations of the data, depending on context. The term transmitting and other like terms used to describe any communication transmitted or received by any element or component of a telecommunication system, including the GMS, is used in a similar manner herein.

The GMS 104A of FIG. 3 operates as follows. The user 106 transmits a search criteria to the communication system 302 in a communication. The communication system 302 processes the search criteria and transmits the search criteria to the geospatial system 306. The geospatial system 306 geocodes the search criteria, obtains network data and geospatial data from the data management system 304 corresponding to the geocode, and transmits the geocode, the network data, and the geospatial data to the communication system 302. The communication system 302 transmits the geocode, the network data, and the geospatial data to the user 106. The network data and the geospatial data are displayed for the user 106 as a map displaying network elements of a telecommunication network relative to other network elements, geographic elements, and customers. The network elements may have associated performance elements, as described more fully below. The map also displays coverage areas, trouble areas, and layers of network data, including the display characteristics for network elements, performance elements, and geographic elements.

The user 106 navigates through other network data and geospatial data by selecting network elements on the displayed map or by using navigation tools. Additional communications are sent to the communication system 302 identifying the selections. The communication system 302 processes the communications, obtains network data and geospatial data from the geospatial system 306 or the data management system 304 and transmits the network data and the geospatial data to the user 106. In addition, the user can enter network data to configure parameters or components of network elements. This network data is transmitted in a communication to the communication system 302 for implementation and/or storage by the data management system 304. The network data and the geospatial data include, for example, performance data, statistical data, event data, configuration data, management data, geocode data, geographic data, and other data. In this manner, the user 106 can view, monitor, manage, and configure network data for network elements.

Figure 4:
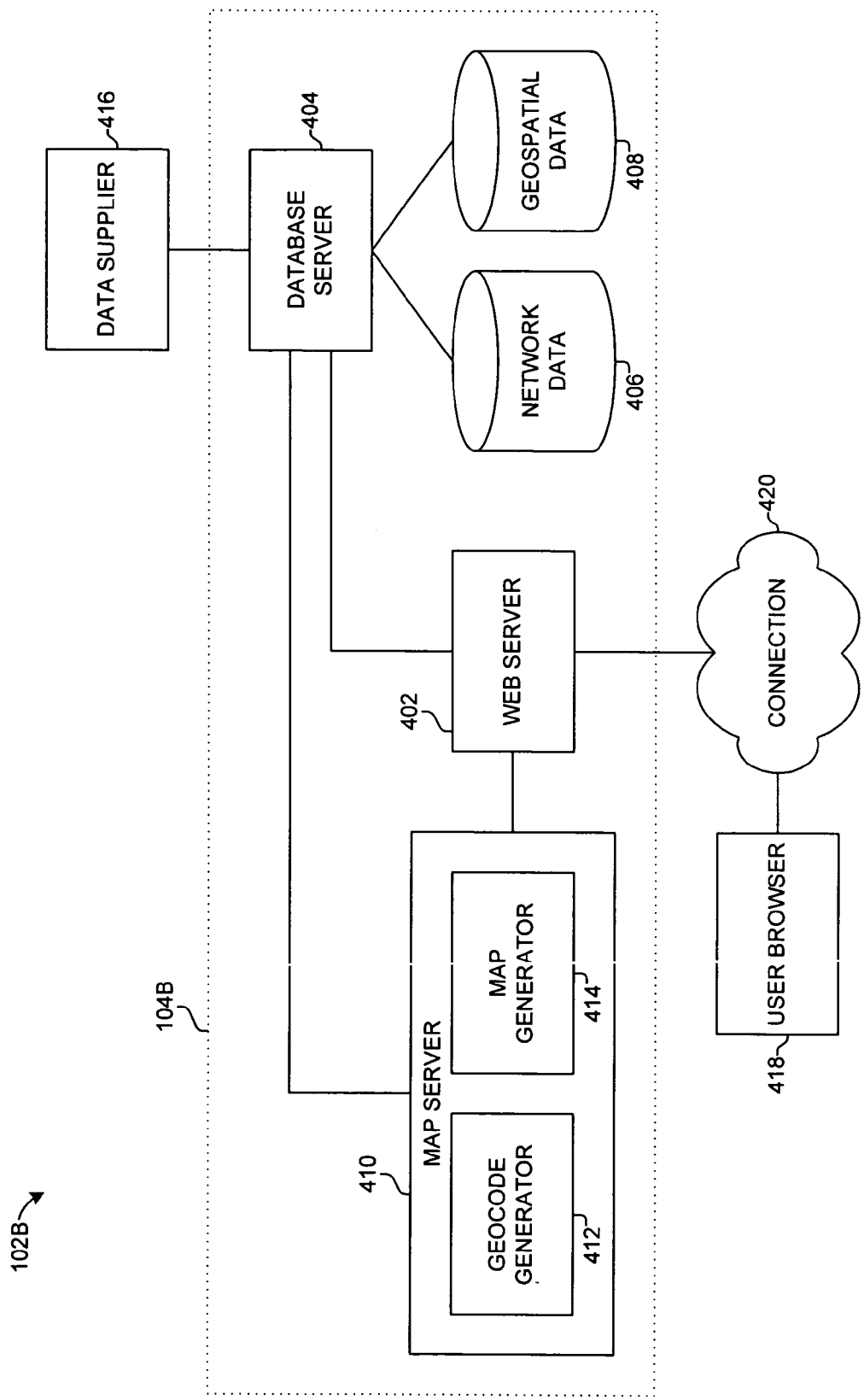
FIG. 4 is a block diagram of an expanded geographic management system in accordance with an embodiment of the present invention.

FIG. 4 illustrates an exemplary embodiment of a GMS 104B of the present invention. The GMS 104B comprises a web server 402, a database server 404, a network data database 406, a geospatial data database 408, a map server 410, a geocode generator 412, and a map generator 414. The GMS 104B communicates with a network element, such as a data supplier 416, via a connection or link and a user browser 418 via a connection or link, such as an internet protocol (IP) connection 420. The term "server" means software and/or hardware that may be implemented as one or more components. Thus, the web server 402, the database server 404, and the map server 410 represent logical components that are scalable and that may be implemented as software and/or hardware individually, as a single component, or as multiple components.

The web server 402 transmits and receives communications, including network data, geospatial data, and other data, to and from the user browser 418 and processes communications. The web server 402 communicates with the user browser in any applicable format or protocol. The web server 402 materializes a graphical interface, such as the graphical interface described below, to the user browser 418.

Preferably, the web server 402 is configured to communicate with the user browser 418 using pages. A page may comprise one or more of portions of code, programming, data, or other elements using any web based technology. For example, a page can be generated using hypertext markup language (HTML), dynamic HTML (DHTML), Java, and/or Java Script. In this configuration, the web server 402 receives pages from the user browser 418 and transmits pages to the user browser. The pages may contain network data, geospatial data, or other data. Pages received by the web server 402 may contain search criteria, queries, data entry, including network data or geospatial data, and other data. Other configurations of pages may be used.

The web server 402 also communicates with the database server 404 and the map server 410. The web server 402 processes communications received from the user browser 418 and transmits data received from the user browser 418 to the database server 404 or the map server 410. The web server 402 receives geospatial data, including images and text list information, from the map server 410 and receives network data from the database server 404.

The database server 404 receives and processes communications, such as queries and data, from the web server 402 and the map server 410. The database server 404 also transmits communications, including network data and geospatial data, to the web server 402 and the map server 410. The database server 404 receives and stores network data and geospatial data in, or retrieves and transmits network data and geospatial data from, the network data database 406 and the geospatial data database 408.

The database server 404 also receives data, including geospatial data and network data, from network elements, such as the data supplier 416. The database server 404 stores the data in the network data database 406 or the geospatial data database 408.

In some configurations, the database server 404 is configured to receive data from the data supplier 416 in a documented format so that the data can be stored directly in the network data database 406 or the geospatial data database 408 by the database server without the database server having to specially format the data. Examples of a documented format include a flat file or a documented format from a message bus or another source. Other documented formats may be used. In other configurations, the database server 404 is configured to receive raw data, to process the raw data to a storage format, and to store the formatted data in the network data database 406 or the geospatial data database 408. The database server 404 can be configured with an application interface to facilitate communication between the database server 404 and the data supplier 416, if needed.

The network data database 406 is a collection of network data stored in volatile or nonvolatile memory and structured and organized for efficient access. This may include one or more related databases. Volatile or nonvolatile memory may include disk storage, persistent storage, random access memory, and other accessible memory.

The geospatial data database 408 is a collection of geospatial data stored in volatile or nonvolatile memory and structured and organized for efficient access. This may include one or more related databases. Volatile or nonvolatile memory may include disk storage, persistent storage, random access memory, and other accessible memory.

The map server 410 receives and processes communications, such as queries and data, from the web server 402 and the database server 404. The map server 410 transmits communications, such as queries and data, to the web server 402 and the database server 404. The map server 410 communicates with the database server 404 to obtain geospatial data and network data. The map server 410 communicates processed geospatial data and network data to the web server 402.

The geocode generator 412 identifies and generates a geocode, such as a latitude and a longitude, based on a search criteria. Alternately, the geocode generator 412 can be configured to identify and generate other geocodes, such as a location identifier that designates a geographic location, based on a search criteria. Examples of other location identifiers are latitude and longitude coordinates, north, south, east, west, up, down, left, right, vertical and horizontal coordinates, North American data (NAD) 27, NAD 83, axial coordinates, other ordinate systems, positioning indicators, and mark identifiers.

The map generator 414 identifies network elements and geographic elements located within a search range of a geocode and generates a map having images and/or text representing the identified network elements, including any associated performance elements, and the identified geographic elements. The map may display multiple layers of network data, including trouble tickets, network trouble areas, network alarms, network performance, switch configuration, coverage levels, cell locations, and future cell sites in their proper geographic location. Other layers may exist that may be used to understand the network data and the geographic data.

For example, the map generator 414 may generate a map having components such as those depicted in FIG. 2, as well as other data, or the map of FIG. 5A described more fully below. The map may have network data and/or geospatial data that identifies customers (e.g. by trouble tickets) in a telecommunication network relative to network elements, including any associated performance elements, geographic elements, and/or geographic locations. The map generator 414 generates a map based a navigation criteria, such as a selection of pan, zoom, or movement of a map in a direction. Direction may be specified in any form including north, south, east, west, up, down, left, right, vertical and horizontal coordinates, latitude and longitude coordinates, NAD 27, NAD 83, in axial coordinates, or in another ordinate system. Another example of a generated map is the map of FIG. 5A, as described more fully below.

The data supplier 416 communicates network data to the GMS 104B. The data supplier 416 also may be configured to communicate geospatial data to the GMS 104B. The data supplier 416 may be a single system, a system with subsystems, or a multi-system or multi-component system having software and/or hardware. For example, the data supplier 120 may include a system that collects network statistics or data for network events, a system that catalogues network events, a trouble management system that tracks customer service data, or any system that collects or has network data or geospatial data. The data supplier 120 may include a proprietary computer from a telecommunication service provider, such as a wireless telephone service provider.

The user browser 418 is any software or hardware that can be used to navigate and access data. Preferably, a browser is a tool used to navigate and access web based information. In one example, the browser is an IP based browser that may use the hypertext transfer protocol (HTTP) to communicate with IP based systems over a connection or link. HTTP is a protocol for transferring pages or other documents from a processor to a browser across an intranet or internet. Preferably, the user browser 418 is an IP based browser that communicates with the web server 402 and provides the ability to access and transfer network data and geospatial data via pages. Examples of browsers include the Microsoft Internet Explorer brand browser and the Netscape Navigator brand browser.

A user uses the user browser 418 to view network data and geospatial data. A user navigates through network data and geospatial data and selects network elements to "drill down", i.e. to navigate, to another screen or to display another portion of a screen having other information for the selected network element or data. For example, a user may select a cell site on a display to see the status of the cell site.

A user may enter configuration data for network elements via the user browser 418. The configuration data is transmitted in a communication to the web server 402 and saved in the GMS 104B for implementation. For example, the user may enter configuration data for a parameter of a network element or a component of the network element. In this manner, a user may configure parameters or components for switches, cell sites, or other network elements, provision wireline and wireless circuits, and provide other configuration.

The connection 420 is any connection supporting transmission of communications between the web server 402 and the user browser 418. Preferably, the connection 420 is an IP connection.

As used herein, generating a map also can be construed to mean generating data and/or signaling to be used by the user browser 418 to display a map, depending on context. Likewise, generating geospatial data, network data, or geographic data also can be construed to mean generating data to be used by the user browser 418 to display the geospatial data, network data, or geographic data, depending on context. Similarly generating network elements, performance elements, geographic elements, or data thereof, display elements, or display characteristics also can be construed to mean generating data and/or signaling to be used by the user browser 418 to display the network elements, performance elements, geographic elements, or data thereof, display elements, or display characteristics, depending on context. Thus, generating any data also means generating data and/or signaling to be used by the user browser 418 to display the data or representations of the data, depending on context. The term transmitting and other like terms used to describe any communication transmitted or received by any element or component of a telecommunication system, including the GMS, is used in a similar manner herein.

Each of the embodiments of the GMS described herein combines functionalities for defining and enabling data layers for viewing, configuration, and management of data with a presentation of service coverage data and network data. These functionalities provide a user the ability to access significant amounts of data for easy viewing and to drill down to more levels of data and more detailed data.

The data layers are levels of network data and/or geographic data. The data layers, when enabled, build on each other to present data in a manner analogous to transparencies each having a portion of data that builds on other data to present a more complete view of the data. One or more of the data layers can enabled or disabled to display, configure, and manage selected data on a user-by-user basis. For example, several data layers may be used to present network data for network elements to an engineer, and other data layers may be used to present other network data to a customer service person.

The data layers present network data in a context of geographic data for comparative analysis. This type of comparative analysis and presentation of network data in a geographic context allows a user to more easily understand the data and more quickly view large amounts of data.

Some of the network data and some of the geographic data are displayed as one or more display elements, including a network element, a performance element, or a geographic element. When displayed on a display, each of the network element, the performance element, and the geographic element has at least one display characteristic. The display characteristics are colors, patterns, shapes, text, symbols, or other characteristics that serve to distinguish levels of coverage, performance, network events, configured parameters, configured components, other network data, or geographic data for a network element or a geographic element. The display characteristic may be user-configurable in certain instances, as described more fully below.

The display characteristics for the performance elements are referred to as performance characteristics. The performance characteristics for the performance elements are displayed if performance attributes occur for performance levels. Some performance levels are user configurable, while other performance levels are pre-configured. Each of these concepts are described more fully below.

The display characteristics for the network elements are referred to as event characteristics. The event characteristics for the network elements are displayed if event attributes or performance attributes occur for event levels. Some event levels are user configurable, while other event levels are pre-configured. Each of these concepts are described more fully below.

The display characteristics for the geographic elements are referred to as geographic characteristics. Various geographic characteristics are displayed for geographic elements, such as color, size, and shape.

Data layers may be associated with different network elements. Data layers that are associated with cell sites may include, among others, a network element layer, an alarm layer, and a performance layer. Other layers associated with network data or with geographic data are described more fully below.

The network element layer displays network elements in one of two display characteristics, such as colors or patterns, depending on the status of the network element, event attributes, and performance attributes. For example, one color or pattern can indicate a healthy network element, and a second color or pattern can indicate a warning condition, a critical condition, or other condition for the network element. In another example, a cell can be displayed with a first display characteristic, such as a green color, to signify the cell site is on-air or displayed with a second display characteristic, such as a gray color, to signify that the cell site is a future cell site. Other display elements or display characteristics may be used.

An alarm layer displays network elements with multiple varied display characteristics, such as multiple colors or patterns, to indicate varied event attributes, events, event levels, degrees of event levels, or performance attributes for a network element. For example, a cell can be displayed with a display characteristic, such as a green color, to signify the cell site is not in a warning state or an alarm state, with a second display characteristic, such as a yellow color, to signify that the displayed cell site is in a warning state, and with a third display characteristic, such as a red color, to signify that the displayed cell site is in an alarm state. Other display elements or display characteristics may be used. The display characteristics for the network elements are referred to as event characteristics.

A performance layer displays network elements with associated performance elements. This allows a user to view, for example, an alarm status of a network element and/or a performance status of the network element at the same time. Alternately, the performance layer can be configured to display only the performance elements.

A network element can be displayed with varied display characteristics, such as colors or patterns, to signify event characteristics. A performance element associated with the network element can be displayed with varied display elements, such as colors or patterns, to signify performance levels or performance attributes of the network element. For example, a cell site can be displayed with a display characteristic, such as a green color, to signify the cell site is not in a warning state or an alarm state, with a second display characteristic, such as a yellow color, to signify that the cell site is in a warning state, and with a third display characteristic, such as a red color, to signify that the cell site is in an alarm state. A performance element for the cell site can be displayed having a first display characteristic, such as a green color, to signify that the cell site does not have a warning level or a critical level, with a second display characteristic, such as a yellow color, to signify that the cell site has a warning level, and with a third display characteristic, such as a red color, to signify that the cell site has a critical level. Other display elements or display characteristics may be used. The display characteristics for the performance elements are referred to as performance characteristics. The display characteristics for the network elements are referred to as event characteristics.

The warning state and the alarm state for events typically are not user configurable. An event (also referred to as an event attribute) can be described as a failure, failed condition, or degradation of some network element, such as a circuit, a switch, or an SS7 link. A warning state may be pre-configured as a state in which an event occurred within a selected period of time. An alarm state may be pre-configured as a state in which a current event is occurring. Because these events are significant in a telecommunication network, a user may not have the knowledge and expertise necessary to configure the proper characteristics that would cause a warning state or an alarm state for an event associated with a network element. Although, in some embodiments the warning state and the alarm state may be user-configurable. Other states may exist or may be configured or shown.

The warning level (as opposed to the warning state for events) and the critical level are based on user configurable performance levels. Thus, a user can specify performance attributes, levels of performance attributes, or network events that will effect the warning level, the critical level, or another level causing display of a performance element. Other display elements or display characteristics may be used.

The performance element can be displayed in a form that allows a user to view the performance levels of network elements easily. Examples of performance elements having performance characteristics are display elements having colors or patterns that signify configured parameters, performance attributes, or network events or other display elements, such as text or symbols, that identify configured parameters, performance attributes, or network events. For example, one or more different shapes may be displayed proximal to the network element to signify one or more performance levels or performance attributes, a shape having more than one display characteristic, such as multiple colors, can be displayed concentrically or proximal to a network element, or the same shape as the network element may be displayed other than concentrically. Alternately, the network element can have multiple display characteristics, such as one display characteristic for the performance characteristic and another display characteristic for the event characteristic. For example, the left half of a circle can designate the performance characteristic of a cell, and the right half of a circle could designate the event characteristic of the cell. In another example, different shapes are located proximal to the network element to designate a performance characteristic or a network event, such as a flag, an exclamation point, a star, or a octagon. The shapes may be color coded or have other display characteristics. Other methods may be used.

Preferably, a performance element is a shape displayed concentrically around the display element representing the network element, the concentric shape being color coded to signify different performance levels for performance attributes. For example, if a performance layer is enabled, a circle can be displayed as the performance element concentrically around a circle representing a cell. The performance layer can be configured to display the concentric circle with a performance characteristic, such as a color of green, a yellow color, or a red color for one or more performance attributes or performance levels. Other display elements and other display characteristics may be used.

Performance levels of performance attributes can be configured by a user to determine how a performance element is displayed, if at all. For example, performance levels may be configured for attempts, drops, blocks, percent drops, percent blocks, channel erlangs, or other performance attributes. If one or more performance attributes reaches a configured performance level, a performance element is displayed on with a performance characteristic configured to signify that performance level.

As an example, a user can configure the GMS to display a concentric circle as a performance element and having a yellow color as the performance characteristic when a warning level of one hundred dropped calls is reached. Likewise, a user can configure the GMS to display a concentric circle as a performance element and having a red color as the performance characteristic when a critical level of five hundred dropped calls is reached. Other examples, other configurations, and other performance attributes may be used.

The system can be configured to use a logical operator to determine whether or not to display a performance element or to determine which performance characteristic to display. In one example, the system can be configured to "and" or "or" one or more performance attributes to determine if a performance level is reached for displaying a performance element. In this example, a performance level is configured for X number of drops "and" Y number of blocks. Thus, a performance element will be displayed if both X number of drops and Y number of blocks occurs. Alternately, the system can be configured to display a performance element if either X number of drops "or" Y number of blocks occurs.

Another data layer is a coverage layer. The coverage layer identifies geographical areas of a telecommunication network that have varied levels of telecommunications service, such as excellent coverage, good coverage, average coverage, or poor coverage. Alternately, the coverage layer can identify whether a customer, i.e. a customer at a location, is inside a service area or outside a service area. Other levels of service or other methods of identifying coverage may be used.

Coverage can be identified using coverage elements, such as color-coded areas, pattern generated areas, coordinate or other ordinate identified areas, or areas encompassed within or outside of a circle area, a polygonal area, or another shaped area. Other coverage elements may be used. For example, a map may be generated with an area color coded in green to depict a good level of service covering that area. Multiple colors may be used to depict different levels of service. Alternately, an area may be color coded with two colors-one color depicting that service exists for that area and another depicting that service does not exists for that area.

Figure 5A:
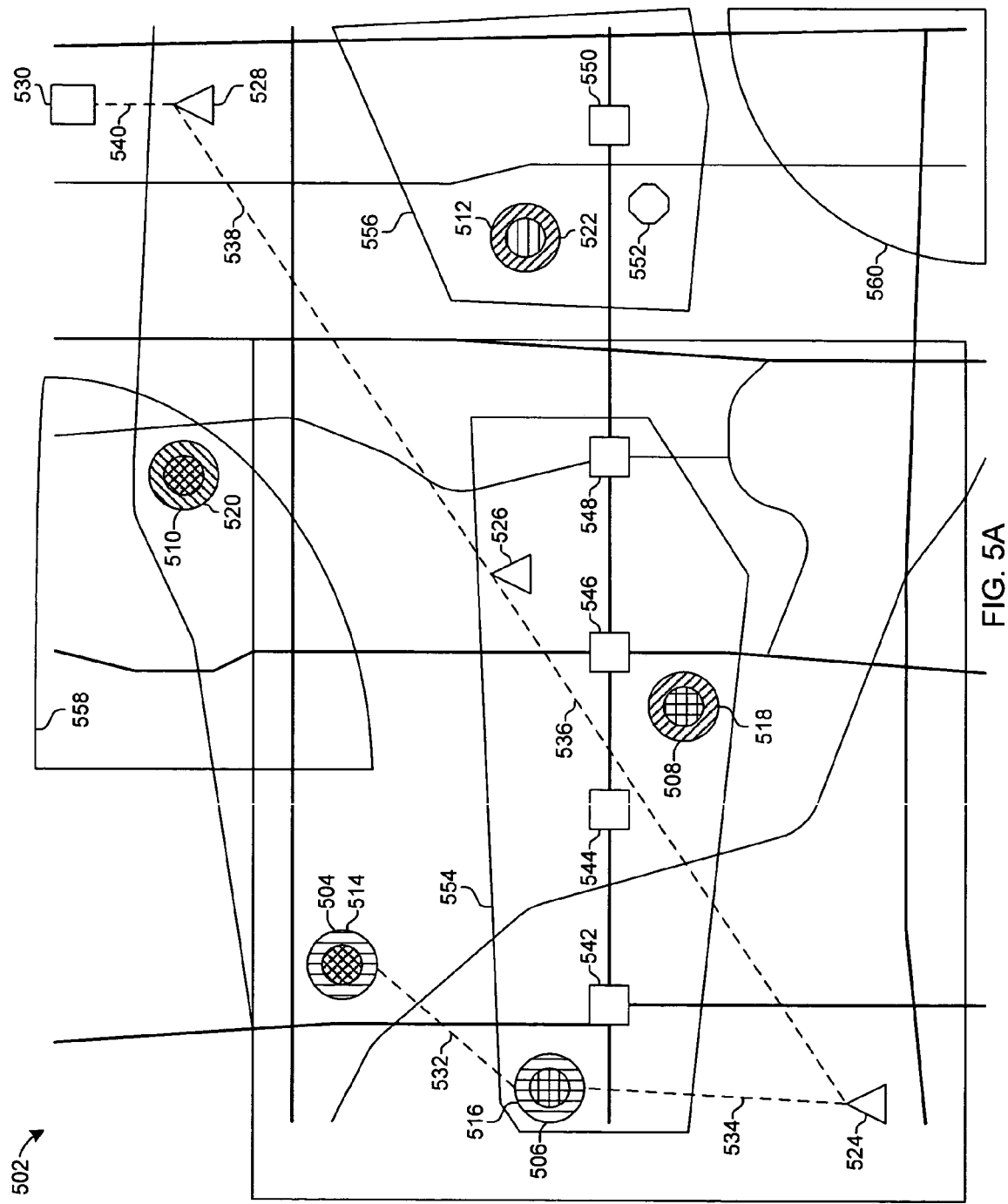
FIG. 5A is a diagram of network elements and geographic elements in a telecommunication system for a screen display in accordance with an embodiment of the present invention.

FIG. 5A depicts an example of a map generated by the GMS 104B. The map includes display elements, such as network elements, performance elements, and geographic elements. Some of the network elements include event characteristics that signify event levels of network events. The performance elements include performance characteristics signifying performance levels of performance attributes. Different levels of coverage areas, engineering defined trouble areas, and customer defined trouble areas also can be provided. In the example of FIG. 5A, the map 502 comprises cells 504-512, performance elements 514-522 in the form of concentric circles, switches 524-528, a network element 530, a wireless circuit 532, wireline circuits 534-540, trouble tickets 542-550, a landmark 552, a customer defined trouble area 554, an engineering defined trouble area 556, and coverage areas 558 and 560.

The cells 504-512 each have an event characteristic that signifies an event level of one or more event attributes. A different pattern is used in the example of FIG. 5A as the event characteristic to distinguish between different event levels. Although, other event characteristics may be used to distinguish between event levels, such as color codes. For example, the cells 504 and 510 include an angled cross-hatched pattern signifying that the cells are healthy and that no network events have occurred. The cell 512 includes a horizontal line pattern to signify the cell is in a warning condition for one or more network events associated with a cell. The cells 506 and 508 include a horizontal and vertical criss-cross pattern to signify a critical level for one or more network events associated with that cell.

The performance elements display performance characteristics that signify a performance level of one or more performance attributes. For example, the performance element 520 has a left to right striped pattern to signify that the performance level is healthy and does not arise to a warning level or a critical level. The performance elements 514 and 516 have a vertical striped pattern to signify a warning level of one or more performance attributes associated with the respective cells 504 and 506. The performance elements 508 and 512 have a right to left striped pattern to signify a critical level of one or more performance attributes associated with the respective cells 508 and 512. The performance attributes include configurable levels for a warning level, a critical level, or other specified levels for attributes including one or more of attempts, drops, blocks, percent drops, percent blocks, and channel erlangs. It will be appreciated that other patterns and other performance characteristics can be used, including color codes.

The customer defined trouble area 554 may be generated when X number of trouble tickets occurs in a Y range of an area. For example, a customer defined trouble area may be defined if one or more trouble tickets occurs within a radius, a vertical/horizontal range, a longitude/latitude range, a distance, an area defined by dimensions, or another range. In the example of FIG. 5A, a customer defined trouble area occurs where four trouble tickets 542-548 occur within a predetermined radius. The customer defined trouble area surrounds the cells 506 and 508. Note that a user viewing the screen readily can identify that both cells 506 and 508 are in a current event failure or degradation, as specified by the event characteristic of the cells. In addition the cell 506 has a warning level for its performance level, and the cell 508 has a critical level for its performance level. By viewing this information, a user can easily determine network event problems and network performance problems in the area of the identified trouble ticket and, if needed, can describe the problem to a customer.

The engineering defined trouble area 556 is an area specified by an engineer or other authorized user as having a known problem, such as poor service. The user can enter an associated script describing the outage or service problem for the trouble area. If a customer calls to report a problem for a trouble ticket 550, a user of the system can tell the customer that the area is a known trouble area, the problem associated with the trouble area, the time and/or date of resolution of the problem, and/or a description of the resolution.

In the example of FIG. 5A, the engineering defined trouble area 556 encompasses the cell 512. A user readily can determine that a network event that is associated with the cell 512 has occurred within a specified period of time, such as 72 hours, because of the pattern of the event characteristic of the cell. In addition a user can determine that the cell has one or more critical levels of performance attributes due to the performance characteristic of the performance element 522.

The coverage areas 558 and 560 identify levels of service coverage. The coverage areas 558 and 560 can be color coded, shaded, or identified by another display characteristic so that a user can distinguish between different levels of coverage, including excellent, good, average, or poor. In the example of FIG. 5A, the coverage area 558 is defined as having excellent coverage, and the coverage area 560 is defined as having poor coverage. The areas not specifically identified can be shaded or can be generically identified as having good coverage, another level of coverage, or as having some coverage.

A user can view parameters, components, or network elements and can configure parameters, components, or network elements by entering network data associated with the parameters, components, or network elements. This is exemplified where the switch 524 is a first provider, and the switches 526 and 528 are a second provider. An interruption of service occurs between the switches 524 and 528. The GMS 104B allows the user to view network data associated with the wire line circuits 536 and 538 to determine where the interruption of service or other problem has occurred. Thus, network data for the end points of a circuit and network data associated with the service providers can be displayed to the user. In this example, the user determines that the interruption of service is associated with the wireline circuit 536. A user can enter a work order to be issued to the appropriate service provider for repair of the wireline circuit 536. In some embodiments, the user may enter configuration data for the wireline circuit 536 to fix the interruption of service.

With reference to FIGS. 4 and 5, the management system 102B operates as follows. In a first example, the connection 402 is an IP connection, and the web server 402 and the user browser 418 communicate using the HTTP protocol. The web server 402 and the user browser 418 transmit and receive network data and geographic data via pages.

The user browser 418 connects to the web server 402 via the connection 420. The user browser 418 logs into the web server 402 by entering a login and a password. The web server 402 transmits a page to the user browser 418 so that the user browser may enter a search criteria and identify a telecommunication network having network elements and geographic elements that may be viewed, monitored, or configured. The user browser 418, or more particularly the user using the user browser, enters a search criteria, such as an intersection of streets or an address of a street.

The user browser 418 transmits the search criteria to the web server 402 in a page. The web server 402 transmits the search criteria to the map server 410 in the form of a page containing data that, when executed, operates as a request for the map server 410 to obtain a geocode corresponding to the search criteria.

The map server 410 receives and executes the page. The geocode generator 412 generates a geocode that corresponds to the search criteria. In this example, the geocode is a latitude and longitude pair corresponding to the address provided as the search criteria.

The map server 410 transmits the geocode to the web server 402 as a response in the form of a page. The web server 402 receives the page from the map server 410, identifies the geocode data in the page, generates a new page having the geocode, and transmits the page to the user browser 418.

The user browser 418 receives the page with the geocode, executes the page, and transmits a new page to the web server 402 requesting a list of cells and other network elements in a search range of the geocode. The web server 402 transmits the request for the list of cells and other network elements to the map server 410 in a form of a page.

The map generator 414 determines the list of cells and other network elements within the search range of the specified geocode. The map generator 412 communicates with the database server 404 to obtain the identification of the cells and other network elements within the search range of the geocode. The database server 404 responds to the query from the map generator 414 with the identification of the cells and other network elements within the search range of the geocode. The map server 410 then transmits the identification of the cells and other network elements to the web server in a page.

The web server transmits the identification of the cells and other network elements to the user browser 418 in a page. The user browser 418 receives the identification of the cells, executes the page, and transmits a new page to the web server 402 requesting a map to display the network elements and the geographic elements in the search range. The web server 402 receives a communication from the user browser 418 and transmits a page to the map server 410 requesting generation of the map.

The map generator 414 generates images and text of the network elements, including any associated performance elements, and the geographic elements for the map and transmits the map to the web server 402 in a page. The web server 402 includes the map received from the map server 410 in a page that is transmitted to the user browser 418. The user browser 418 receives the page, and the map is displayed to a user. The map may contain network and performance elements and geographic elements depicting a telecommunication network. For example, the map may display the network elements and the geographic elements of the telecommunication system 202 depicted in FIG. 2.

In another example, the user browser 418 communicates with the web server 402 using pages via the HTTP protocol. In this example, the user browser 418 has connected with the web server 402, and a map is displayed to the user browser. The map displays the telecommunication system 202 of FIG. 2. In addition, the display displayed to the user browser 418 comprises a data entry and search tools panel for entry of search criteria and search navigation and an output panel to display network data.

The user using the user browser 418 selects a network element, such as the cell 208. Selecting the cell 208 initiates a communication from the user browser 418 to the web server 402. Based on the communication from the user browser 418, the web server 402 will communicate with one or both of the database server 404 and the map server 410. For example, the GMS 104B may be configured to generate a new map in which the selected cell 208 is centered in the map. A zoom may be effected, thereby generating a new map.

Selecting the cell 208 may require the web server 402 to obtain network data and geospatial data from the map server 410. Such network data and geospatial data may include cell identification, trouble ticket identification, graphical elements depicting status of a cell or a trouble ticket, including color or shape designations, and other network data, including status identification, such as dropped, blocked, closed, fast busy, or unspecified for trouble ticket type, and cell designations for cells.

The web server 402 also may require network data from the database server 404. For example, the web server 402 may request network data for cells, cell sites, trouble tickets, and other network elements or parameters, such as cell site identification data, performance statistics, and network event data.

In this example, when the user selects the cell 208 and transmits a page to the web server 402 identifying the selected cell, the web server 402 queries the database server 404 to obtain the network data associated with the cell 208. This network data includes cell site information, such as region, market, site identification, site description, latitude, longitude, on-air date, status, and/or antenna height. The network data may be combined with static data, such as the names "region", "market", "site identification", "site description", "latitude", "longitude", "on air date", "status", and/or "antenna height". The network data obtained from the database server 404 is combined with the static data and transmitted to the user browser 418 in the form of a page. If geospatial data or network data is obtained from the map server 410, the web server 402 will combine that network data and geospatial data with the network data obtained from the database server 404 and any static data to form the page.

In another example, the user browser 418 is connected to the web server 402. The user browser 418 communicates with the web server 402 using pages. In this example, a map is generated to the user browser 418 depicting the telecommunication network 202 of FIG. 2.

The user may select any network element for viewing, monitoring, or configuration. The user selects a trouble ticket 232. The selection initiates generating a page to the web server 402 identifying the selected trouble ticket 232.

The web server 402 queries the database server 404 to obtain the network data associated with the trouble ticket 232. The database server 404 responds to the web server 402 with the network data associated with the trouble ticket 234. Trouble ticket network data may include a trouble ticket identification, a trouble type, an issue date, latitude of the problem, longitude of the problem, one or more cross streets identifying the location of the problem, a city, a state, a zip code, a signal strength for the call, and/or identification of the handset used by the customer.

The web server 402 combines the trouble ticket network data with the static data and geospatial data, if any, and generates a page. The web server 402 transmits the page to the user browser 418.

In another example, the user browser 418 connects to the web server 402 via the connection 420. In this example, the user browser 418 communicates with the web server 402 using pages. After the user logs in, the web server 402 transmits a page to the user browser 418 providing for the entry of a search criteria, such as an address or an intersection. In this example, the user enters an address as the search criteria and makes a selection to display a map having network elements, including any associated performance elements, and geospatial elements within a search range of that address.

The web server 402 receives the search criteria and transmits the search criteria to the map server 410. The map server 410 geocodes the search criteria and generates a map of the geocoded search criteria to the web server 402. In this example, the map server 410 obtains a list of the network elements within a search range of the specified address. The map server 410 transmits the identification and list of the network elements to the web server 402. The web server 402 includes the identification and list of the network elements and the map in the page transmitted to the user browser 418. In this example, the generated map has display elements that identify the network elements, performance elements associated with the network elements, and the geographic elements of the telecommunication network of FIG. 5A. As a result, the display to the user includes the map 502 identifying the telecommunication network of FIG. 5A and an identification and listing of the network elements depicted in FIG. 5A, including the associated performance elements. The user can select the network elements and network data and navigate as described above.

Multiple performance elements, including sectored performance elements, may be generated for a single network element. For example, a network element may be depicted by a circle on a map. The circular network element may have multiple concentric rings identifying multiple performance elements. Each performance element may have a different performance characteristic signifying one or more performance levels for one or more attributes. In this embodiment, the center circle may be configured to depict a first performance characteristic for a first performance attribute, the first concentric ring may be configured to depict a second performance characteristic for a second performance attribute, the second concentric ring may be configured to depict a second performance characteristic for a third performance attribute, and the third concentric ring may be configured to depict a third performance characertistic for a fourth performance attribute.

For example, the center circle may be configured to depict one or more performance characteristics for percent blocks, the first concentric ring may be configured to depict one or more performance characteristics for percent drops, the second concentric ring may be configured to depict one or more performance characteristics for erlangs, and the third concentric ring may be configured to depict other performance characteristics for another performance attribute. Each circle and/or concentric ring may be configured to display one or more performance characteristics, such as a different color, depending on a value identified for each performance level for a performance attribute. A value may be selected for performance metric limits for percent blocks, including a first color for normal, a second color for moderate, and a third color for excessive. The value for each of the normal, moderate, and excessive may be entered or otherwise designated. If the percent of blocks matches or exceeds the value, then the color will change from normal to moderate or excessive, depending on the limit value selected and the actual data value.

It will be appreciated that the performance element need not be a circle. Additionally, one or more performance elements may be generated for a single network element or one or more network elements. For example, a cell site may have three sectors, one for each of three antennas. In this example, the performance elements may be parsed into a third of a circle or concentric ring so that a performance element is generated for each of the three sectors of the cell site. If more than one performance element is to be used for a single network element or is to be used for associated components, equipment, or network elements at a single geographic location or area, such as described above, they are referred to as "sector performance elements" herein. Other examples exist. A sector may include a section or any portion. It need not be an equal portion.

A performance element for a communication network may depict performance attributes other than call performance data. For example, an outer concentric shape or portion of a concentric shape may identify a coverage area for a network element. In this example, an outer concentric ring may depict the total coverage area of a cell site.

Moreover, the performance element may be a sectored performance element depicting a beam width of each cell sector. Thus, one sector of a cell site may have a first range, and the second sector may have a second range.

In this example, the network element may have at least two sectored performance elements, the first depicting the first range, and the second depicting the second range. Therefore, the performance elements for the first sector and the second sector will be of different shapes, each depicting the coverage area of that sector over the geographic area identified by the map.

Also in this example, the cell site may not have an antenna for a third sector. Thus, performance elements may be depicted for the first and second sectors in this example. Alternately, a third sector may exist and be depicted by a performance element that is less than a full third, i.e. 120°, of a circle and/or concentric ring. Additionally, a shape other than a concentric ring may be used to depict the coverage area since the coverage area may not fully exist in a ring configuration. For example, a polygon having an odd shape may depict the true coverage area of a sector of a cell site.

It will be appreciated by these examples that multiple performance elements having multiple performance characteristics, including sectored performance elements having sectored performance characteristics, may be used for a single network element depicting varied performance attributes. The performance elements need not be concentric or of the same shape. Nor do the performance elements need to be of a specific shape. The performance elements and the performance characteristics for those performance elements may be configured as needed to depict the performance attributes of any network. These performance elements and performance characteristics include sectored performance elements with sectored performance characteristics, with each having non-uniform shapes or other characteristics.

It will be appreciated that, while examples of network elements, performance elements, and performance characteristics are given herein with respect to a communication network, the systems and methods herein apply equally to other types of networks. For example, network elements, performance elements, and performance characteristics may be used for oil/gas networks, store networks, packaging and other business networks, or any other networks that may depict data geographically and/or with respect to performance attributes.

FIG. 5B depicts an exemplary embodiment of a portion of the network map 502A depicted in FIG. 5A. In this example, multiple sectored performance elements are generated by the GMS 104B for a network element.

The map 502A depicts three cells 562-566, each having three sectors. Thus, the first cell 562 depicts three sectors 568-572. The second cell 564 comprises three sectors 572-576. The third cell 566 also depicts three sectors 580-584.

In the example of FIG. 5B, each of the performance attributes for the performance elements of each of the sectors 568-572 of the first cell 562 are the same. Additionally, the performance attributes of the performance elements of the sectors 572-576 of the second cell 564 are the same. Additionally, the performance attributes of the performance elements of the sectors 580-584 of the third cell 566 are the same. Thus, each of the sectors 568-572 of the first cell 562, each of the sectors 572-576 of the second cell 564, and each of the sectors 580-584 of the third cell 566 appear the same. However, each performance element can be configured separately for each sector of each cell.

The GMS 104B has a rubber band feature. The rubber band feature enables a user to select an area on the map and to zoom into that select area. Any area may be selected by the user. Preferably, a rectangle may be used by a user to select a selectable area for the rubber band area. However, the GMS 104B may be configured to use any type of shape or configuration, including a circle, an oval, a square, a rectangle, a polygon, or some other type of designation to delineate the rubber band area. A rubber band area 586 is depicted in FIG. 5B by a dashed rectangle.

After the rubber band area 586 is selected, the user may zoom in to the rubber band area 586. This action will generate a new map for the zoomed-in area.

Figure 5C:
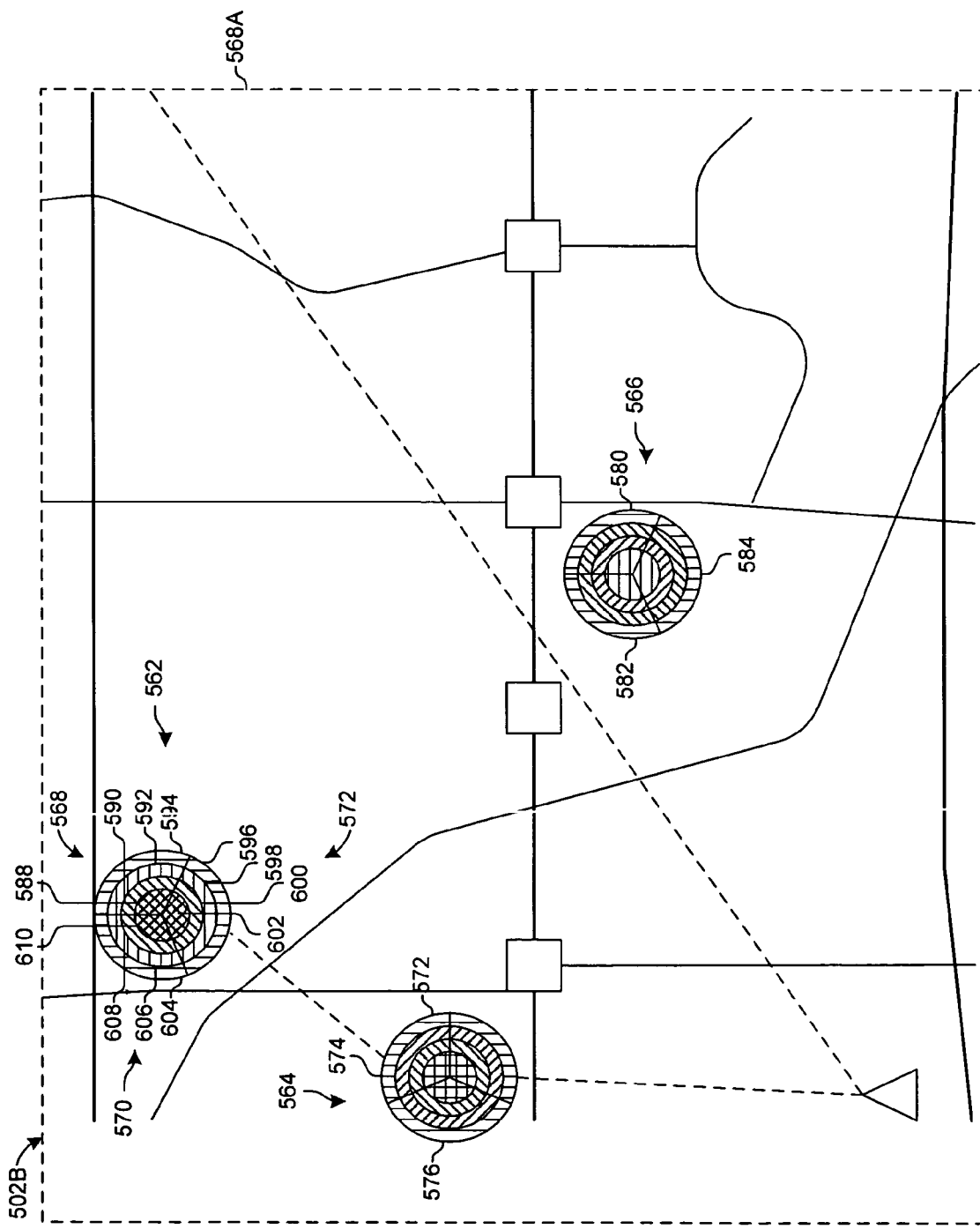
FIG. 5C is a diagram of network elements, geographic elements, and sectored performance elements for a rubber-band zoom in a telecommunication system for a screen display in accordance with an embodiment of the present invention.

FIG. 5C depicts an exemplary embodiment of an area that has been selected as a rubber band area for which a zoom has been selected and for which a map 502B has been re-generated for the zoomed area. In the example of FIG. 5C, the performance characteristics for the various performance elements of each sector 568-572 of the first cell 562 have been altered. By way of example, the first sector 568 comprises a first sectored performance element 588, a second sectored performance element 590, a third sectored performance element 592, and a fourth sectored performance element 594. Similarly, the second sector 570 has a first sectored performance element 596, a second sectored performance element 598, a third sectored performance element 600, and a fourth sectored performance element 602. Likewise, the third sector 572 has a first sectored performance element 604, a second sectored performance element 606, a third sectored performance element 608, and a fourth sectored performance element 610.

The sectored performance elements 588-610 may be configured to depict any performance characteristics for any performance attribute for any selected network element. Thus, depending on the type of network involved and the type of network element involved, the performance elements and the sectored performance elements may be different.

In one embodiment for the network map 502B of FIG. 5C, the first sectored performance element 588, 596, and 604 of each sector 568-572 depicts performance characteristics for percent of call blocks (the performance attribute). The second sectored performance elements 590, 598, and 606 of each sector 568-572 depicts performance characteristics for call drops. The third sectored performance elements 592, 600, and 608 depict performance characteristics for erlangs. The outer sectored performance elements 594, 602, and 610 depict the coverage area of each sector 568-572. It should be noted that the coverage areas depicted by the fourth sectored performance elements 594, 602, and 610 are for exemplary purposes only and may be larger, smaller, and of different shapes in another system or with different types of data.

It will be appreciated that the other cells 564 and 566 depicted in FIG. 5C similarly may have sectored performance elements, each with the same or different performance characteristics generated according to selected performance levels of selected performance attributes. For simplicity, these sectored performance elements and sectored performance characteristics are not depicted on FIG. 5C. Other examples and other types of sectored performance elements, associated performance characteristics, and associated selected performance levels of performance attributes may exist.

Figure 6:
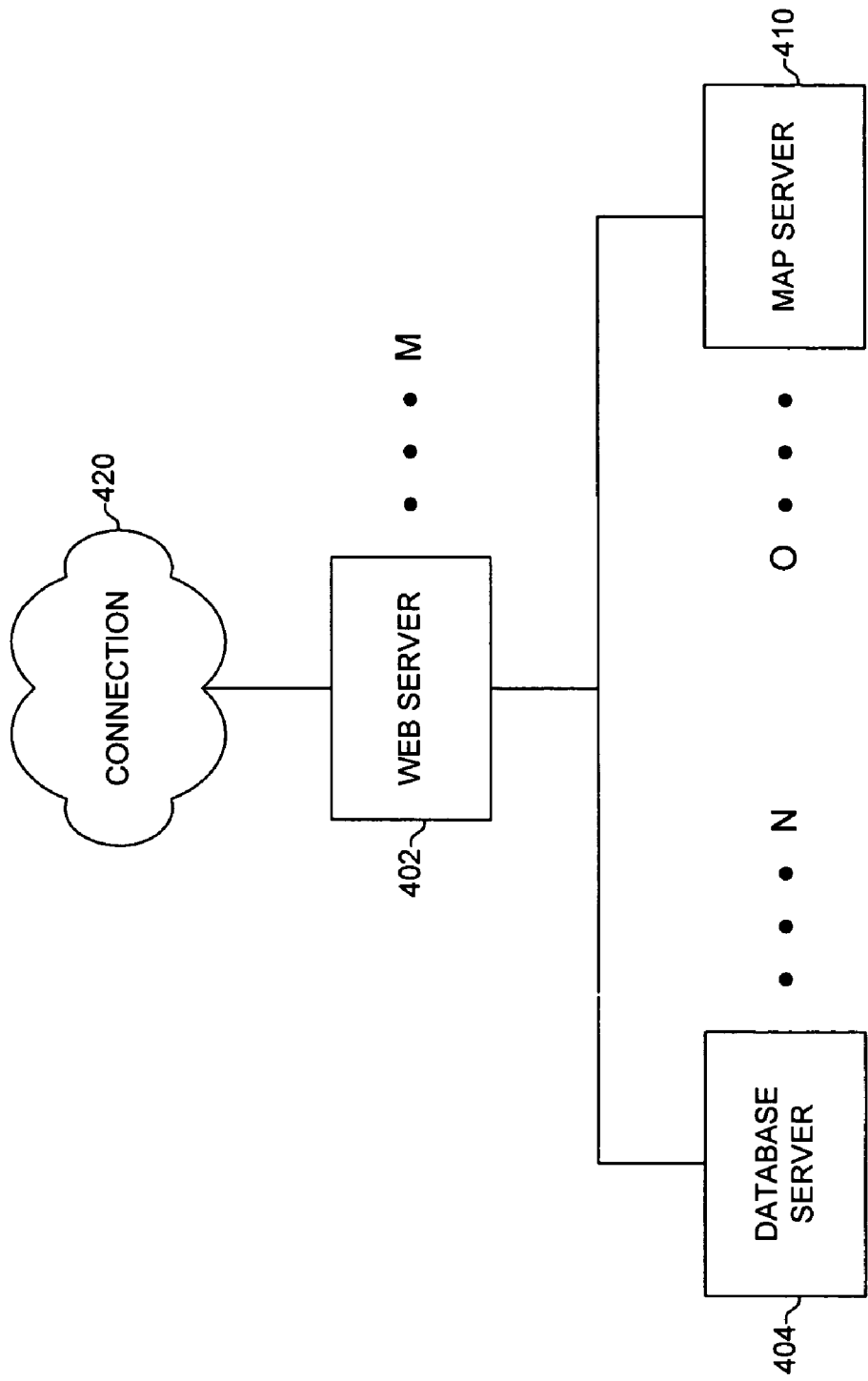
FIG. 6 is a block diagram of an orientation of a geographic management system in accordance with an embodiment of the present invention.

FIG. 6 illustrates an exemplary embodiment of an implementation of components of a GMS. The implementation of FIG. 6 illustrates one to M web servers, one to N database servers, and one to O map servers, where M, N, and O represent any number greater than one. In the implementation of FIG. 6, the web server 402, the database server 404, and the map server 410 may communicate with each other via a link capable of transmitting communications, such as a transmission control protocol/internet protocol (TCP/IP) link.

One or more instances of the logical components of a GMS may be located on a physical platform. For example, one or more instances of a web server may be located on a computer platform. Such an example is depicted in FIG. 7A. For simplicity, a database server is not depicted in FIG. 7A, but an instance of a database server would be present.

In addition, one or more instances of the logical components of a GMS may be configured as a redundant system. For example, an instance of a web server may connect to more than one instance of a map server in which a first instance of the map server is designated as a main and at least another instance of the map server is designated as a redundant backup. Although, it will be appreciated that an instance of a GMS component may be connected to more than one instance of another component without any of the instances being redundant systems.

Figure 7B:
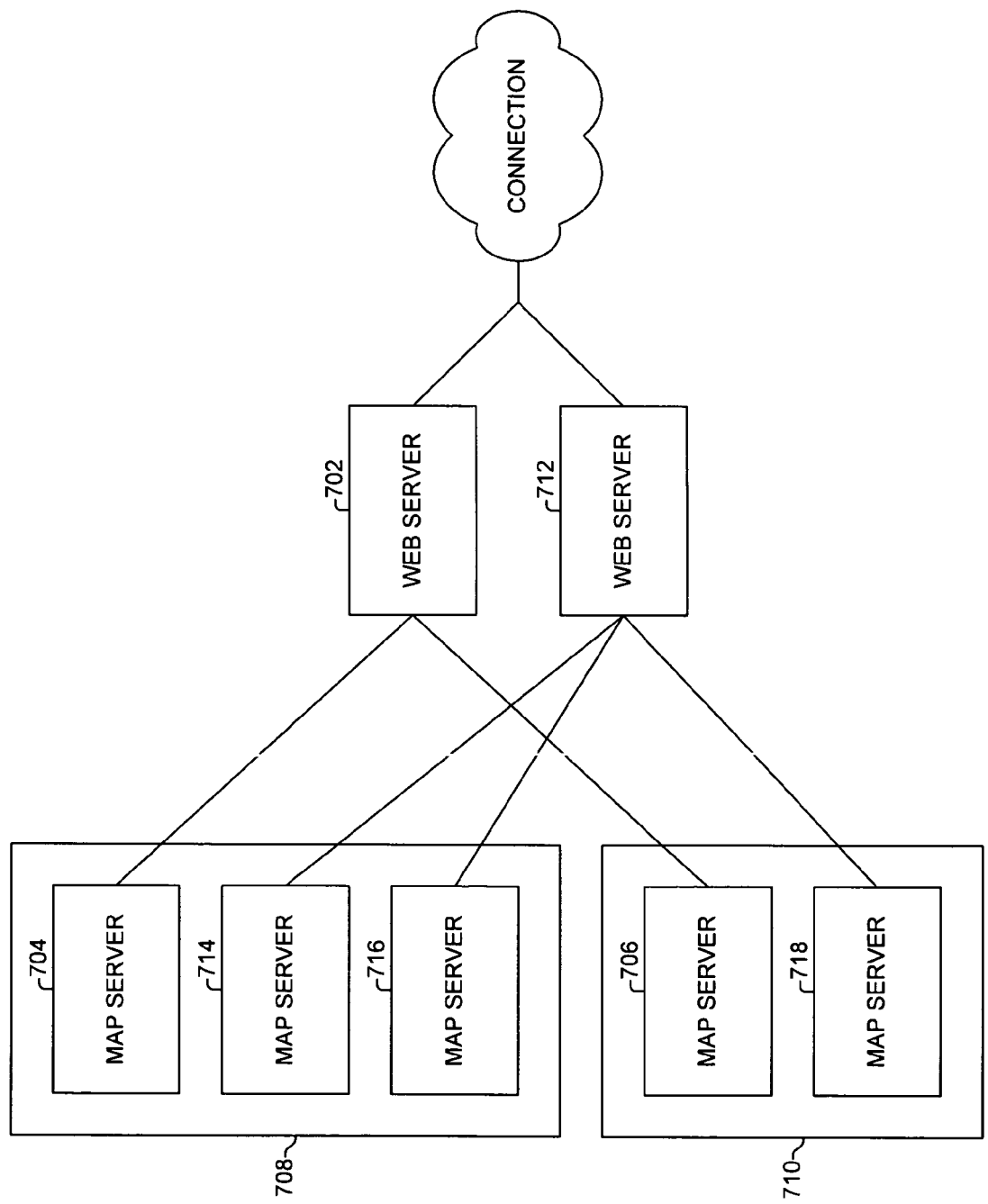
FIG. 7B is a block diagram of an orientation of a redundant geographic management system in accordance with an embodiment of the present invention.

An example of an implementation having an instance of a web server 702 connected to two instances of a map server 704 and 706, in which one instance of a map server 704 is a main system and the other instance of the map server 706 is a redundant system, is depicted in FIG. 7B. The map servers 704 and 706 reside on two platforms 708 and 710. FIG. 7B also depicts an instance of a web server 712 that is connected to three instances of a map server 714-718, none of which are redundant systems. For simplicity, a database server is not depicted in FIG. 7B, but an instance of a database server would be present.

In any of the examples of FIGS. 4-7, the map server can be configured to provide communication load balancing. Each map server then determine whether it can process additional communications and generate geocodes and maps. Each map server transmits a communication to the web server identifying its processing load and capabilities. The web server then determines which map server will process additional communications.

In addition, the map server can be implemented as two separate components—namely, the geocode generator and the map generator. In this configuration, the geocode generator will reside as an instance physically separate from the map generator. This configuration can increase processing efficiency if the map generator will require greater processing to generate a map with images and text than the geocode generator generating the geocode.

Figure 8:
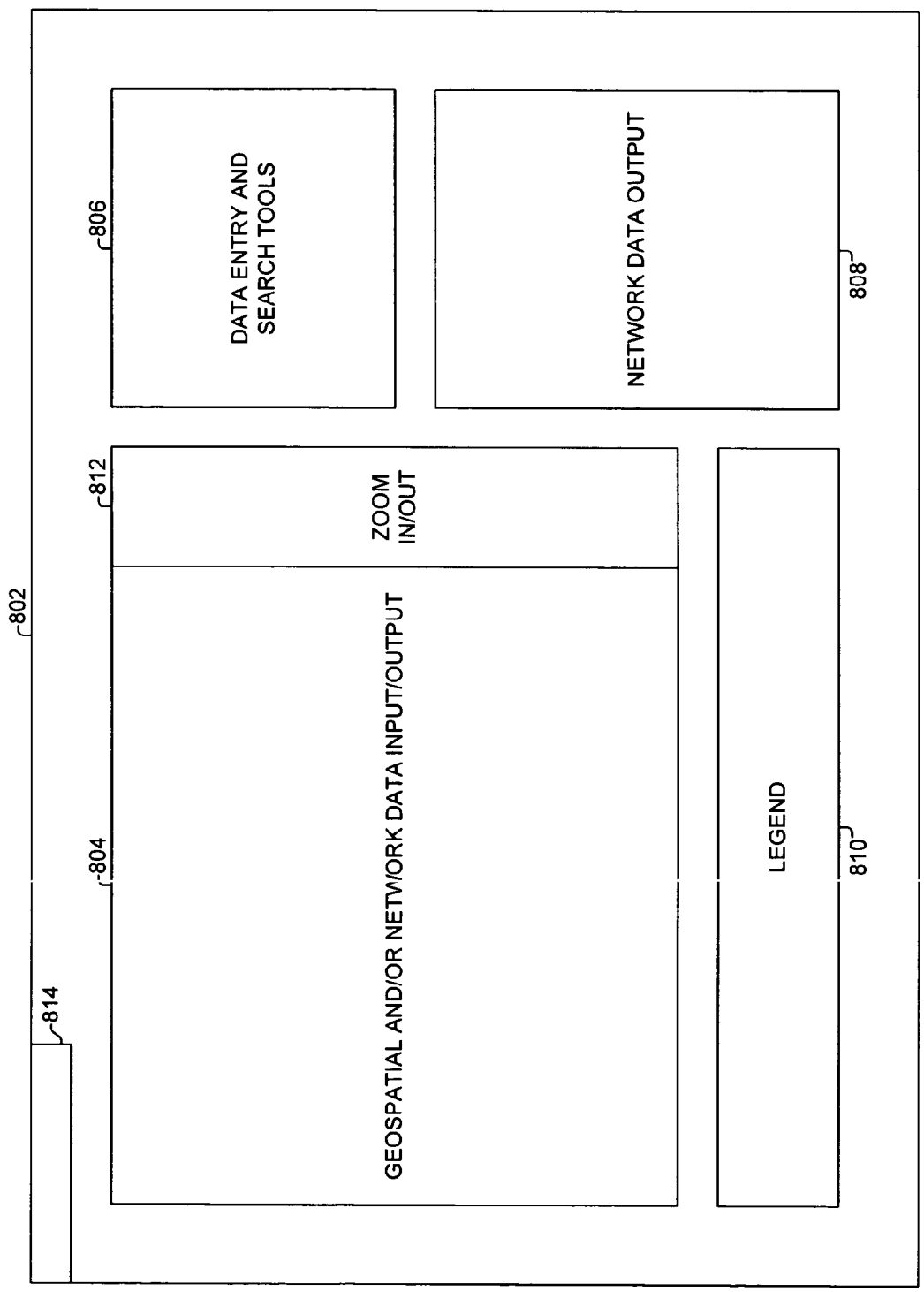
FIG. 8 is a block diagram of a graphical interface of a geographic management system in accordance with an embodiment of the present invention.

FIG. 8 illustrates an exemplary embodiment of a graphical interface used to enter, display, and navigate through network data and geospatial data used in conjunction with the GMS. The graphical interface 802 of FIG. 8 comprises display components for a geospatial and/or network data input or output (GNDIO) 804, a search tools and data entry (STDE) 806, and a network data output (NDO) 808. In some configurations, the graphical interface 802 also may be configured with a legend 810, a zoom in/out 812, and optional navigation tools 814. Different, fewer, or greater display components may be used.

The GNDIO 804 displays the map generated by the map generator 414. This map comprises network data and geospatial data. The map displays display elements that represent geographic elements, network elements, and performance elements within a search range of a geocode, such as a radius or a distance. Any designated search range may be used for a display, including different units of measurement. For example, the telecommunication system 202 of FIG. 2 may be depicted in the GNDIO 804 for a search range of 5.0 kilometers (km) around a specified geocode.

A user may select (i.e. "click on") any of the network elements displayed in the GNDIO 804, including trouble tickets, to display more detailed information about the network element. The GNDIO 804 also may be used to enter network data, such as configuration data. For simplicity, graphical representations of display elements, such as network elements, are referred to as those display elements, such as network elements.

The STDE 806 allows a user to enter search criteria. The STDE 806 may comprise tabs for entry of search criteria to identify a geocode or a network element. For example, the STDE 806 may comprise tabs for entry of an address, a cell, a trouble ticket, a switch, a trading area, a base transceiver, or a network event.

The NDO 808 displays network data and geospatial data. The NDO 808 may comprise tabs for output criteria. For example, the NDO 808 may comprise tabs to display network data for a cell, a trouble ticket, a switch, a base transceiver, an identification of cells in a search range, or an identification of trouble tickets in a search range.

The legend 810 identifies components and colors or other identifying designations displayed in the GNDIO 804 and provides a description of the components and of the identifying designations. For example, the legend can identify cell sites and status, trouble areas, coverage, and definable trouble areas.

The zoom 812 allows a user to zoom in or out of a selected area of the map produced in the GNDIO 804. If a zoom in or out is selected, a new map is generated.

The navigation tools 814 allow a user to navigate through other various options and screens available from the GMS. This includes other displays and other functions.

FIGS. 9-35 illustrate exemplary embodiments of a graphical interface. However, other graphical interfaces or components of graphical interfaces may be used.

A browser is used to navigate through screens of the graphical interface. Since the graphical interface is useable in conjunction with the browser, multiple users can access the GMS via an IP connection using pages. This allows a user to quickly and easily navigate through the screens of the graphical display, view and monitor network data and geospatial data for network elements, and enter configuration data and other network data for the network elements. Any browser may be used.

Figure 9:
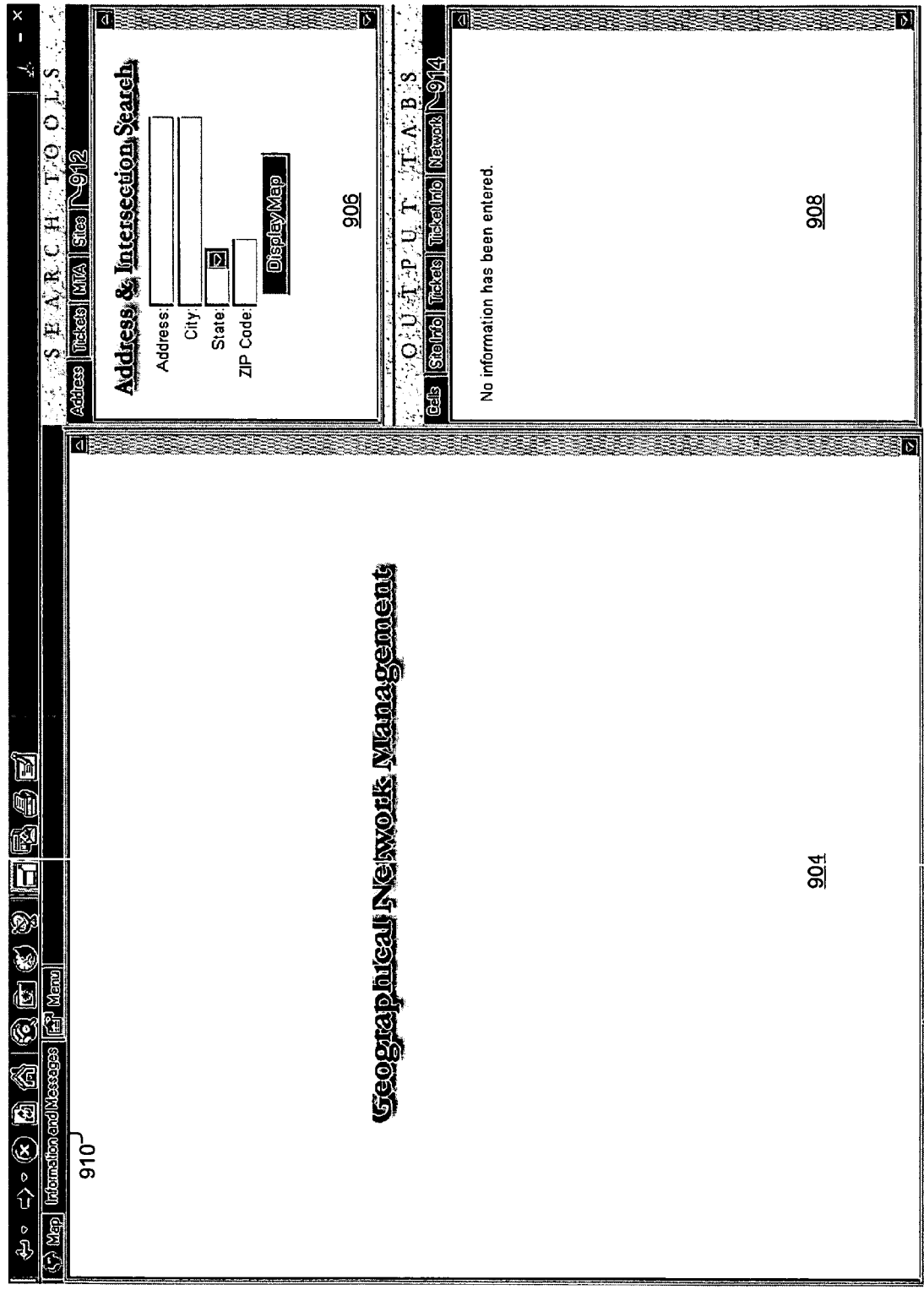
FIG. 9 is a screen view of a screen in accordance with an embodiment of the present invention.

FIG. 9 depicts an example of a screen in which a search criteria may be entered. The screen 902 has a GNDIO panel 904, an STDE panel 906, an NDO panel 908, and navigation tools 910. The STDE panel 906 and the NDO panel 908 have navigation tabs 912 and 914 for selecting options for search and entry, of data and for data output, respectively.

The user can select navigation tabs in the STDE panel 906 to enter a search criteria including an address, a trouble ticket, a major trading area (MTA), a base transceiver station (BTS), or a cell site. In example of FIG. 9, a user may search with any component of an address, including a street address, an intersection, a city, a state, or a zip code or any combination thereof. Once a user has entered the search criteria, the user may select the "Display Map" to initiate the search.

Figure 10:
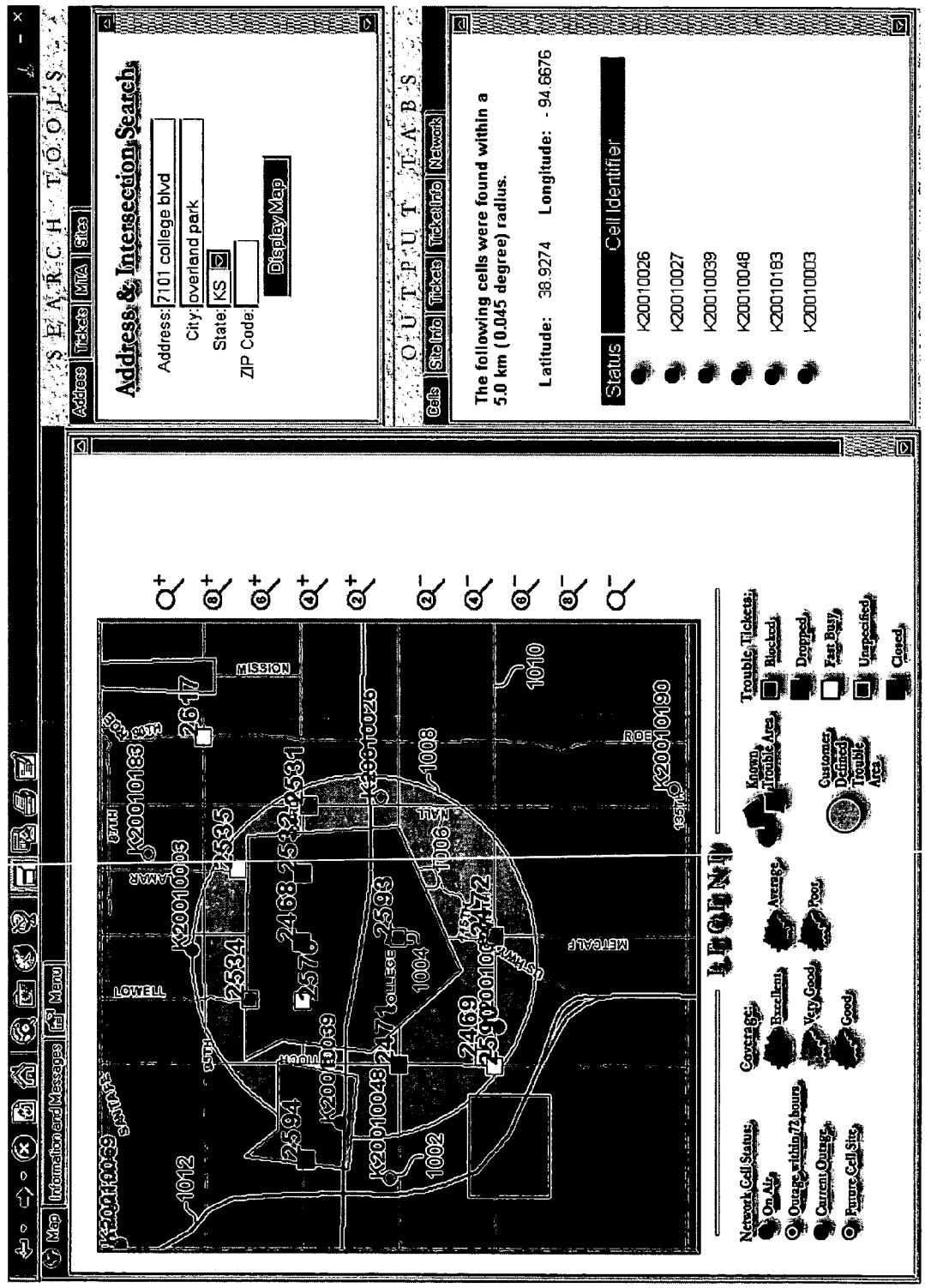
FIG. 10 is a screen view of a screen in accordance with an embodiment of the present invention.

FIG. 10 depicts an example of a screen displayed to a user after a search has been initiated. In this example, the user entered a street address, a city, and a state. The GMS receives the search criteria, determines the network data and geospatial data corresponding to the search criteria, and transmits the network data and the geospatial data to the user. A map is generated to the user in the GNDIO panel 904. The map displays the network elements and the geographic elements within a search range of the search criteria. The search range can be predetermined or set on a user-by-user basis.

In the example of FIG. 10, the map centers at the geocode of the address entered as the search criteria. The map identifies cells, such as the cell 1002, trouble tickets, such as the trouble ticket 1004, known trouble areas, such as the known trouble area 1006 (i.e. a user or engineer defined trouble area), a customer defined trouble area (CDTA) 1008 streets, such as the street 1010, and streams, such as the stream 1012.

A zoom 1014 and a legend 1016 also are displayed to the user. The zoom 1014 allows a user to zoom into, or zoom out of, the map area displayed to the user. The legend has legend components that identify network elements and geographic elements. In the example of FIG. 10, the network elements can be color-coded so that a user may know a status of the network elements quickly by viewing their color. In addition, any of the areas of the map displayed to the user can be color-coded so that a user may quickly identify the status of the network coverage of the area. In addition, other network data can be displayed and color-coded. For example, the trouble tickets can be color-coded so the status or a problem associated with a trouble ticket is quickly known.

The legend displayed to the user can vary based upon a user profile and layers selected for each user (See FIG. 28.) Layers may include CDTA, engineering defined trouble areas (also referred to as user defined trouble areas or known trouble areas), engineering designed coverage, future cell sites, lakes and rivers, MTAs, marketing defined coverage, network events, parks and recreational areas, trouble tickets, and other layers. For example, if the trouble ticket layer is not enabled, the identification and color-coding of trouble tickets will not be displayed in the legend. Moreover, the trouble tickets will not be displayed on the map or in the NDO.

In the example of FIG. 10, the legend 1016 comprises legend components for network cell status for on air, outage within seventy-two hours, current outage, and future site, coverage for excellent, very good, good, average, and poor, known trouble areas, customer defined trouble areas, and trouble tickets for blocked, dropped, fast busy, unspecified, and closed. Any number or units of time or units for coverage may be used, such as twenty four hours or degrees of coverage. Different, greater, or fewer legend components may be displayed.

When the map is generated to the user, network data for the network elements is populated. For example, network data for cells and for trouble tickets is populated when a map is generated. The system can be configured to default on selected navigation tabs based on a user selection.

In the example of FIG. 10, a list of cells with a color-coded cell status in a search range of 5.0 km or 0.045 degrees is displayed to the user in the cells tab of the NDO panel. In addition, the latitude and longitude of the address entered as the search criteria, the cells, the cell identifiers, and the color-coded status of each cell are displayed. It will be appreciated that other search ranges may be used.

Figure 11:
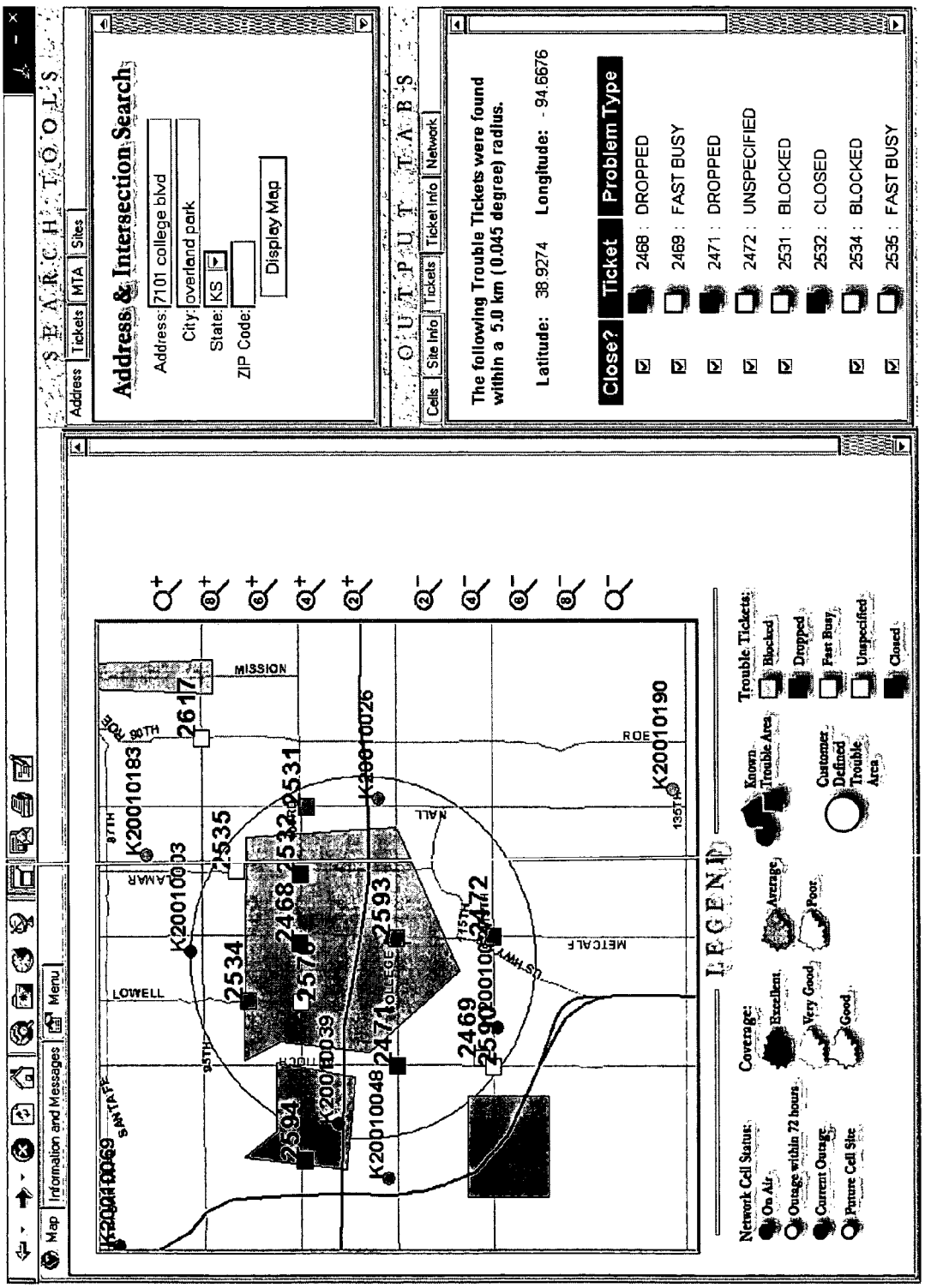
FIG. 11 is a screen view of a screen in accordance with an embodiment of the present invention.

FIG. 11 depicts an example of the tickets tab of the NDO. The tickets tab displays the range of 5.0 km (0.045 degrees) radius. In addition, the latitude and longitude correspondent to the search criteria is displayed. The ticket tab displays the network data associated with the trouble tickets within the range. The trouble tickets are listed along with the ticket identifier, a color-coded ticket status, and the problem type, such as dropped, fast busy, blocked, closed, or unspecified. A user may select a check box to close the ticket if the ticket is not already closed.

Figure 12:
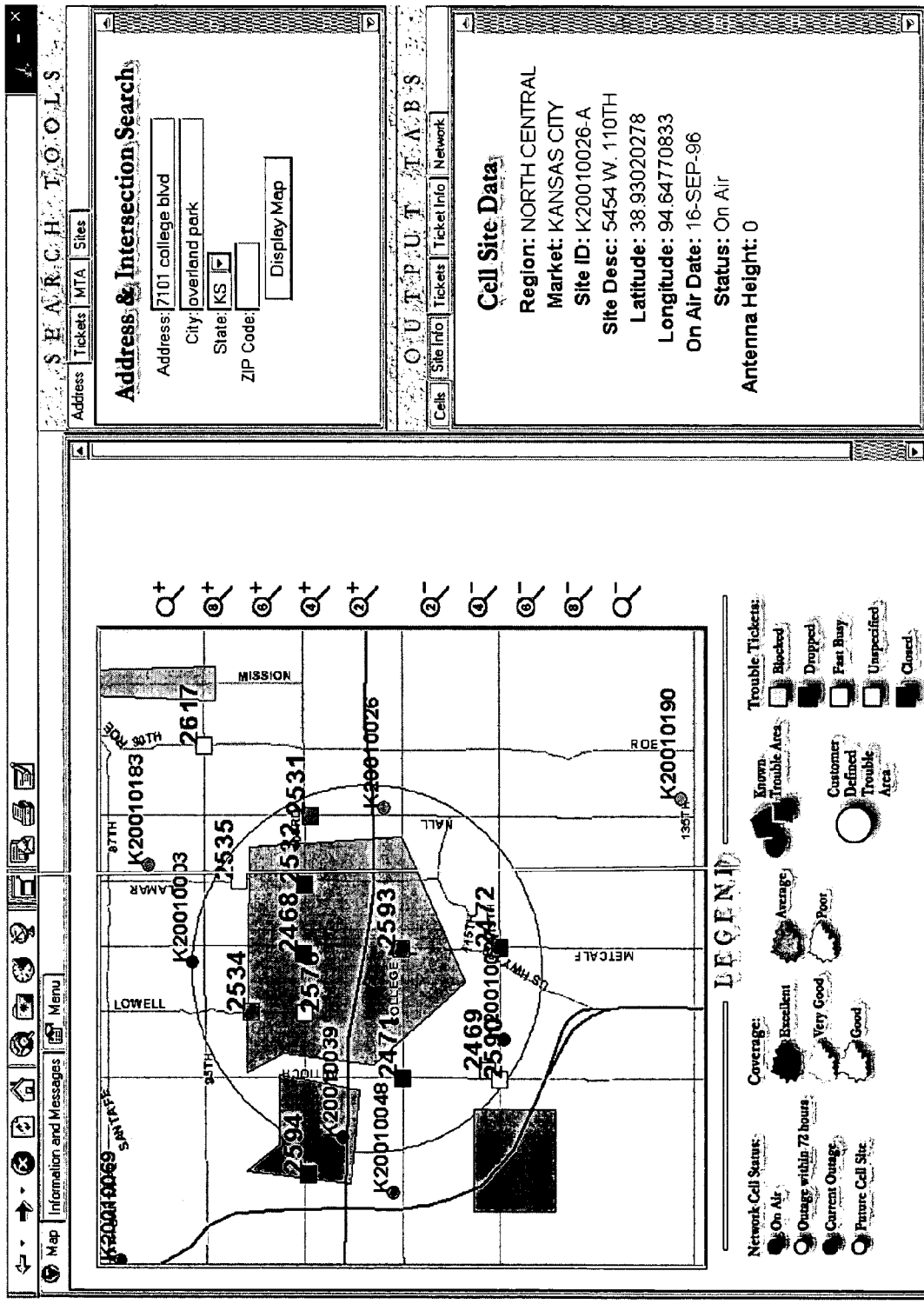
FIG. 12 is a screen view of a screen in accordance with an embodiment of the present invention.

FIG. 12 depicts an example of site information displayed to a user. A user can view the site information for any cell site by clicking on the cell site displayed in the map. This causes the GMS to transmit the network data to the user for viewing. For example, the site information may comprise a region, a market, a site identification (ID), a site description (Desc), a latitude of the cell site, a longitude of the cell site, an on air date of the cell site, a cell site status, and/or an antenna height. The site information is populated with the network data when the user selects the cell site from the map.

Figure 13:
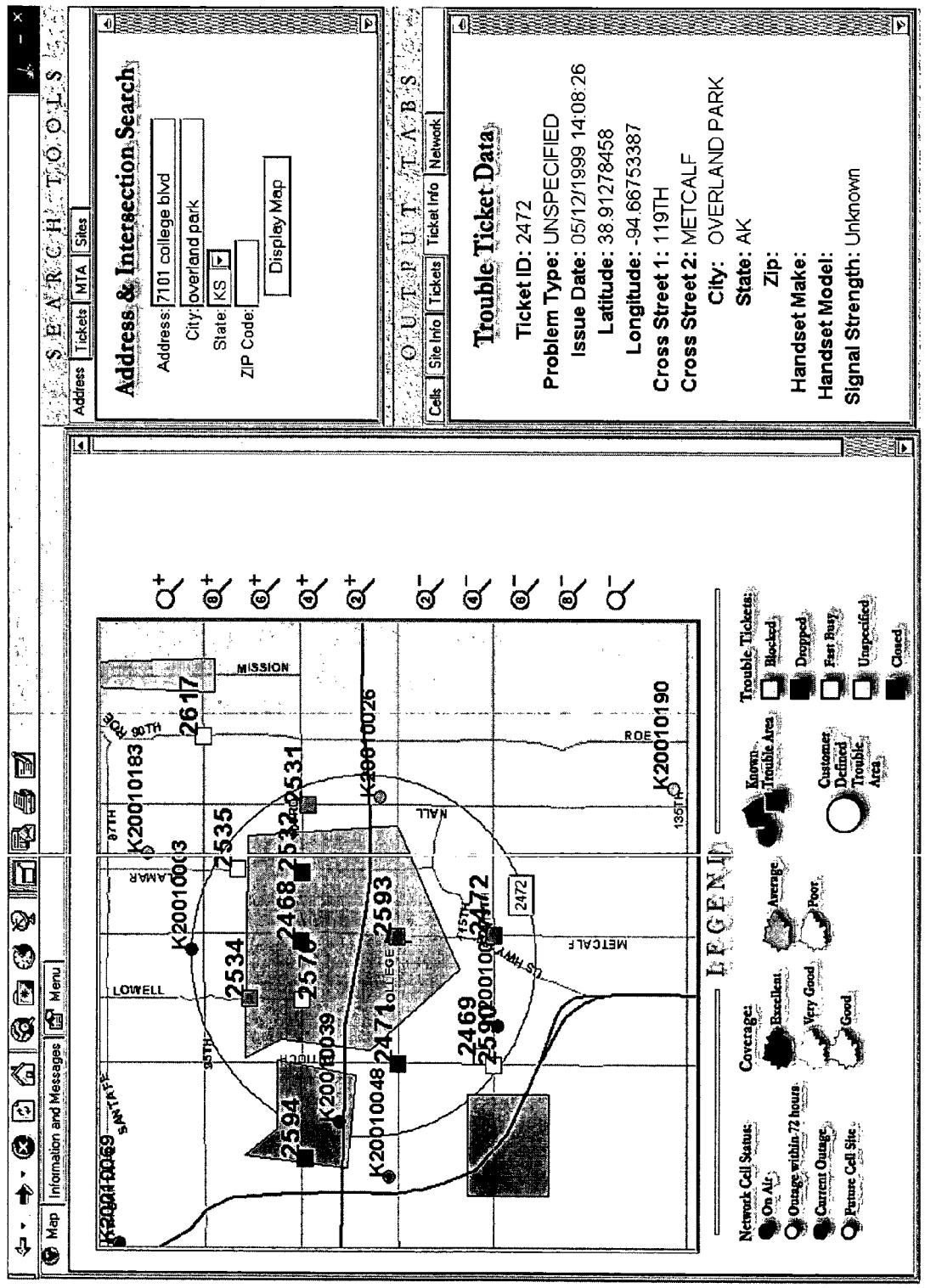
FIG. 13 is a screen view of a screen in accordance with an embodiment of the present invention.

FIG. 13 depicts an example of trouble ticket data displayed to a user. A user can view trouble ticket data for a particular trouble ticket by clicking on the trouble ticket in the map. This initiates an action to populate the network data for the selected trouble ticket. The trouble ticket data may include a ticket identification (ID), a problem type issue date, a latitude of the trouble ticket, a longitude of the trouble ticket, one or more cross streets, a city, a state, a zip code, a signal strength of the call, and/or an identification of the phone used by a customer.

Figure 14:
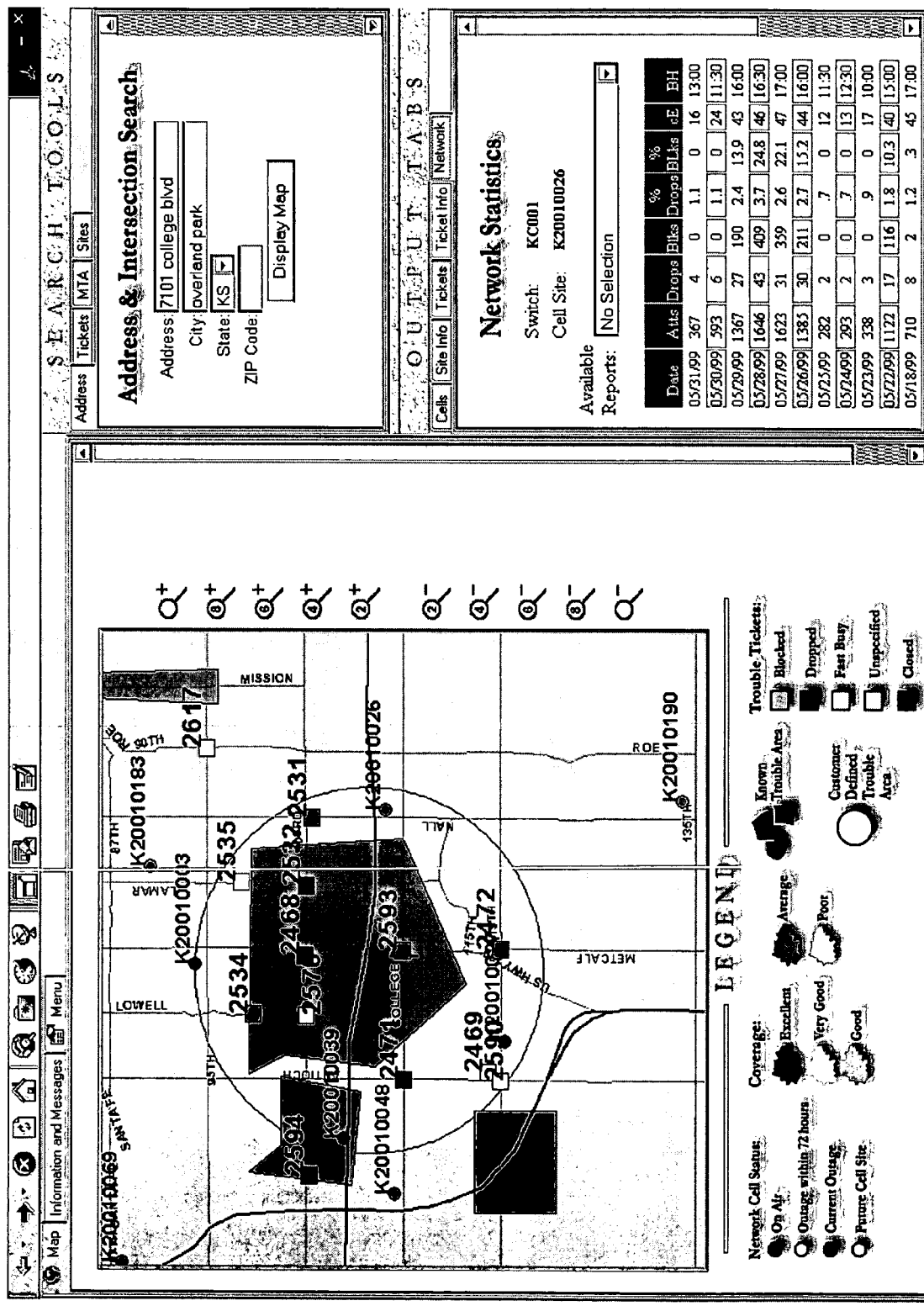
FIG. 14 is a screen view of a screen in accordance with an embodiment of the present invention.

FIG. 14 depicts an example of network data displayed to a user for network's statistics. A user may view the network statistics of a network element by clicking on the network element on the map. As explained above, this action initiates population of network data for the site information tab. The GMS can be configured to initially display information in the site information tab or in the network information tab. The user then may switch between the two tabs. In the example of FIG. 14, network statistics for a selected cell are displayed. The network data displayed in the network statistics tab may comprise the identification of the switch associated with the cell site, identification of the cell site, and network statistics for the selected cell site, including the date of a network event, attempts, drops, blocks, percent drops, percent blocks, channel erlang (cE), and busy hour (BH) for a call. A user may view reports of network statistics by making a selection from the available reports select box.

Figure 15:
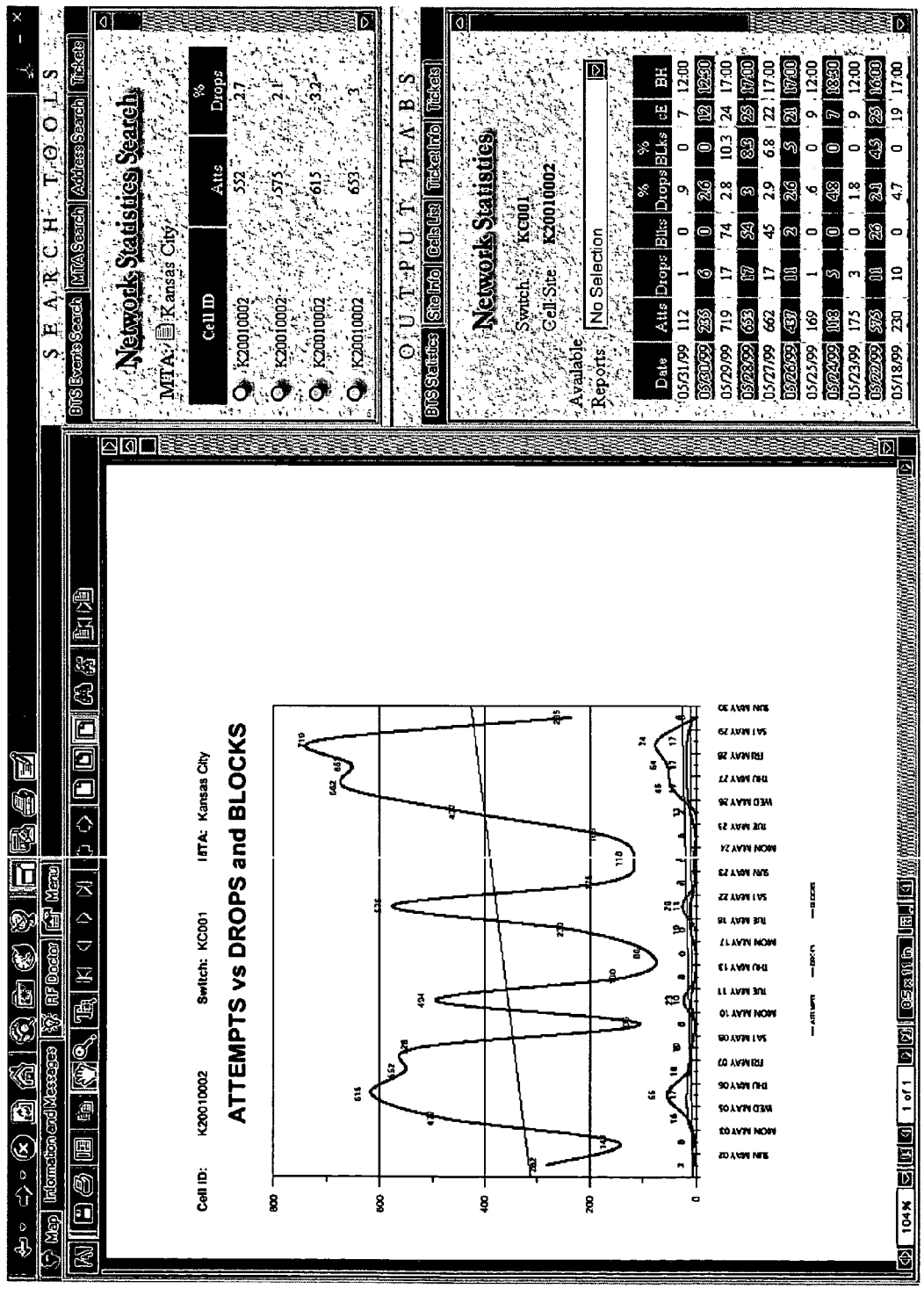
FIG. 15 is a screen view of a screen in accordance with an embodiment of the present invention.

FIG. 15 depicts an example of a report that can be displayed to a user identifying network statistics. In the example of FIG. 15, a report graphically identifies call attempts versus call drops and call blocks. Other reports are available to illustrate any of the network statistics.

Figure 16:
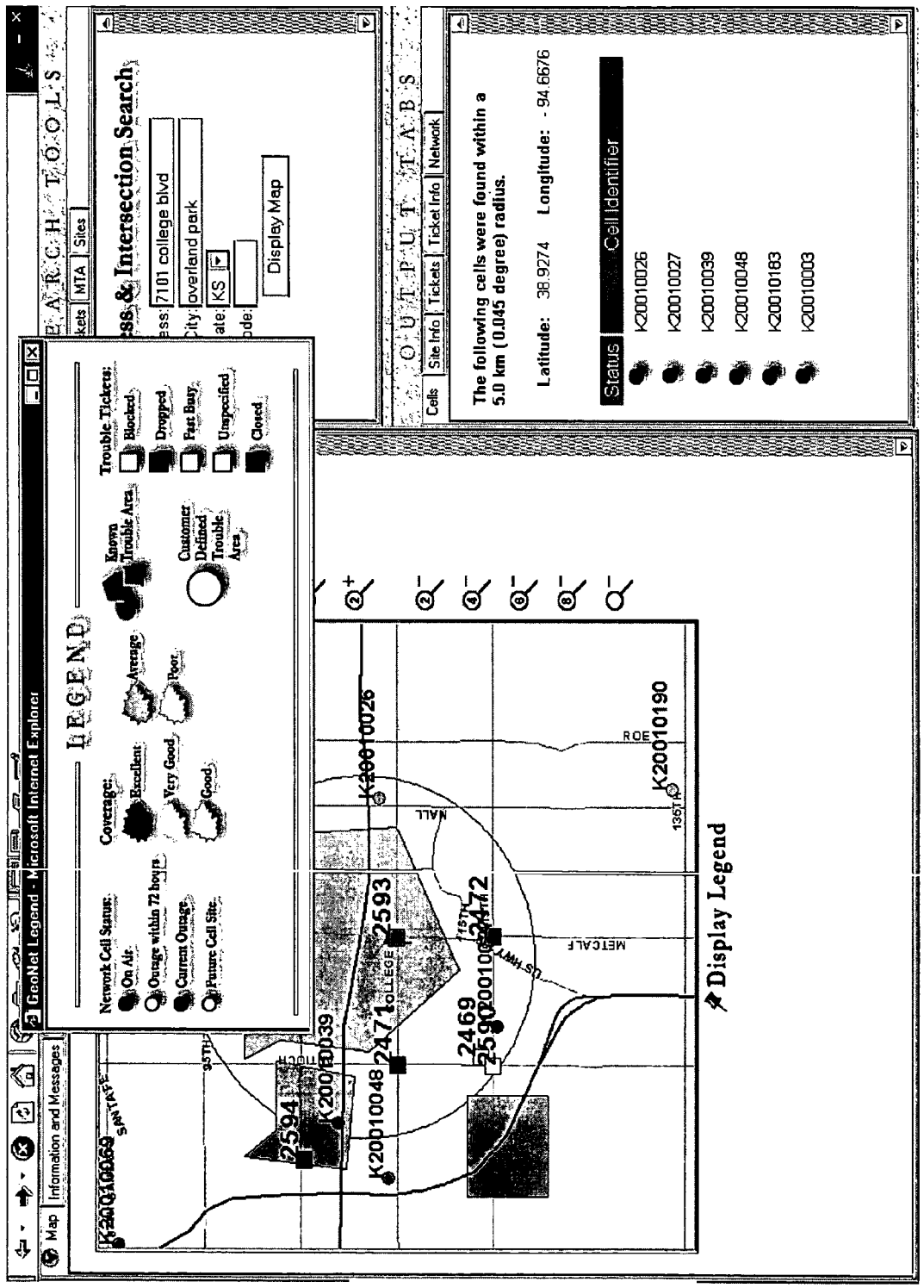
FIG. 16 is a screen view of a screen in accordance with an embodiment of the present invention.

FIG. 16 depicts an example of a screen in which the legend may be removed from the screen. A user may toggle between displaying the legend and not displaying the legend. If the legend is not displayed, a select button will be displayed in its place. A user may select the display legend button to view the legend on the screen.

Figure 17:
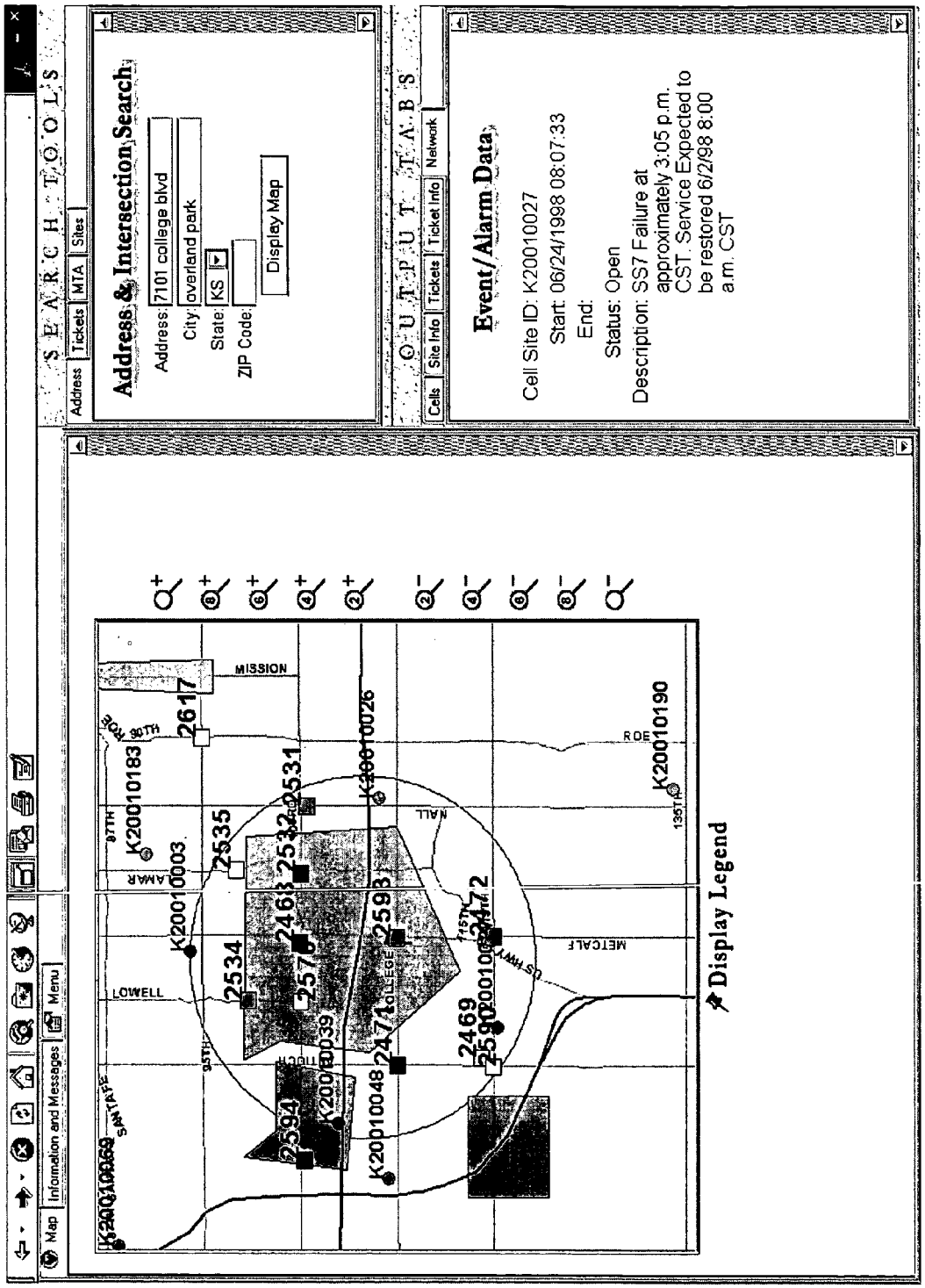
FIG. 17 is a screen view of a screen in accordance with an embodiment of the present invention.

FIG. 17 depicts an example of event/alarm data displayed to a user. The GMS can be configured to display network statistic data or event/alarm data on the network tab. For example, if the layer for the network events is enabled (see FIG. 28), then the event/alarm data will be displayed on the network tab. If the network events layer is not enabled, then the network statistics data will be displayed on the network tab. Other configurations may be used. Also, an additional tab may be added to the NDO for simultaneously viewing the event/alarm data and the network statistics data. Alternately, the network statistics data and the event/alarm data may be viewed simultaneously in the network tab.

In the example of FIG. 17, event/alarm data is displayed. The event/alarm data may comprise any network data to display events, alarms, or network statistics. The event/alarm data of FIG. 17 comprises the cell site identification (ID), the start of the event or alarm, the end of the event or alarm, the status of the cell site, and a description of the event or alarm.

Figure 18:
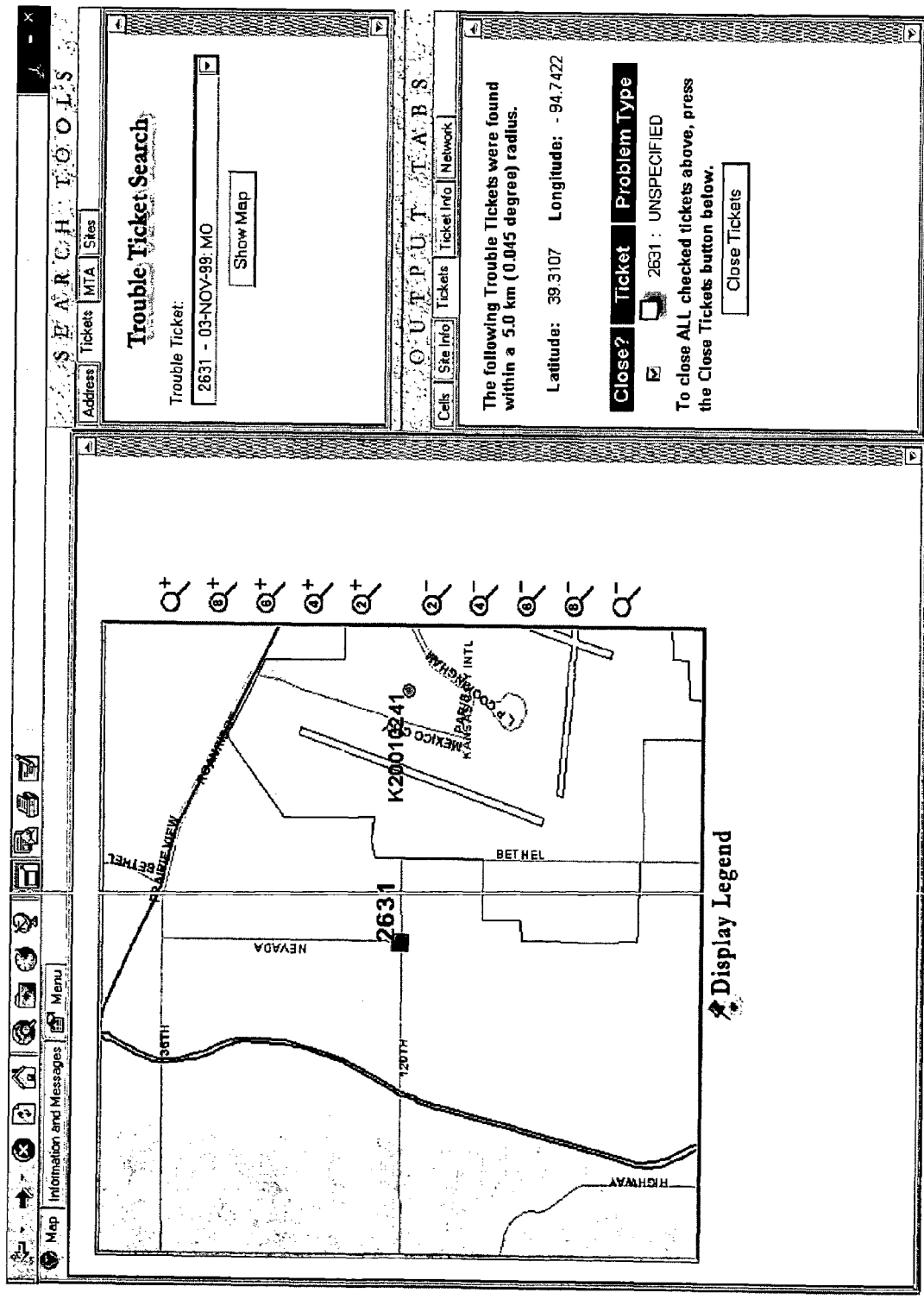
FIG. 18 is a screen view of a screen in accordance with an embodiment of the present invention.

FIG. 18 depicts an example of a trouble ticket entered as a search criteria. The trouble ticket may be entered or a trouble ticket may be selected from the select box. After the user has entered the trouble ticket data, the user may display a map showing network elements and geographic elements within a range of the trouble ticket search criteria. The user initiates this action by selecting the Show Map button. A map is generated in which the trouble ticket is centered in the map area. In addition, the NDO defaults to a display for the tickets tab, as described above.

Figure 19:
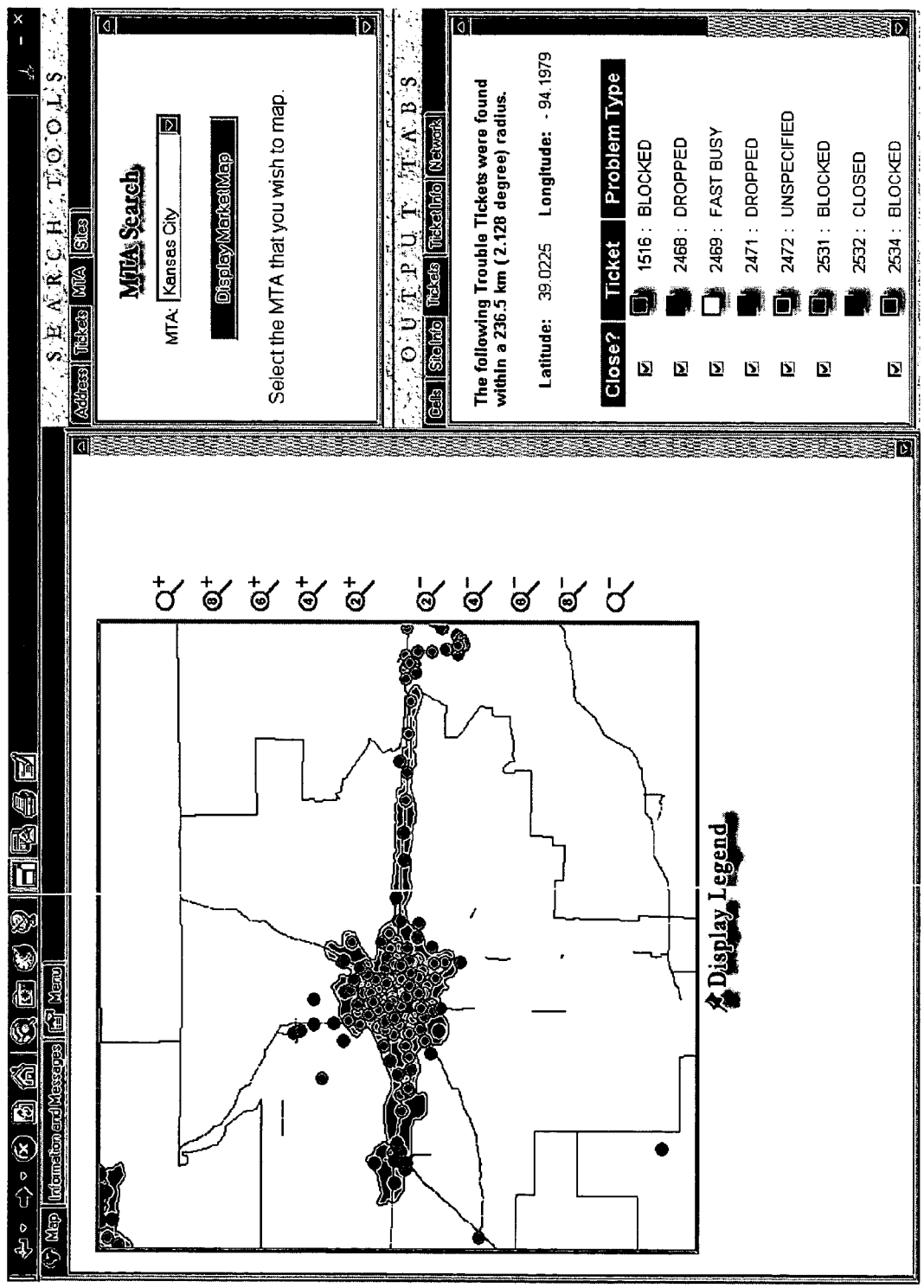
FIG. 19 is a screen view of a screen in accordance with an embodiment of the present invention.

FIG. 19 depicts an example of a search criteria for an MTA search. The user can enter an MTA or select an MTA from the select box. The user initiates the search by selecting a Display Market Map button. A map identifying the network elements within the selected MTA is generated. In addition, the GMS can be configured to default to display the tickets tab in the NDO. The tickets tab shall display the appropriate search range for the map. In this example, a search range of 236.5 km (2.128°) radius is displayed.

Figure 20:
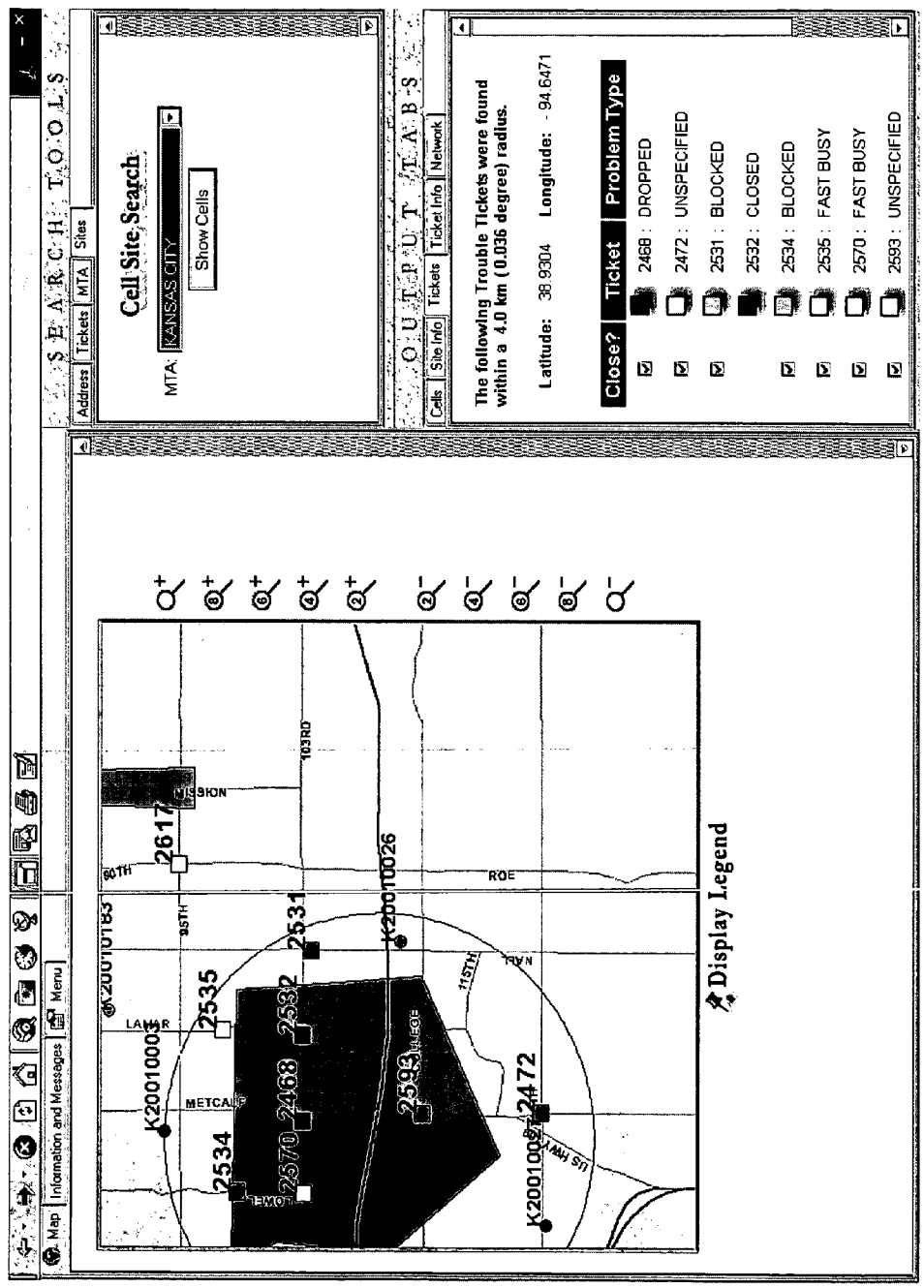
FIG. 20 is a screen view of a screen in accordance with an embodiment of the present invention.

FIG. 20 depicts an example of a search criteria using a cell site search. In this example, the cell site search may comprise initially searching by an MTA and then searching by a list of cells. A user first can enter an MTA. A list of cells is displayed in the STDE by selecting the Show Cells button. A user can select one of the cells from the list, and a map is generated in which the selected cell is displayed in the center of the map. The map displays all network elements and geographic elements within a search range. In this example, the NDO is configured to default to the Tickets tab. However, the NDO can be configured to default to another tab, such as the Site Info tab or the Cells tab. In addition, the STDE can be configured for a different type of entry.

Figure 21:
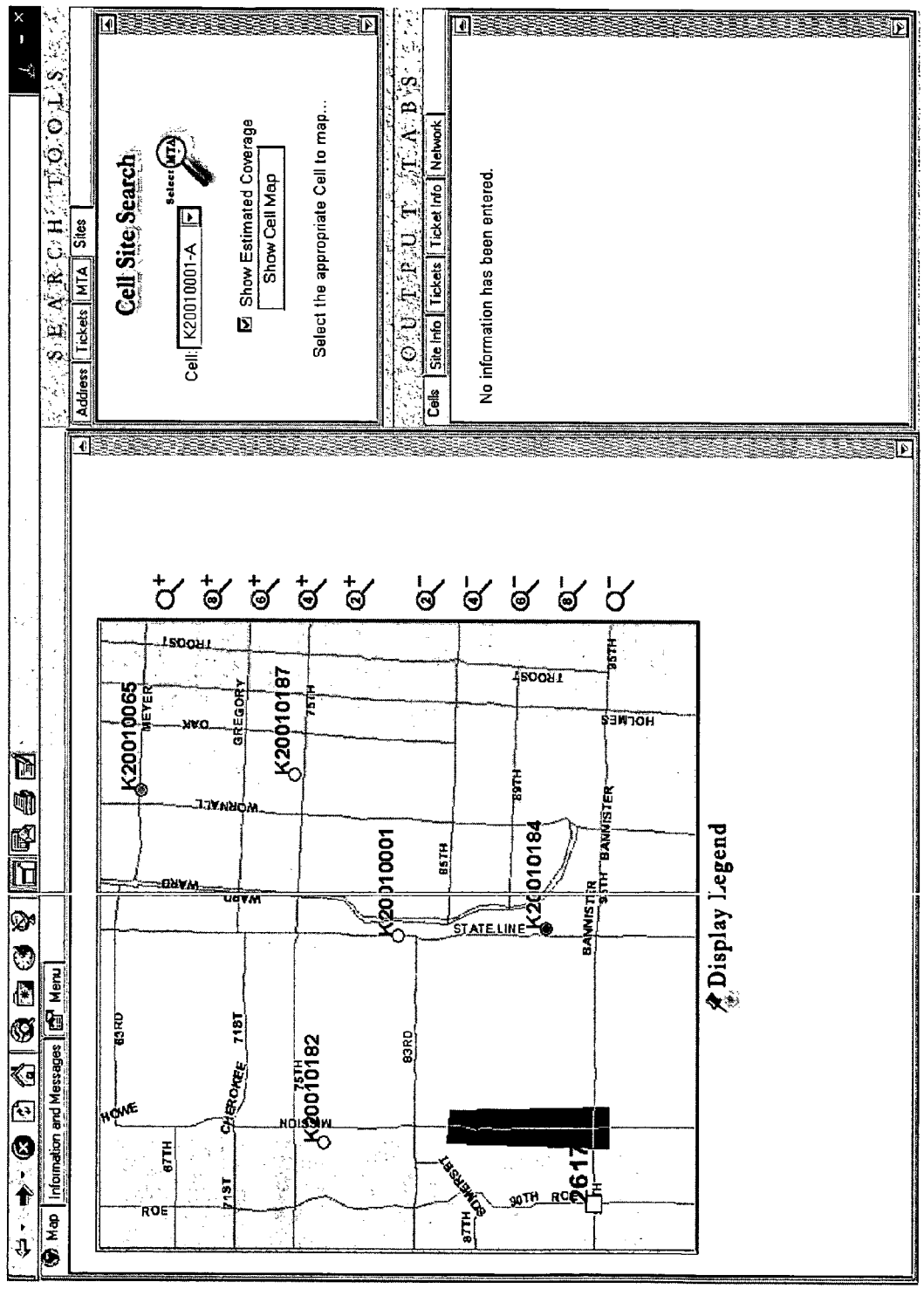
FIG. 21 is a screen view of a screen in accordance with an embodiment of the present invention.

FIG. 21 depicts an example of a screen used to enter the cell site only as a search criteria. The user can enter a cell site or select a cell from the select box. A map is generated in which the map center is the selected cell site.

Figure 22A:
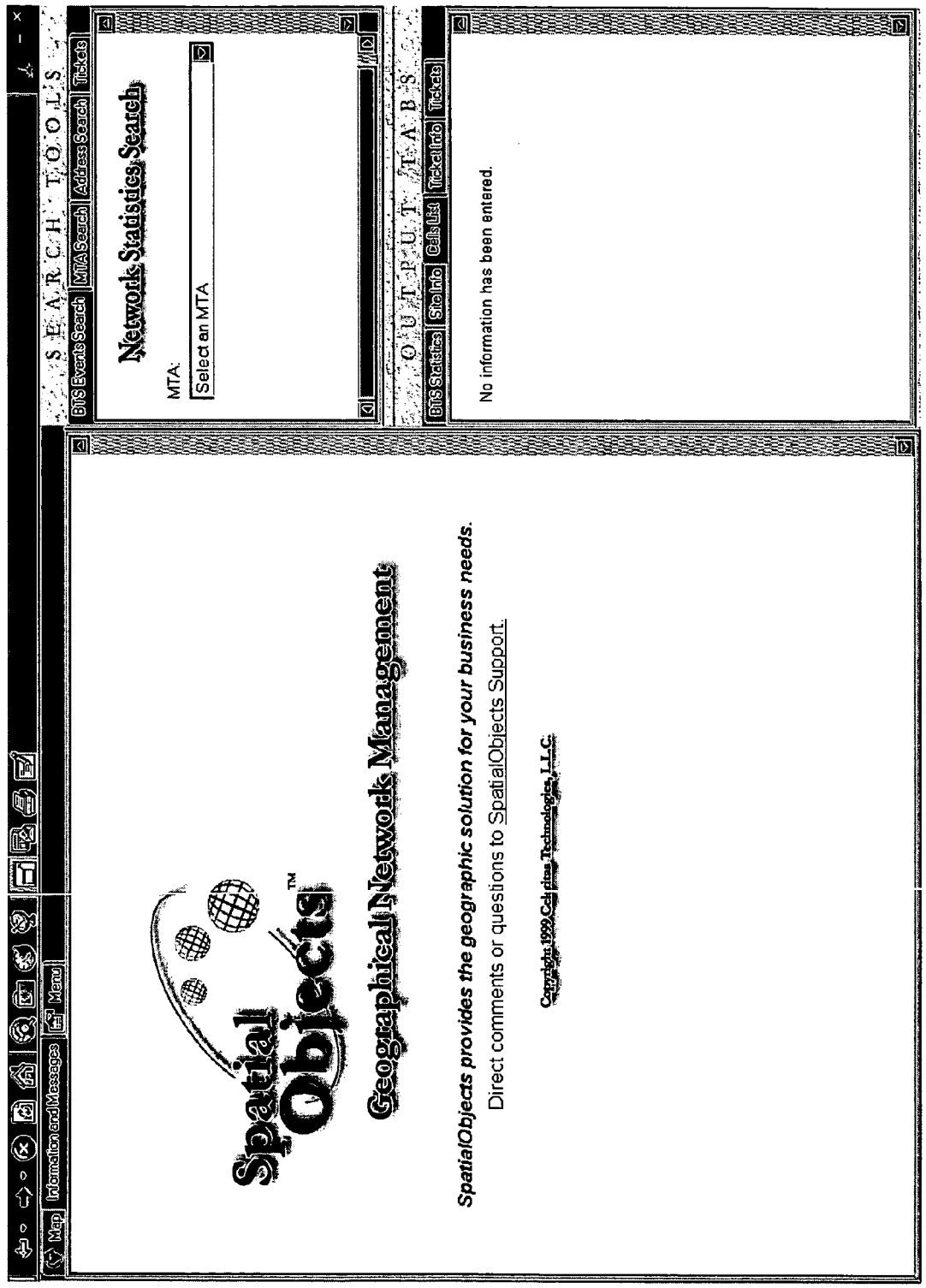
FIG. 22A is a screen view of a screen in accordance with an embodiment of the present invention.
Figure 22B:
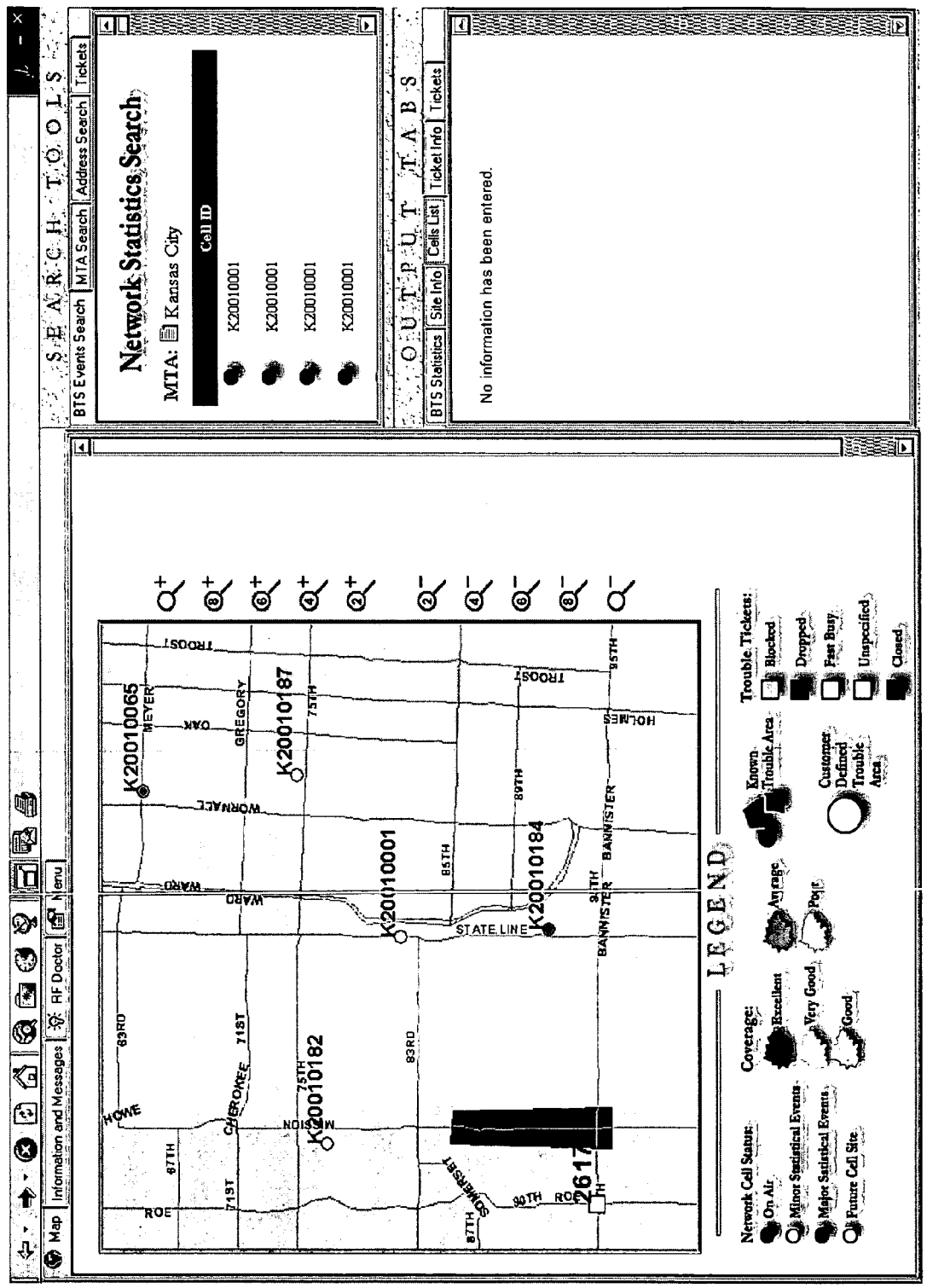
FIG. 22B is a screen view of a screen in accordance with an embodiment of the present invention.
Figure 23:
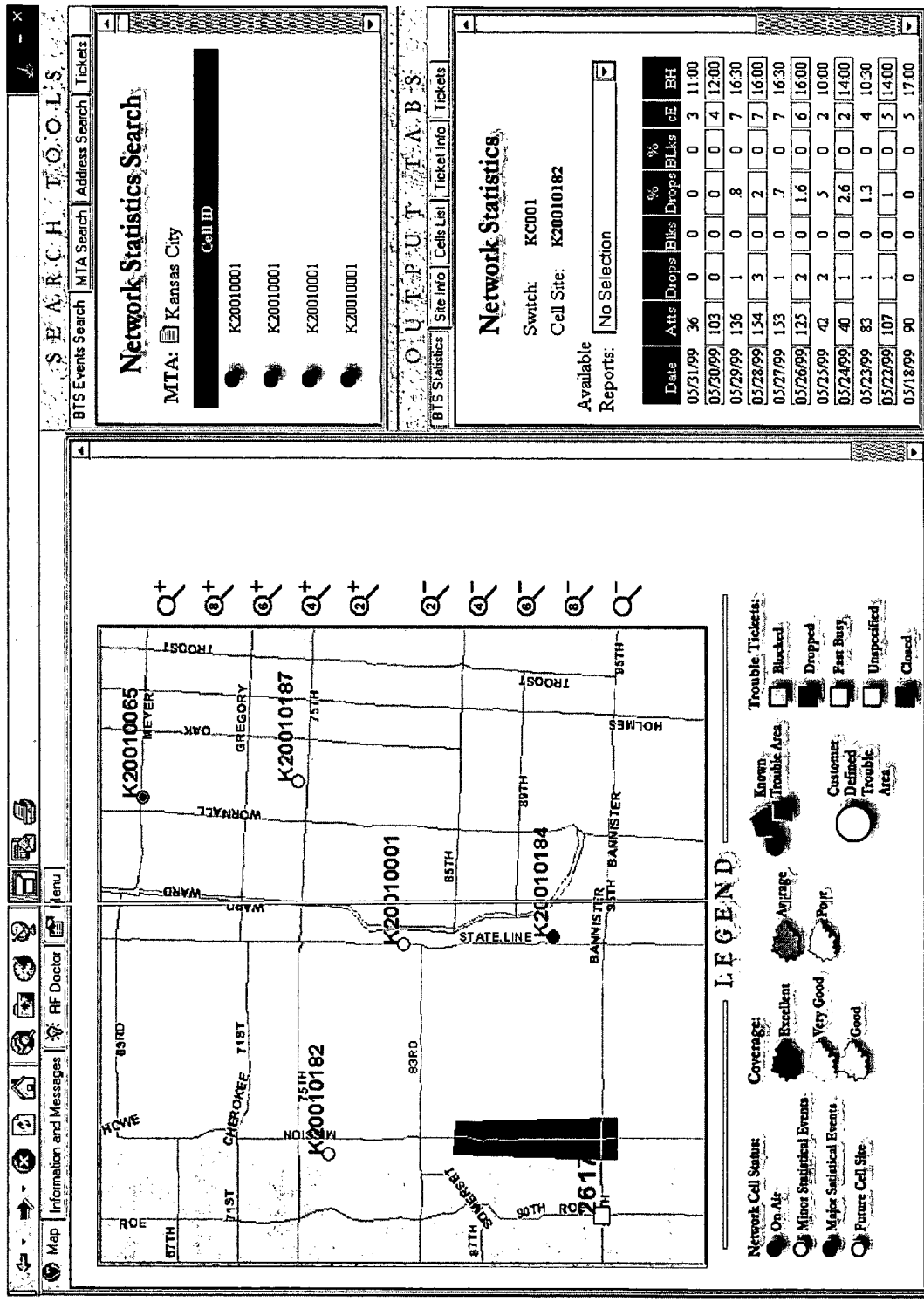
FIG. 23 is a screen view of a screen in accordance with an embodiment of the present invention.

FIGS. 22A, 22B, and 23 depict examples of providing BTS events as a search criteria. A map is generated in which the map center is the selected cell site with the BTS event. Network statistics are generated for the selected cell site in FIG. 23.

FIGS. 22A, 22B, and 23 also depict screens used to enter an MTA as a search criteria. In FIG. 22A, a user can select an MTA from a select box of a network statistic search for a BTS event search. Once the MTA is selected, a list of cells is displayed to the user in the STDE panel, as depicted in FIG. 22B. A cell can be selected from the STDE panel or selected from the map. When a cell is selected, as from the map, the system defaults to display the network statistics for the BTS statistics tab in the MDO.

Figure 24:
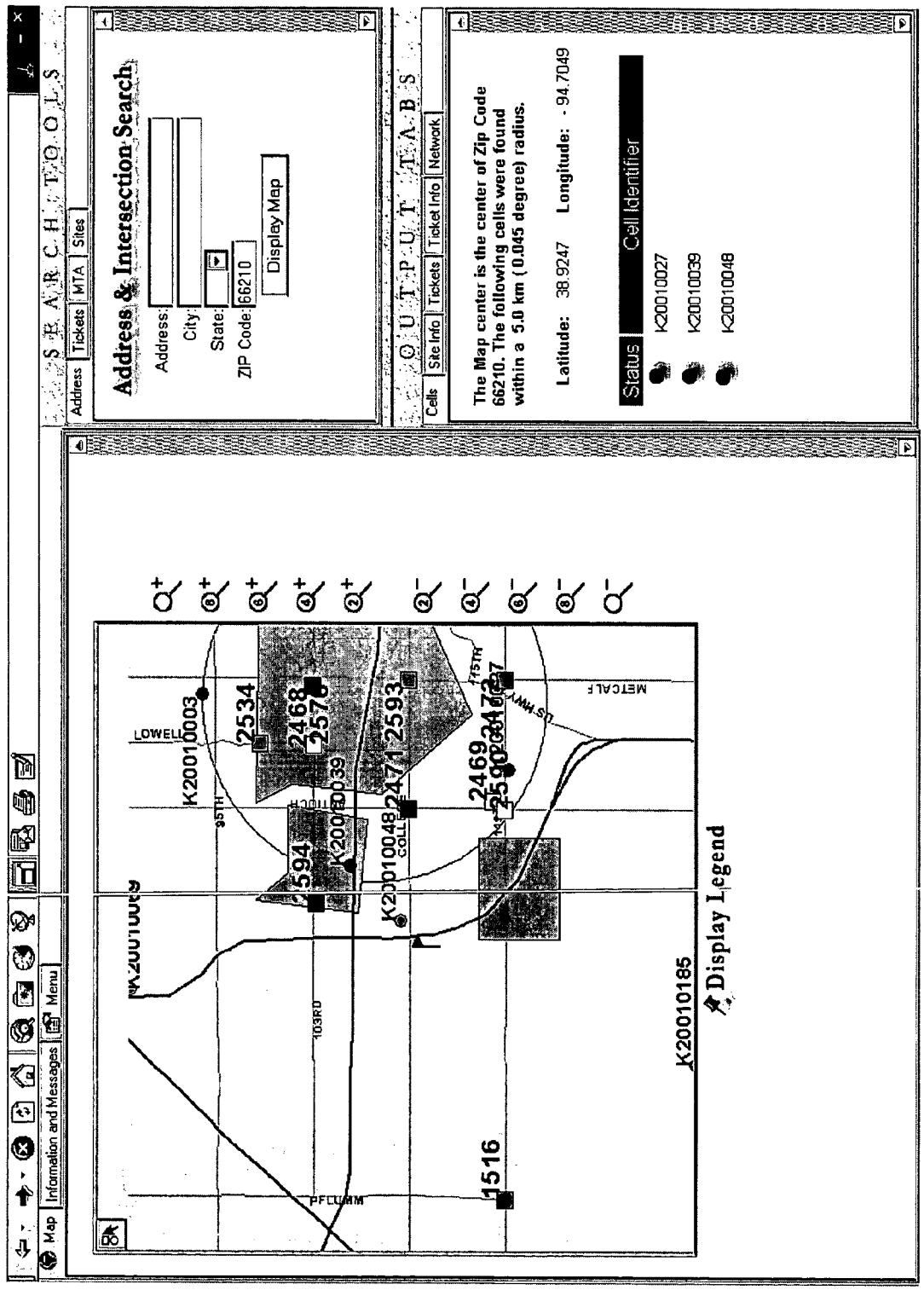
FIG. 24 is a screen view of a screen in accordance with an embodiment of the present invention.

FIG. 24 depicts an example of a screen used to enter a zip code for a search criteria. A map is generated in which the map center is the center of the zip code search criteria.

Figure 25:
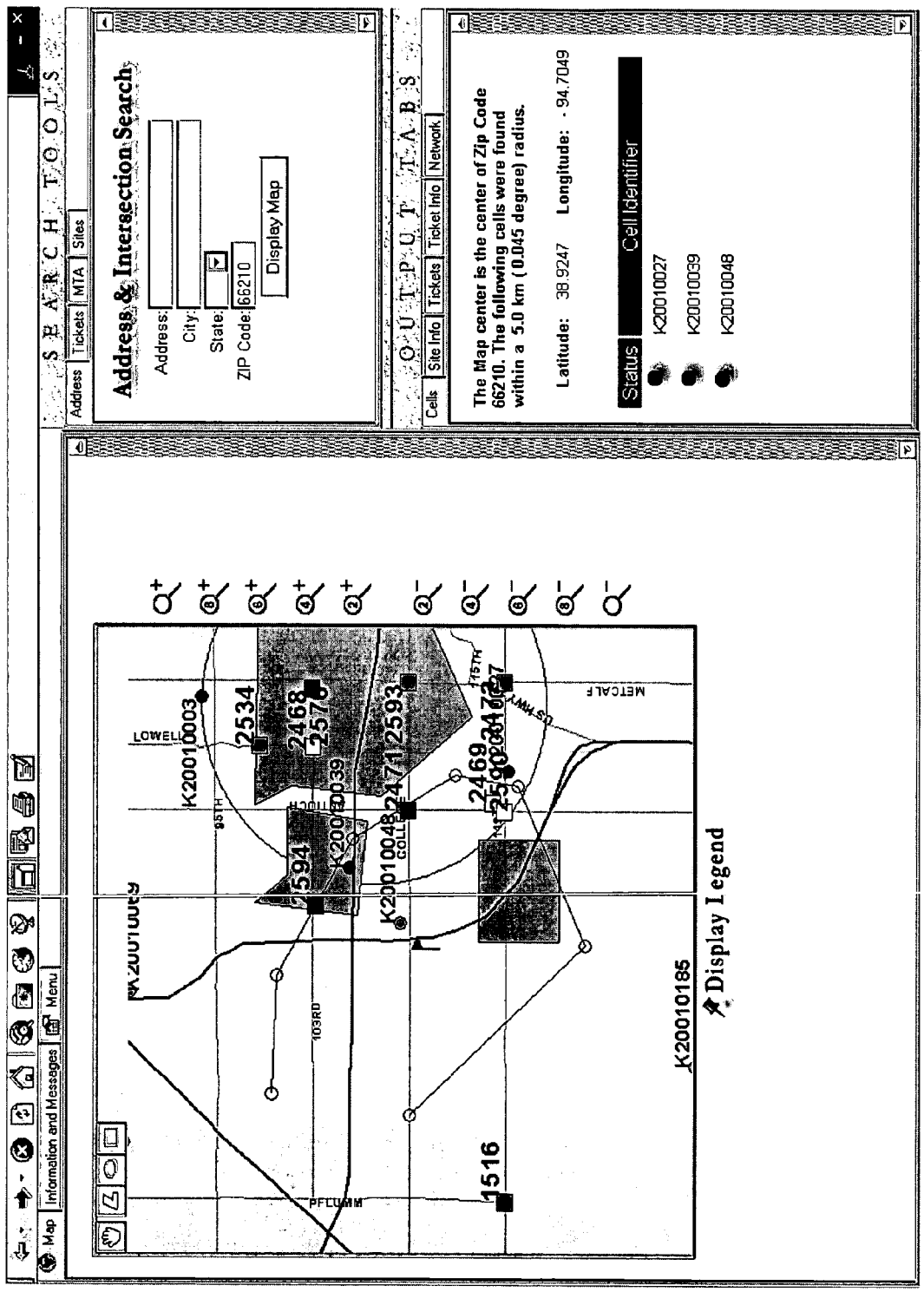
FIG. 25 is a screen view of a screen in accordance with an embodiment of the present invention.
Figure 26:
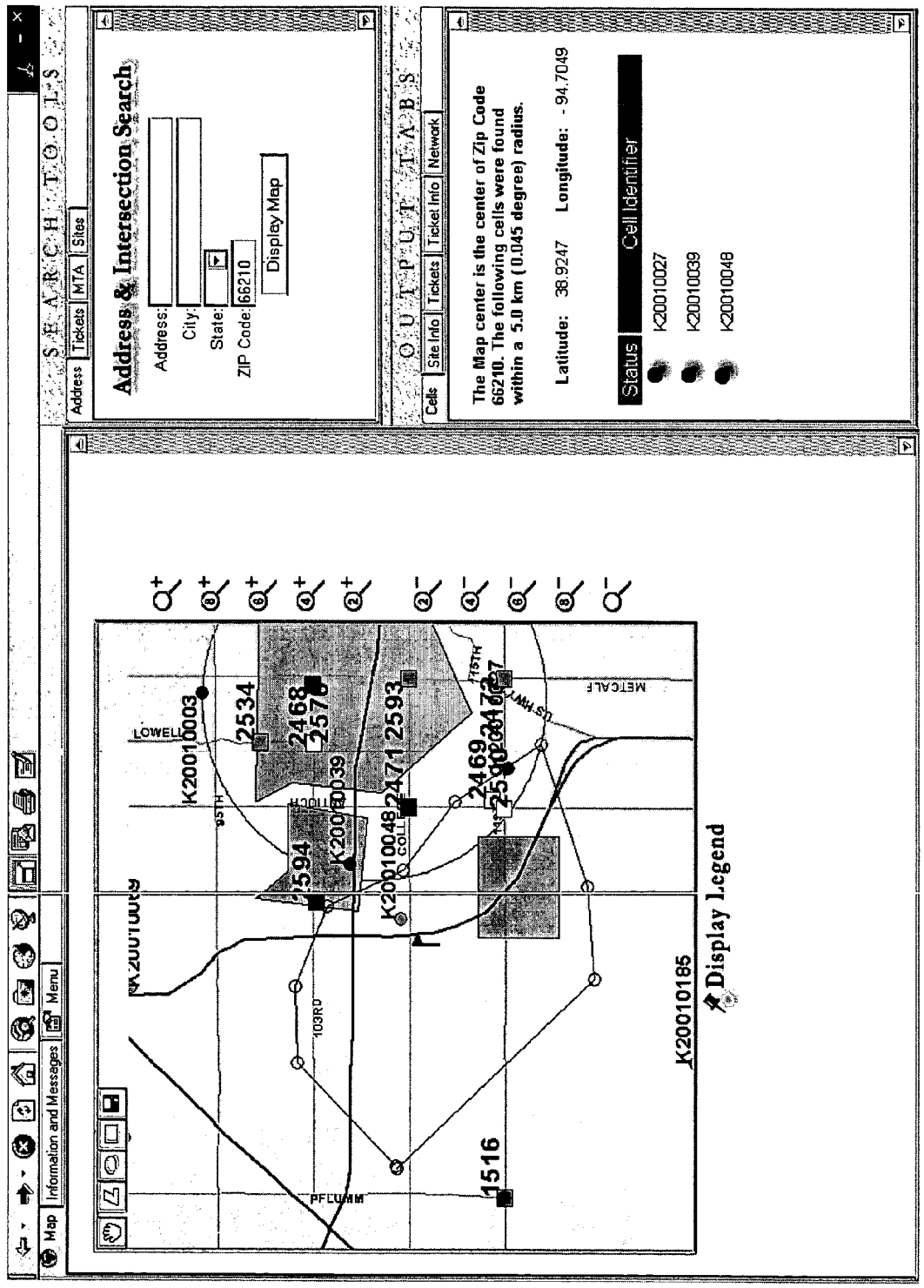
FIG. 26 is a screen view of a screen in accordance with an embodiment of the present invention.

FIGS. 25 and 26 depict an example of defining a trouble area. A user uses trouble area definition tools to define the trouble area. Multiple types of definition tools may be displayed. In the examples of FIGS. 25 and 26, selectable buttons for the definition tools are located in the upper portion of the map area and include a tool for defining a polygon of the area, a tool for defining a circular area, a tool for defining a square area, and a button to save the defined area. The definition tools also include a button to exit the design mode.

The design mode exit button of FIGS. 25 and 26 resembles a hand. The design mode exit button can be selected at any time during the trouble area definition process. If the design mode exit button is selected while the user is defining a trouble area, the trouble area will not be saved. If a user exits the design mode, a button will be displayed that, when selected, allows a user to enter the design mode. See, for example, FIG. 24.

Figure 27:
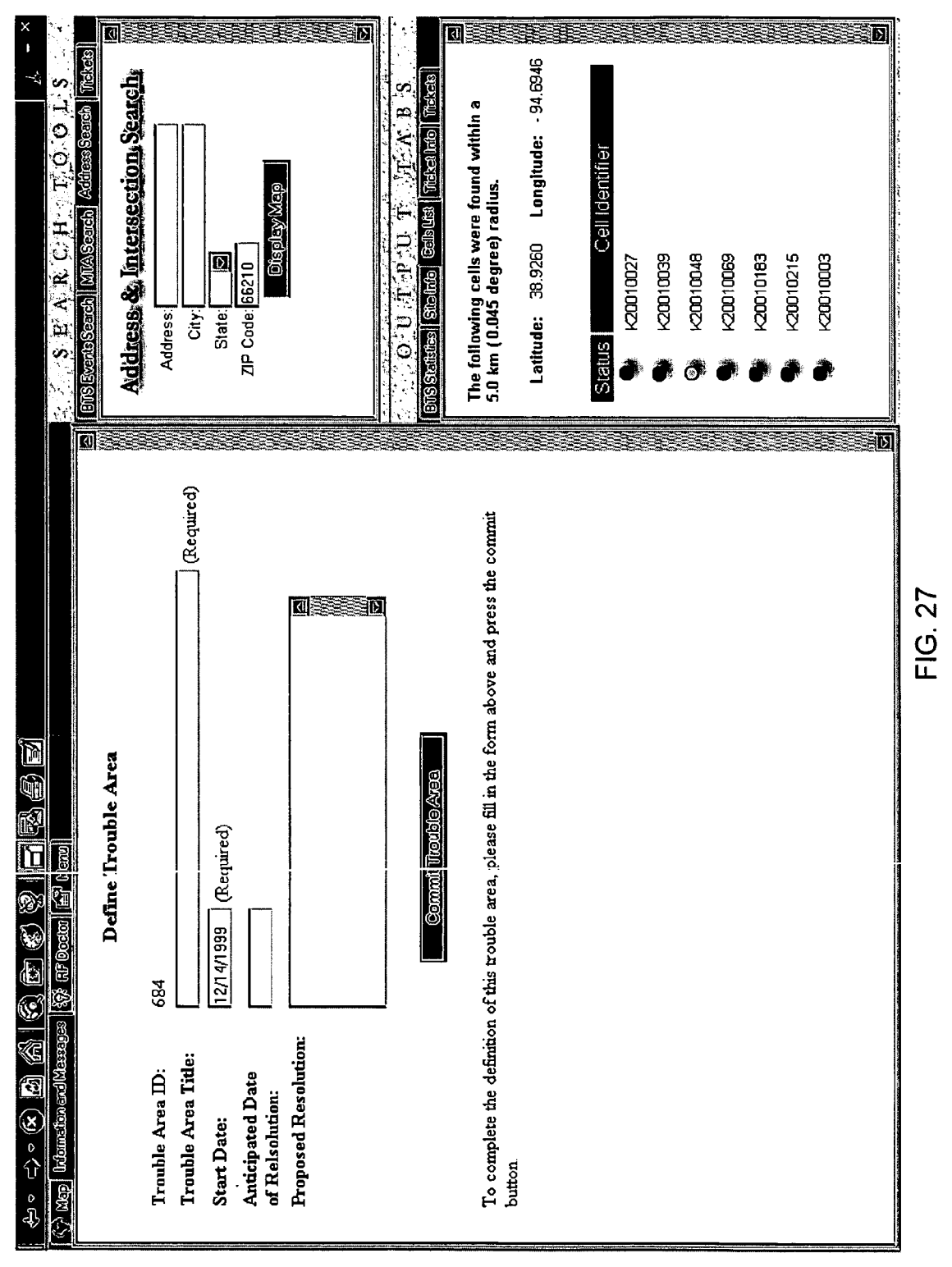

FIG. 27 depicts an example of a screen displayed to a user when the save button is selected during the design mode. This screen allows a user to enter a title for the trouble area, an anticipated date of resolution (DOR) for the problem or problems resulting in the trouble area, and a comment section for the proposed resolution. An identification, such as a number, is assigned to the trouble area. It will be appreciated that different, greater, or fewer data may be entered, and a different screen may be displayed to a user for data entry. Also, a GMS may be configured that will not display the trouble area definition screen, but merely save the trouble area once created. Moreover, other definition tools may be used.

FIG. 28 depicts an example of a trouble ticket entry utility. A user may enter identifying information for the trouble ticket, including the location of the call or caller and the problem experienced by the caller. The identifying information may include a cross-street or street address for the location of the caller experiencing the problem, a city, a state, a zip code, or a ticket problem type, such as dropped, blocked, fast busy, or unspecified. Other indicia may be included, such as a customer name, a customer email address, a customer text pager number, or a customer phone number. A ticket identification (ID) can be designated by the GMS or entered by a user. Once the ticket identifying information is entered, a user can initiate geocoding the ticket and associating known network data to the ticket, such as a neighboring cell site, by selecting a save button, such as the Geocode Ticket button. The information may be saved by committing the ticket.

Figure 29:
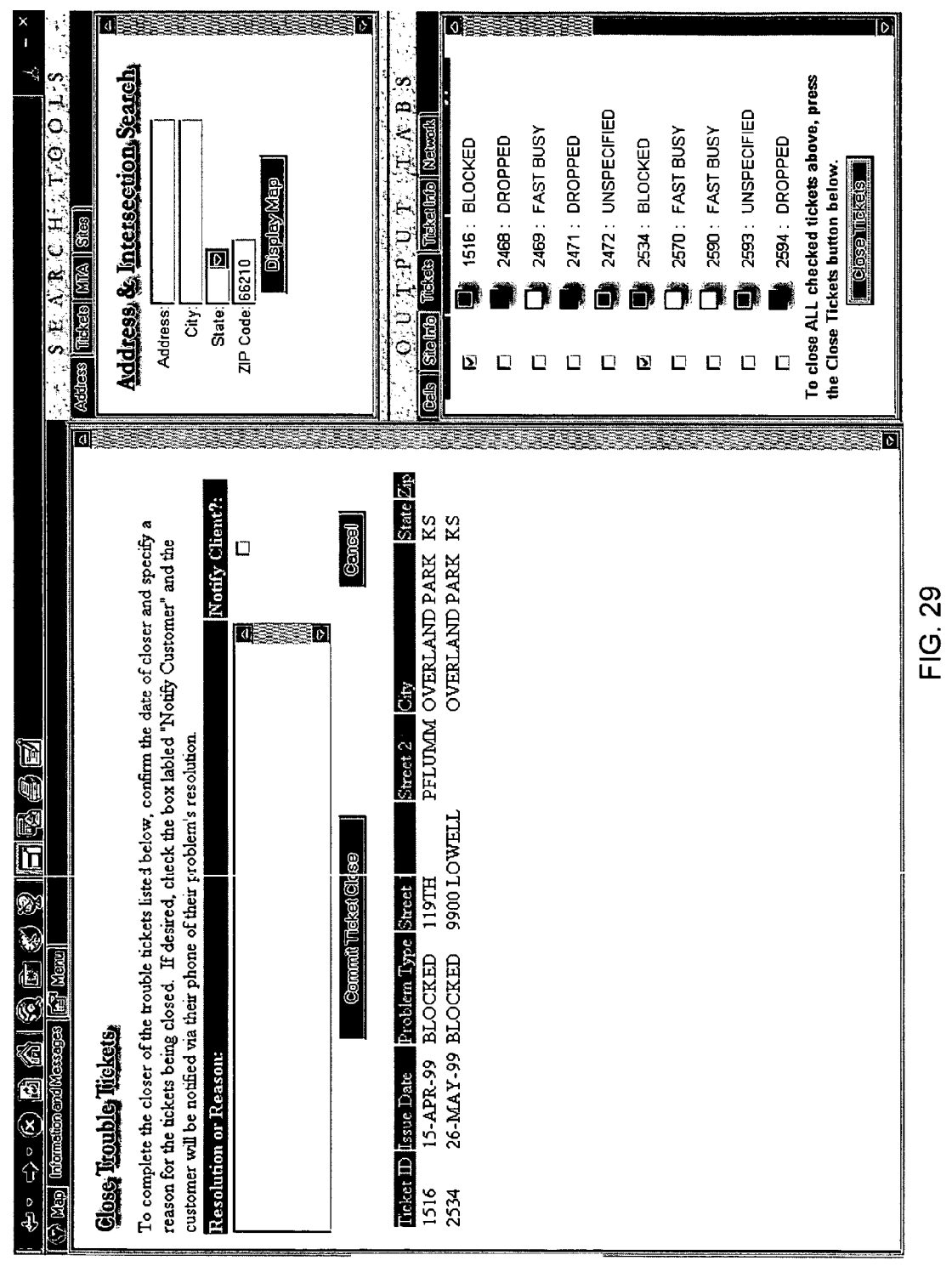

FIG. 29 depicts an example of a screen used to close multiple trouble tickets. In this example, a user selects a check box for each trouble ticket to be closed and selects the Close Tickets button to initiate the action. This action causes an entry box to be displayed in which a user can enter a resolution or reason for closing the ticket. The user also can choose to notify a client (i.e. the customer) sending an e-mail, a message to a text pager, an automated voice response message, a voice mail, or another type of message identifying the resolution. The user can finalize the ticket closing by selecting the Commit Ticket Close button.

Figure 30:
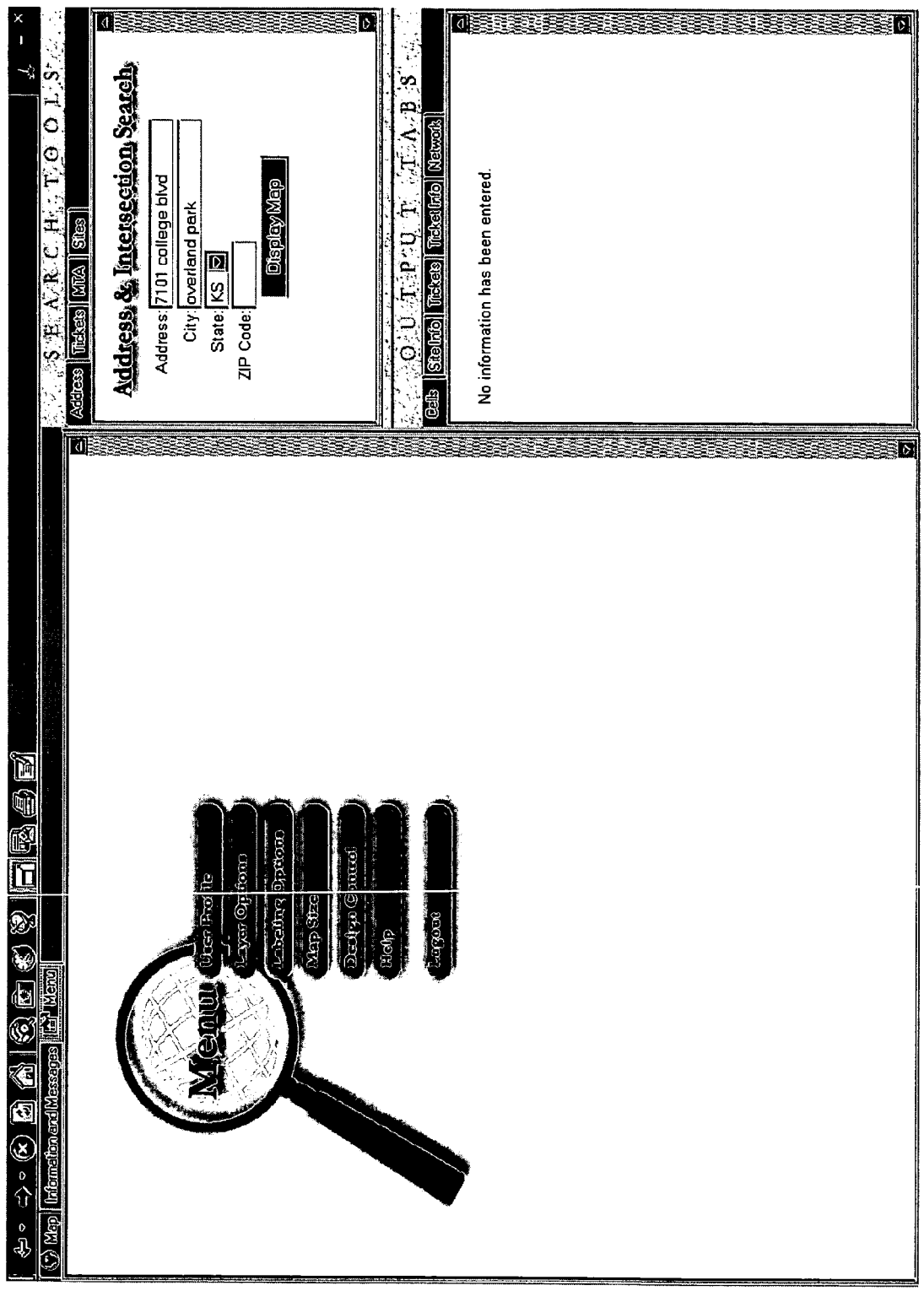
FIG. 30 is a screen view of a screen in accordance with an embodiment of the present invention.

FIG. 30 depicts an example of a menu that can be displayed to a user. Examples of some menu options include user profile to define the profile and options a user may have, layer options to select and define layer options for a user, labeling options to select and define labeling options for a user, map size, design control options, help options, and logout. Different, greater, or fewer menu options may be used.

Figure 31:
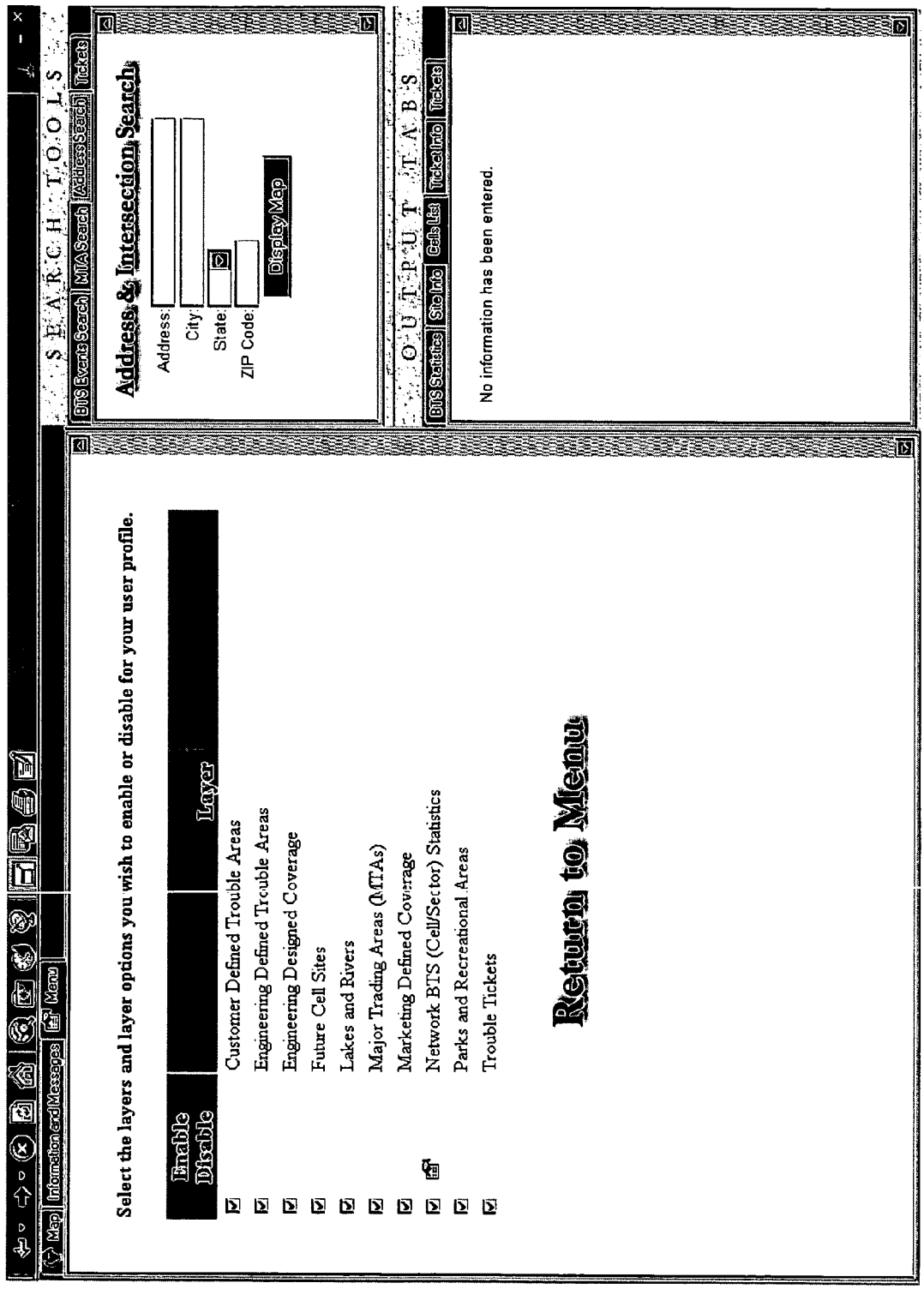
FIG. 31 is a screen view of a screen in accordance with an embodiment of the present invention.

FIG. 31 depicts an example of layer options that are available for users. Layer options may be enabled or disabled for individual users. For example, an engineer may have different selected layer options than a customer service person. Examples of layer options include customer defined trouble areas, engineering defined trouble areas, engineering designed coverage, future cell sites, lakes and rivers, MTAs, marketing defined coverage, network events or network statistics, parks and recreational areas, and trouble tickets.

Figure 32:
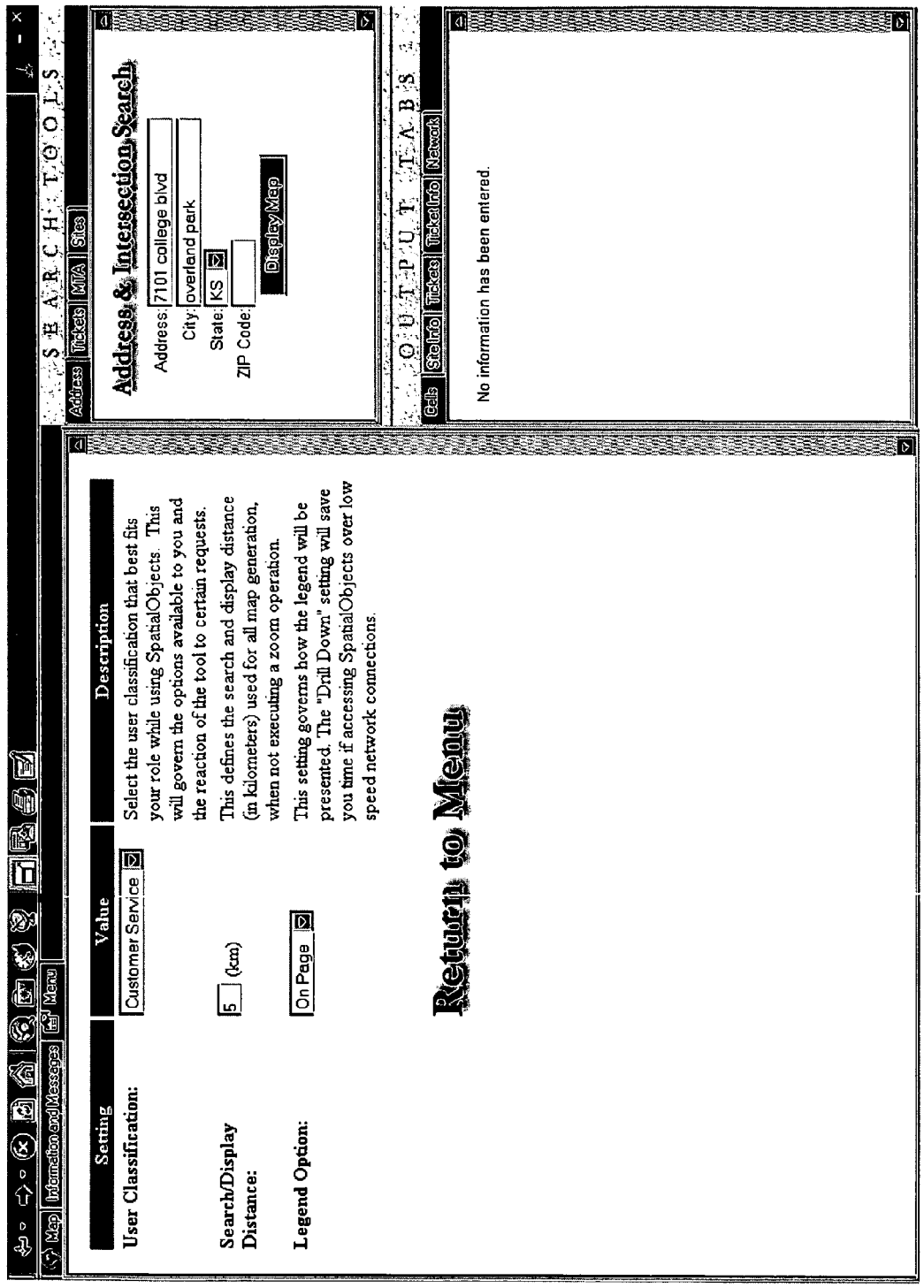
FIG. 32 is a screen view of a screen in accordance with an embodiment of the present invention.

FIG. 32 depicts an example of a screen used to define a user profile. In this example, a user may select options for a user classification, such as an engineer or a customer service person, a default for a search range around a search criteria for which a map will be generated and for which network elements and geographic elements will be identified, and an option to display the legend on the screen display, to not display the legend, or to display the Display Legend select button. Different, greater, or fewer user profile options may be used.

Figure 33:
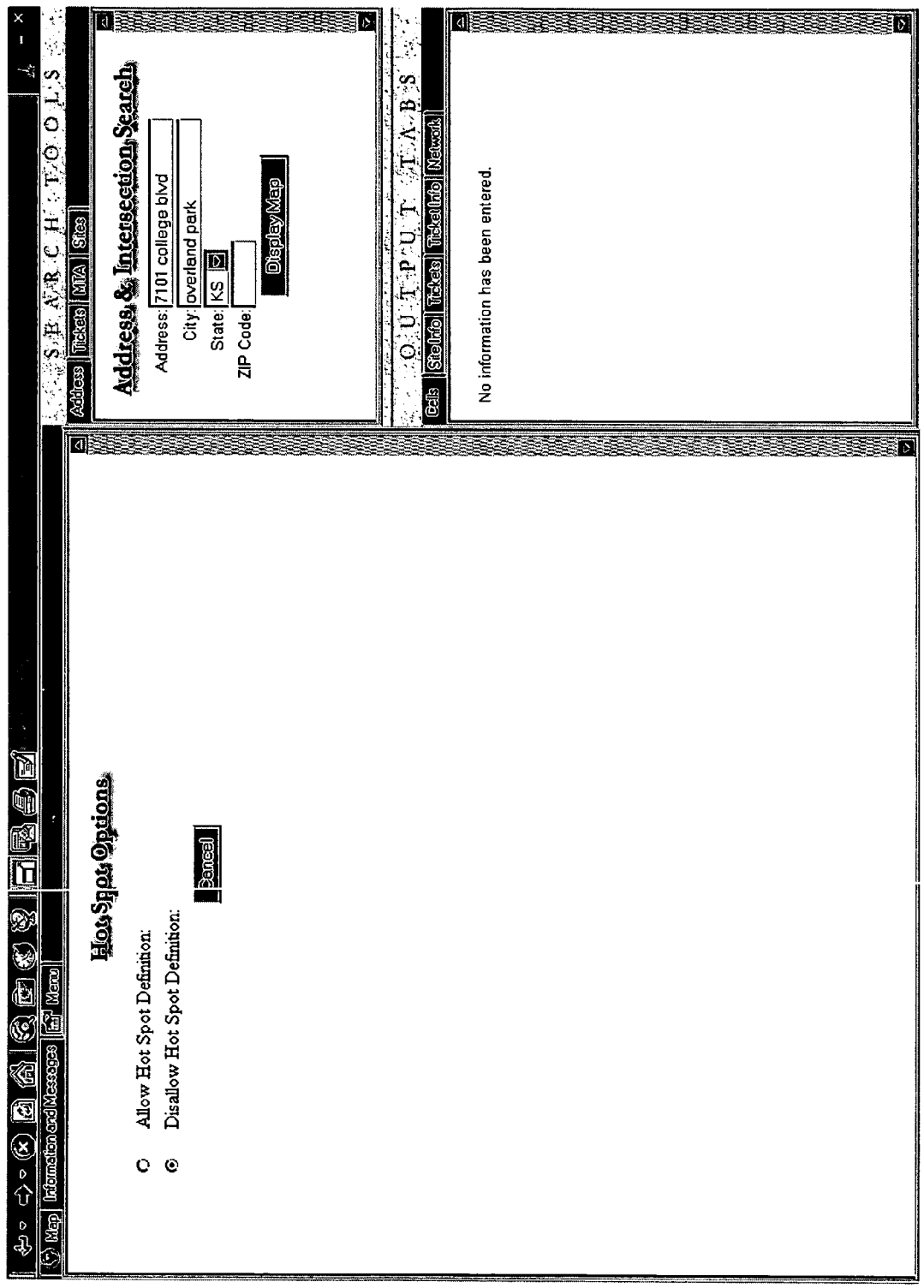
FIG. 33 is a screen view of a screen in accordance with an embodiment of the present invention.

FIG. 33 depicts an example of design control options. In this example, a user can be provided the ability to define trouble areas.

Figure 34:
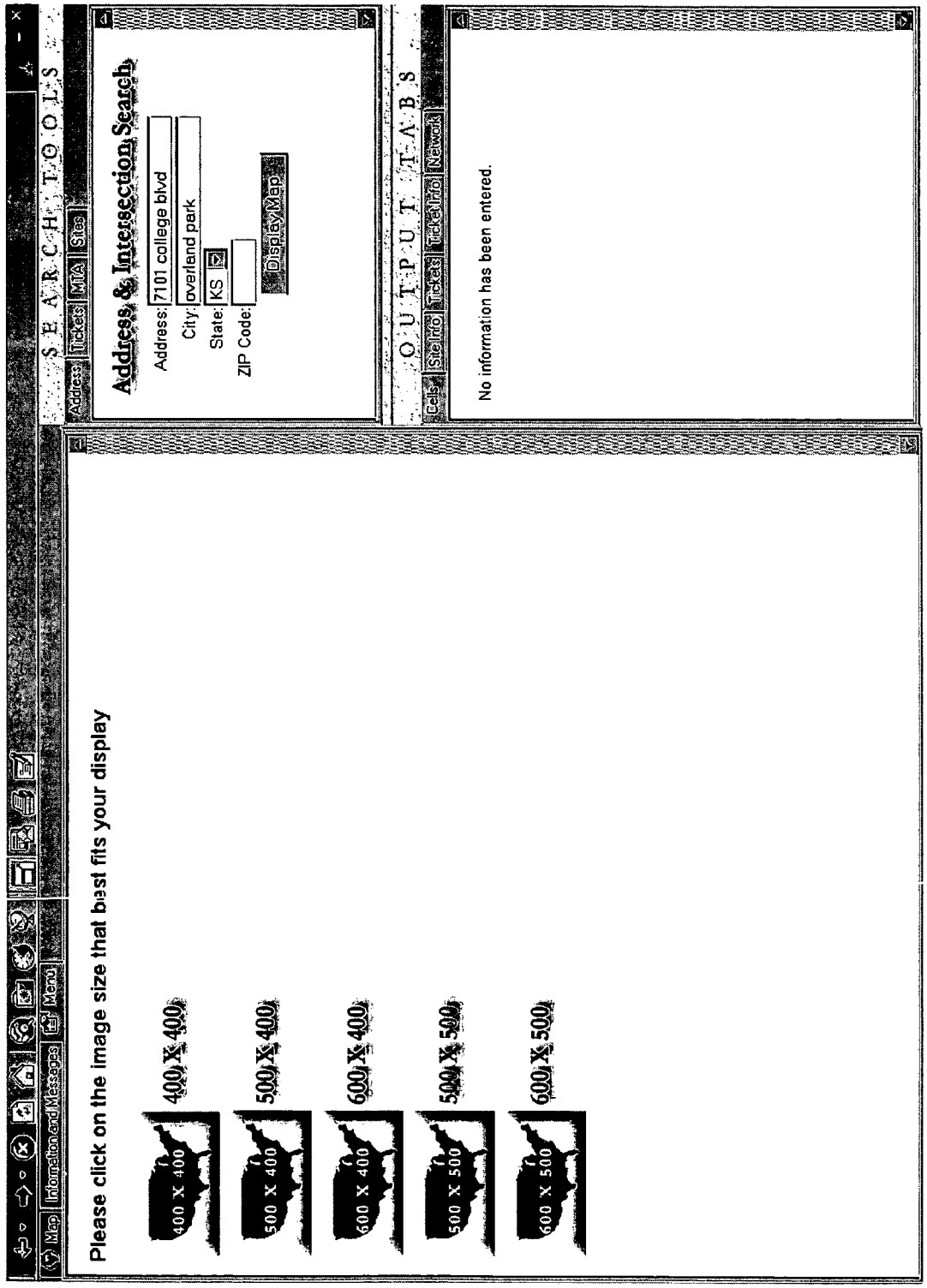
FIG. 34 is a screen view of a screen in accordance with an embodiment of the present invention.

FIG. 34 depicts an example of options for selecting a map size displayed to a user. A user can select one of the buttons to control the size of the map displayed.

Figure 35:
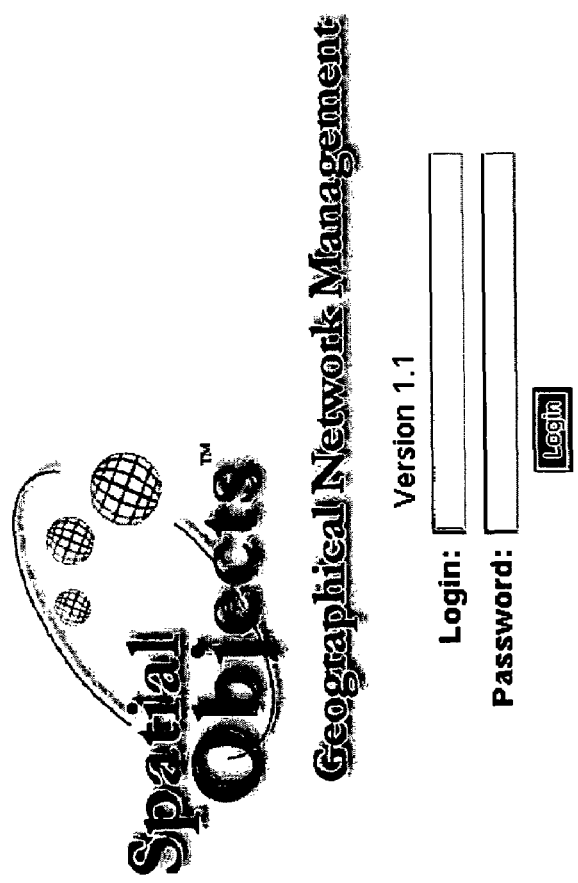
FIG. 35 is a screen view of a screen in accordance with an embodiment of the present invention.

FIG. 35 depicts an example of a login screen. The login screen requires a user to enter a valid login and a valid password for entry into the GMS. This provides a security measure so that only authorized personnel may use the system.

Figure 36:
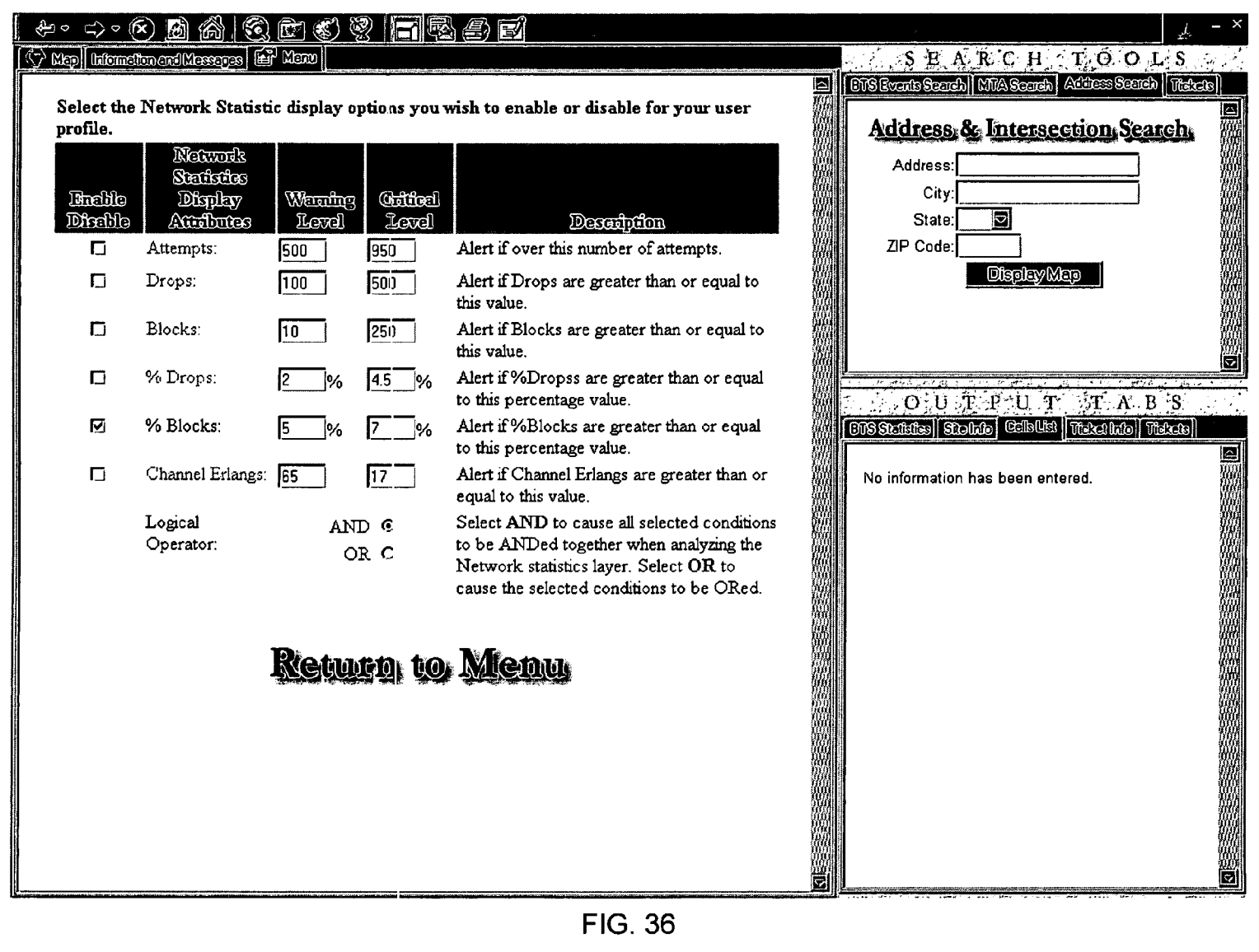

FIG. 36 depicts an example of a screen used for configuration of a performance layer. The screen is used to configure whether or not a performance element is displayed, for which network elements the corresponding performance element is displayed, which performance attributes will be used to determine if a performance element will be displayed and, if so, the performance characteristic of the performance element, and the performance levels that are defined for each performance characteristic. In this example, two performance levels are configured for each of the performance attributes. These include a warning level and a critical level. For example, a performance characteristic signifying a warning level will be displayed for a performance element if the number of dropped calls is greater than or equal to 100. Likewise, a performance characteristic signifying a critical level will be displayed for a performance element if the number of dropped calls is greater than or equal to 500.

In addition, the performance characteristics can be configured using a logical operator, such as "and" or "or". If the "and" logical operator is used, all selected performance attributes must reach at least the configured performance levels before the performance characteristics of the respective performance elements will be displayed. In this example, a performance characteristic signifying a warning level will be displayed for a performance element if the number of blocks is greater than or equal to 5%. In this example, only one performance attribute was selected. However, if other performance attributes are selected, such as blocks, percent drops, and percent blocks, then a performance characteristic signifying a warning level will be displayed for a performance element if the number of blocks is greater than or equal to 10, the percentage of drops is greater than or equal to 2, and the percentage of blocks is greater than or equal to 5.

In addition, the logical operator "or" can be used in the example of FIG. 36. When the "or" logical operator is used, the performance level of only one of the selected performance attributes need be met before the performance characteristic signifying the performance level is displayed for the performance element. For example, if the performance attributes of drops and blocks is enabled, then a performance characteristic signifying a warning level will be displayed for a performance element if either the number of drops is greater than or equal to 100 or the number of blocks is greater than or equal to 10.

Figure 37:
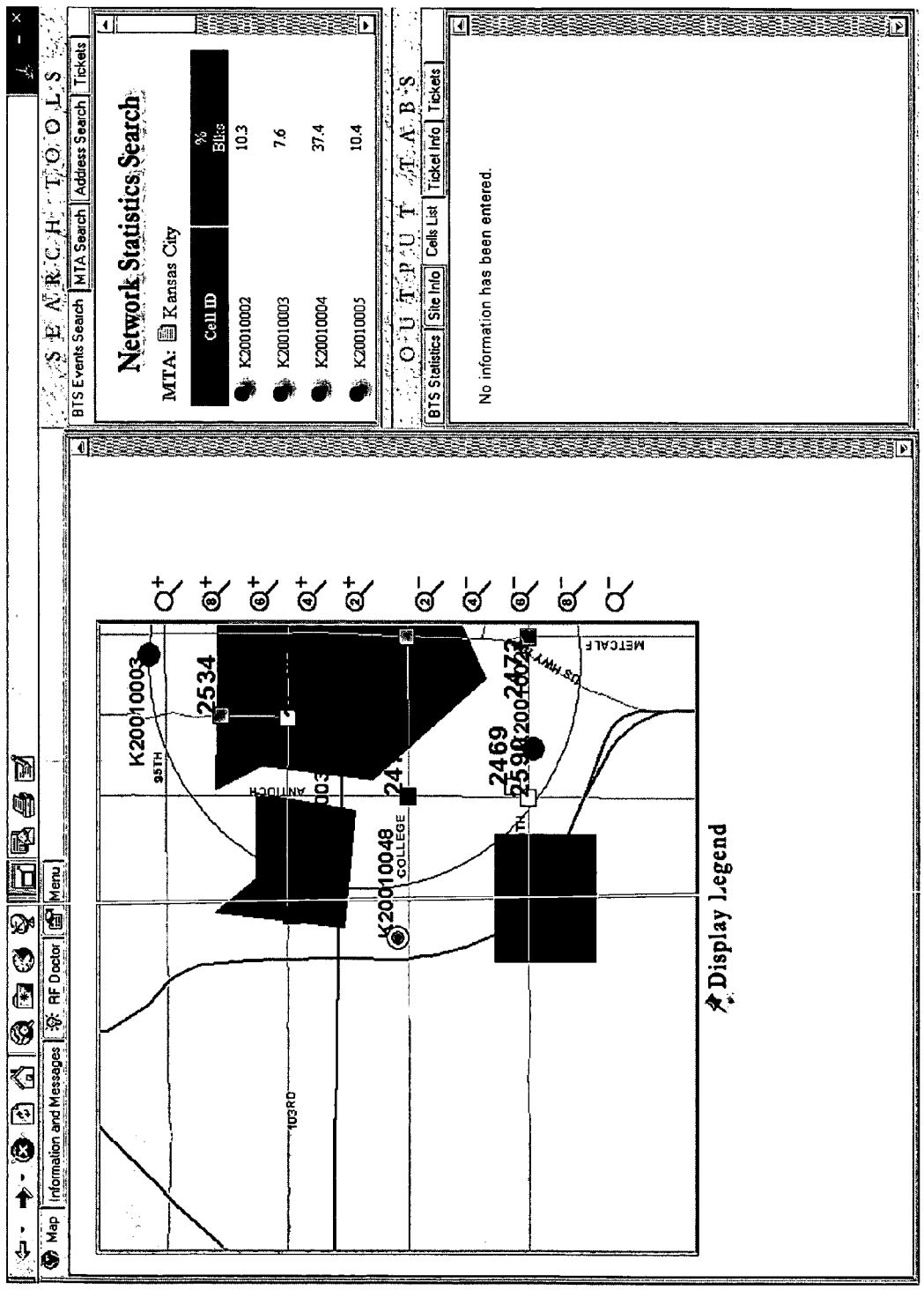
FIG. 37 is a screen view of a screen in accordance with an embodiment of the present invention.

FIG. 37 depicts an example of a screen having multiple display elements, including geographic elements, network elements having event characteristics, and performance elements having performance characteristics. In this example, cell sites are displayed as circles. Each of the circles are color coded (i.e. shaded in FIG. 37) with an event characteristic to signify an event level. For this configuration, red would indicate a current event, such as a failure or a degradation, yellow would indicate an event occurred within a prior configured amount of time, such as 72 hours, and green would represent a healthy network element that has no current or recent events. In this example of FIG. 37, different shades of gray are used in place of colors. Thus, the darkest gray is used in place of green, a lighter gray is used in place of red, and the lightest gray is used in place of yellow.

Each of the cells has a performance element with a performance characteristic that indicates a performance level. In this example, the performance elements for the cells are concentric circles located around each cell. The performance characteristic is configured as a color code to signify a performance level of one or more performance attributes. In this configuration, green would indicate no significant performance levels for a statistical attribute, yellow would signify a warning level for one or more performance attributes, and red would signify a critical level for one or more performance attributes. In this example of FIG. 37, different shades of gray are used in place of colors. Thus, the darkest gray is used in place of green, a lighter gray is used in place of red, and the lightest gray is used in place of yellow.

Figure 38:
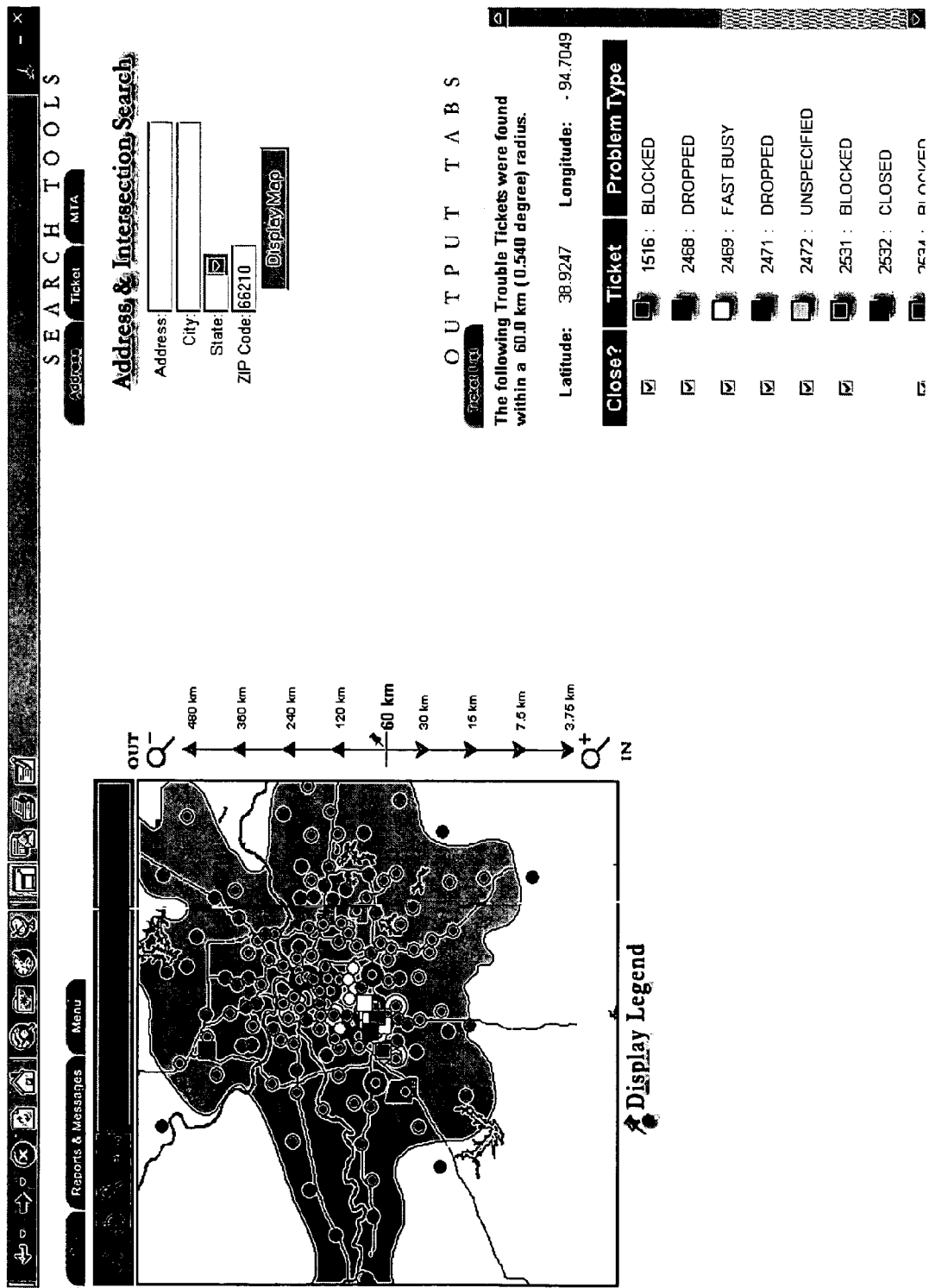
FIG. 38 is a screen view of a screen in accordance with an embodiment of the present invention.
Figure 39:
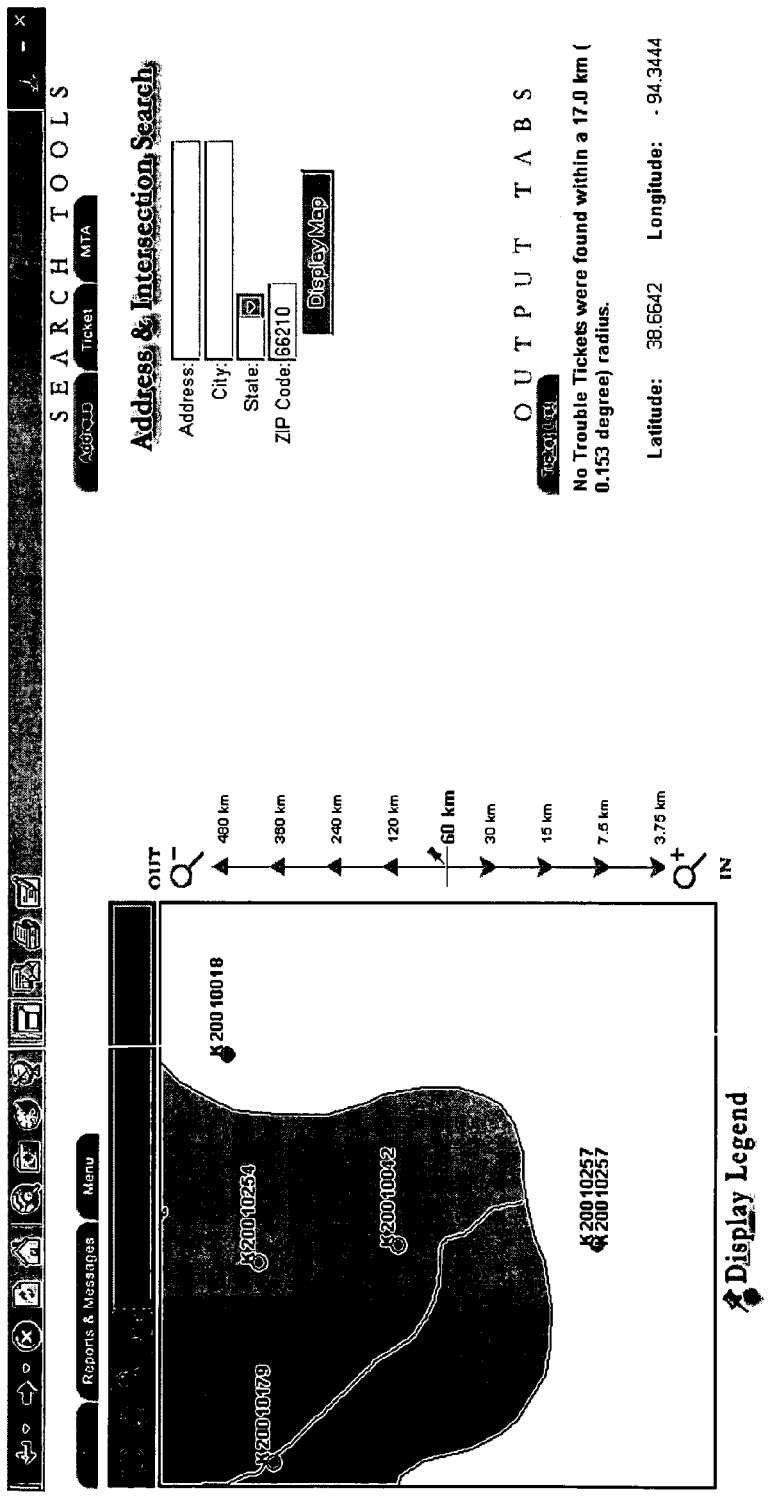

FIGS. 38 and 39 depict examples of levels of coverage for a service area. FIG. 38 depicts a multitude of cell sites and trouble tickets in the context of geographic elements, such as lakes and streams. Some of the cell sites have concentric circles as performance elements to signify the performance level of those cell sites. In this example, the cell sites and the performance elements are shaded to signify their corresponding event levels and performance levels. In addition, a coverage area is shaded on the display. In this example, a customer within the shaded area is within an area of service. A customer outside of the shaded area, i.e. the white area, is not within an area of service. The map area displays all network elements, performance elements, and geographic elements within a search range, such as 60.0 km. In the example of FIG. 39, a smaller search range of 17.0 km is specified. This smaller search area allows a user to view more detail of network elements, performance elements, and geographic elements surrounding an identified network element.

FIGS. 38 and 39 also illustrate additional examples of a legend, an STDE, an NDO, and navigation tools. The legend of FIGS. 38 and 39 allows a user to select a distance of a search range surrounding a selected network element for which a map will be generated. This example depicts search ranges in kilometers, including the ability to zoom in and to zoom out in selected ranges. However, other units of measurement may be used, such as radius, miles, ordinates, other metric units, and other non-metric units. In addition, different tabs are illustrated in the STDE and the MDO. Also, different tabs are identified for the navigation tools, and different icons or buttons are used for the design mode and the associated help for the design mode.

The GMS 104 may be configured with a time series viewer, a graph viewer, and/or a report viewer. The GMS 104 enables visualization of data historically by providing the ability to view maps of data as it was minutes, hours, days, weeks, months, years, or some other configurable period of time in the past. A point in time may be selected as well as the duration of time for depiction of the data. The time and duration associated with the data to be generated may be user defined.

The time series viewer generates data over a selectable period of time. The time series viewer generates time sequenced maps that depict a change in data over a series of time. The starting time and duration is selectable by a varying time granularity, including daily, weekly, monthly, yearly, or some other value for the time granularity.

The time series viewer may be used to analyze pockets of data as they occur over time, such as by identifying a pocket of cell traffic congestion as that congestion occurs over time. The time series viewer enables visualization of data geographically by adding a time dimension to the spatial and geographic dimensions. A user may selectively advance forward or reverse by a selectable value of time, including a minute, hour, day, week, month, year, or some other time granularity.

Preferably, the time series viewer generates for display a series of maps, similar to the way a media player generates data for viewing of streaming video. Preferably, each map in the series represents an illustration of performance elements having performance characteristics for performance attributes in a geographic region at a moment in time.

FIGS. 40-45B depict an exemplary embodiment of the data viewer. The data viewer 4002 of FIGS. 40-45 includes a map viewer, a visualizations setting map, a graph viewer, and a time series viewer. It will be appreciated that another data viewer may include one or more of the previously listed items. Thus, a data viewer may include only a time series viewer, only a map viewer, only a graph viewer, or any combination thereof.

Figure 40:
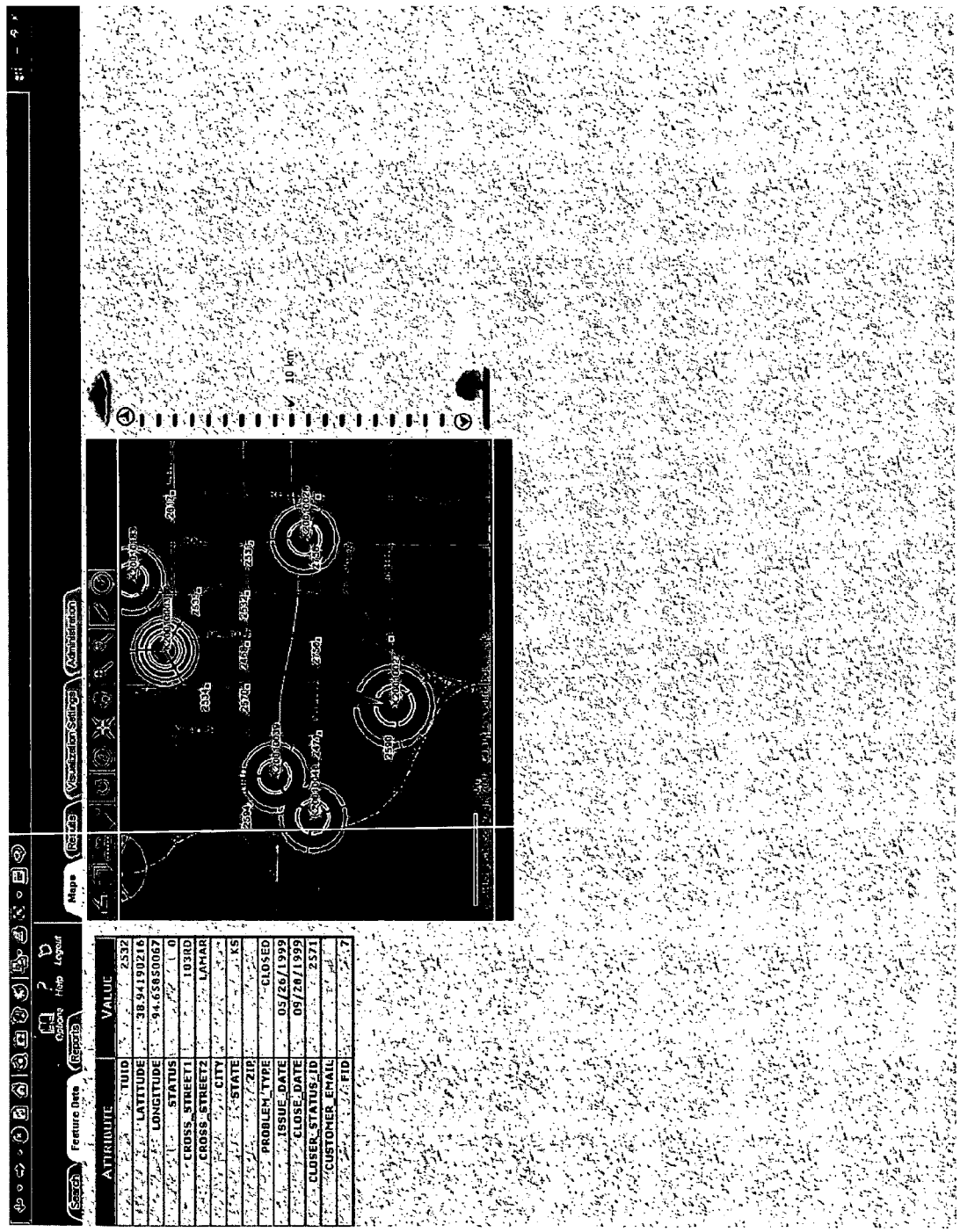
FIG. 40 is a screen view of a screen in accordance with an embodiment of the present invention.

FIG. 40 depicts an exemplary embodiment of a map viewer of a data viewer. The screen depicts sectored performance layers for multiple sectors for multiple cells. Each sectored performance element for each sector of each cell may be independently identified and may show a different performance characteristic, depending on its performance level and performance attribute.

The data viewer 4002 of FIG. 40 includes a map viewer 4004. The map viewer 4004 enables a user to view network elements in geographic relation to each other and to geographic elements. The network elements may include performance elements having performance characteristics, including sectored performance elements having sectored performance characteristics. The map viewer 4004 of FIG. 40 enables the user to select one or more network elements to generate feature data in a side frame 4006 on a portion of the generated screen. In an example of FIG. 40, a trouble ticket identified as trouble ticket 2532 was selected, thereby generating the detailed attributes of that trouble ticket for display in a side frame 4006. Similarly, any cell or other network element may be selected to display the detailed attributes for that network element.

The data viewer 4002 may include multiple tabs and/or menu selections to search or view data or to implement one of the components of the data viewer. For example, the data viewer 4002 may have a map viewer 4004, a side frame 4006, a data viewer selector tabs 4008, and a menu selector 4110.

The map viewer 4004 generates a map of a selected geographic region and network elements. The map viewer 4004 may zoom in or out a selectable level.

The side frame 4006 may depict a search area for entry of an address, an MTA, a BTA, or some other search area by selecting the search tab 4012. Further, the side frame 4006 may depict detailed attribute feature data of a selected network element by selecting the feature data tab 4012. The side frame 4006 further may be used to select and generate reports using the reports tab 4016.

The selector tabs 4008 may be used to generate a map of a search area, including geographic elements, network elements, and performance elements. The menu selector 4010 may include one or multiple buttons for function selections.

The search tab 4012 enables a user to enter criteria to generate a map or feature data. For example, the search tab 4012 may enable a user to search by an address, an MTA, or a BTA. Other search criteria may be used.

The feature data tab 4014, when selected, is loaded with feature data information when a map feature, such as a cell site, cell sector, or trouble ticket, is selected. If a network element is selected, the feature data tab 4014 is loaded with the network elements feature data and thumbnail performance graphs.

The reports tab 4016 enables a user to use the report tool. Upon selection of the reports tab 4016, a user may specify input for available reports.

The map tab 4018 enables a user to generate a map of a selected area. The map may include geographic elements, network elements, and performance elements.

The results tab 4020 generates detailed graphs and reports when the detailed graphs and reports are available. When the results tab 4020 is not being used to display a detailed report or a graph, it is empty.

The visualization settings tab 4022 enables a user to apply performance filters and rendering customizations. Performance filters are used to identify map features, such as a cell or a cell sector or another network element, that meet or exceed a filter threshold. The generated map thereby is reduced to include the network elements that pass the filter's constraints. Rendering customizations allow a user to customize how a performance element or performance characteristic is rendered on a map.

The administrative tab 4024 appears if a user has administrative privileges. The administrative tab 4024 enables a user to access existing administrative pages, such as a user management and a group management. A user management page enables an administrator to add or remove users and change a user's information. The group management page enables an administrator to add or remove user groups and to add or remove users to and from user groups.

The selector tabs 4008 may be used to generate a map of a search area, including geographic elements, network elements, and performance elements, by selecting the map tab 4018. A results tab 4020 may be used to display performance graphs and to select attributes to generate for performance graphs. A visualization settings tab 4022 may be used to select and set performance metrics of performance characteristics for performance elements. An administration tab 4024 may be used to generate user group and user management data. Other tabs may be included, and some of the tabs depicted in this embodiment may be excluded.

The menu selector 4010 may include one or multiple buttons for function selections. In the embodiment of FIG. 40, the menu selector 4010 includes a legend toggle 4026 to toggle the display of a map legend between visible and hidden. A layer selector button 4028 enables display of a layer selection pop-up dialog page that allows a user to select which performance layers shall be visible. A unit selector button 4030 enables selection of a unit of measure used for the map, such as miles, kilometers, meters, feet, or another unit of measure. A distance measurement button 4032 enables measurement of distance from one point to another. The unit measurement button 4033 is used by marking a point on the map and then moving to another point. The approximate distance between the two points is displayed in a status bar below the map.

A refresh button 4034 refreshes the map display. An identify mode button 4036 turns the identify mode on and off. A center button 4038 causes the map to be re-centered at a selected click point on the map when the center mode is engaged. A pan mode button 4040 enables the map to be panned by dragging the map in any direction. A zoom in button 4042 enables the map to be centered and zoomed-in at the same time while engaged. The zoom out button 4044 enables the map to be centered and zoomed-out at the same time while engaged. A feature creation tool 4046 will enable a user to create new features by drawing them on the map. The feature creation tool 4046 will allow creation of ellipses, rectangles, polygons, and other features. The time series viewer button 4048 enables generation of a time series view of the current map area.

The map viewer 4004 depicts cells having multiple sectored performance elements. For example, a first cell 4050 includes three sectors 4052-4056. Each sector 4052-4056 has four sectored performance elements. The center sector performance element, depicted by a circle having three sectors, depicts a first performance attribute characterized by a first performance characteristic. A second sectored performance element, depicted by a first concentric ring, depicts a second performance attribute characterized by a second sectored performance characteristic. A third sectored performance element, depicted by a second concentric ring, depicts a third performance attribute depicted by a third sectored performance characteristic. Additionally, a fourth sectored performance element, depicted by a third concentric ring, depicts a fourth performance attribute characterized by a fourth sectored performance characteristic.

In the example of FIG. 40, the sectored performance characteristics for the sectored performance elements are generated based upon selected performance levels for each sectored performance element. Thus, for example, the sectored performance element for the center circle may depict varying colors based upon normal, moderate, and excessive levels entered for a percent block and the corresponding color swatch for each sectored performance characteristic. The first concentric ring may generate varied colors depending on values entered for levels of a percent drop and the corresponding color swatch for each sectored performance characteristic. The second concentric ring may depict varied colors depending on values entered for levels of erlangs and the corresponding color swatch for each sectored performance characteristic.

The outer ring for the cell 4050 may depict a coverage area and may have a constant color for the sectored performance characteristic. However, the shape and dimensions of the outer concentric ring may vary depending on the actual value of the coverage area for that cell sector 4052-4056. Thus, the outer concentric ring may be greater for the first sector 4052 than for the third sector 4056, because the coverage areas for the sectors 4052 and 4056 may be different. Thus, the dimensions of the sectored performance elements may be different.

The map viewer 4004 generates data identifying other cells 4058-4068 for a selected geographic area. Each of the cells 4058-4068 have sectored performance elements for which sectored performance characteristics are generated, depending on identified performance levels of performance attributes for each sectored performance characteristic.

The cell 4062 similarly has three sectors 4070-4074. However, the first sector 4070 and the second sector 4072 do not overlap in this instance. In this example, the sectors 4070-4074 depict the actual beam width of each antenna for each sector. Thus, a gap in coverage for the beam widths of the antennas for the first and second sectors 4070 and 4072 exists.

Additionally, the cell 4068 only displays the performance layer identifying the coverage for the cell. Thus, performance layers may be selected and deselected based upon varying views and cell locations. In this instance, the performance layers for percent block, percent drop, and percent erlangs have been deselected and are not depicted. However, based upon the data, the performance layers may be added to one or more cells.

Figure 41:
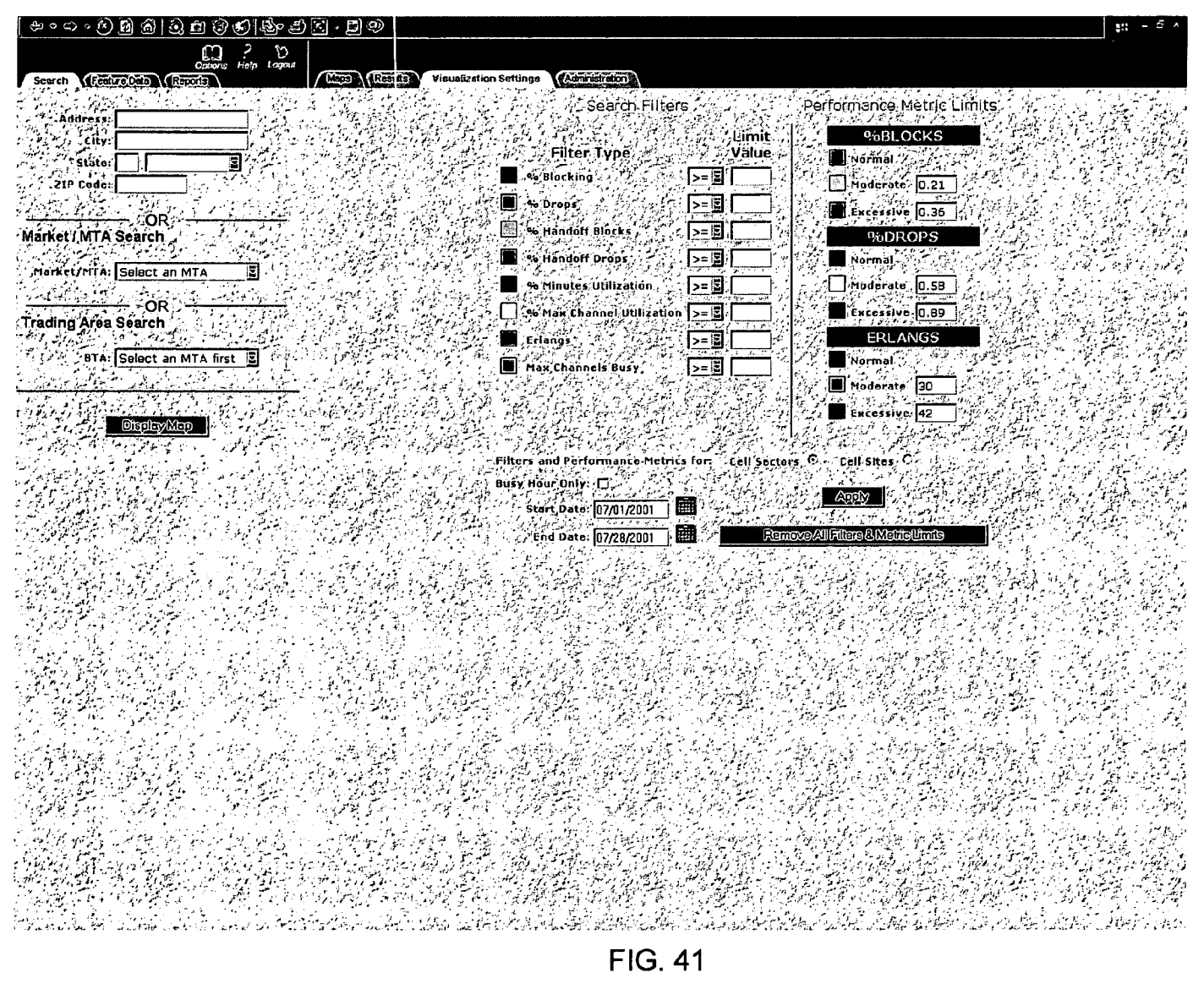

FIG. 41 depicts another example of a screen used for configuration of one or more performance layers. The configuration screen of FIG. 41 is used to configure whether or not one or more performance elements, including sectored performance elements, are displayed, for which network elements corresponding performance elements are displayed, which performance levels of which performance attributes will determine if a performance element will be displayed and, if so, the performance characteristic of the performance element, and the performance levels that are defined for each performance characteristic. In this example, search filters and performance metric limits are used to identify performance levels for performance attributes and associated performance characteristics. A search area may be selected for selected address, a market trading area (MTA), or a basic trading area (BTA).

The visualization settings selector 4104 enables the user to select multiple performance levels (i.e. performance metric limits or limit values for a filter) and associate a performance characteristic (i.e. a color from the color swatch) to be generated for a performance element based upon data attributes that may occur for the selected performance levels.

Additionally, a user may select whether the performance elements having performance characteristics are displayed for a cell site or whether sectored performance elements having sectored performance characteristics are displayed for cell sectors. In the example of FIG. 41, cell sectors are selected. Therefore, sectored performance elements having sectored performance characteristics will be displayed. The selectable options that enable a user to select whether metrics will be generated for a cell site or a cell sector are referred to as radio buttons.

Additionally, a user may identify a starting and ending date. Alternately, other configurations may include a start and end date and/or other selected time unit. A user may identify a time granularity, such as an hour, day, week, or other granularity.

In this example, performance metric limits are identified for percent blocks, percent drops, and erlangs. Each performance metric identifies a moderate and excessive level with a corresponding color to be generated as the performance characteristic if that performance level (i.e. performance metric limit) is met. If the performance level does not rise to the level identified for the moderate or excessive level, a default color will be generated for the performance characteristic for a normal level for each of the percent blocks, percent drops, and erlangs.

In other examples, a user may specify a limit value for a search filter metric. In the example of FIG. 41, a user may have identified a value for percent blocking, percent drops, percent handoff blocks, percent handoff drops, percent minutes utilization, percent max channel utilization, erlangs, and max channels busy. If the actual value of the data is greater than or equal to the limit value specified by the user, the corresponding color specified for that filter type will be generated as the performance characteristic of the performance element. It will be appreciated that other performance characteristics may be identified. For example, shades of gray, white, and black may be used to identify various performance levels. Alternately, other performance characteristics may be used, including cross-hatching, other fill types, and different shape configurations.

Search filters enable a user to select the type of visualization settings for the performance elements or sectored performance elements that will be generated having performance characteristics or sectored performance characteristics. With the search filters, a user may select the performance metric limits (i.e. performance levels) for the performance characteristics or sectored performance characteristics that will be generated for performance elements or sectored performance elements.

The limit value for the filter type typically is used when depicting a high level view of an MTA or a BTA. In the example of FIG. 20, a value of 0.21 is specified for the percent blocking and the corresponding color selected is white. Therefore, for cell sites having a percent blocking greater than or equal to 0.21, the performance characteristics will be generated as a white circle. Generally, the limit value for the search filters is used for a large geographic area. The performance metric limits for the search filters often is used for cell sectors or cell sites at a smaller geographic area for which a zoom and/or rubber band zoom may be selected.

Not only can the user select the starting and ending dates under the visualization settings, the user also may select the icon located to the right of the start date and the end date to generate a pop-up calendar used to select a date. The pop-up calendar enables a user to easily select a day, a month, and a year by selecting from a pull-down list or from a date shown for a calendar.

Colors may be selected for the color swatches to the left of the normal, moderate, and excessive values. The colors selected for the color swatches then will be generated as the performance characteristic for the performance elements on the map in this example.

Figure 42:
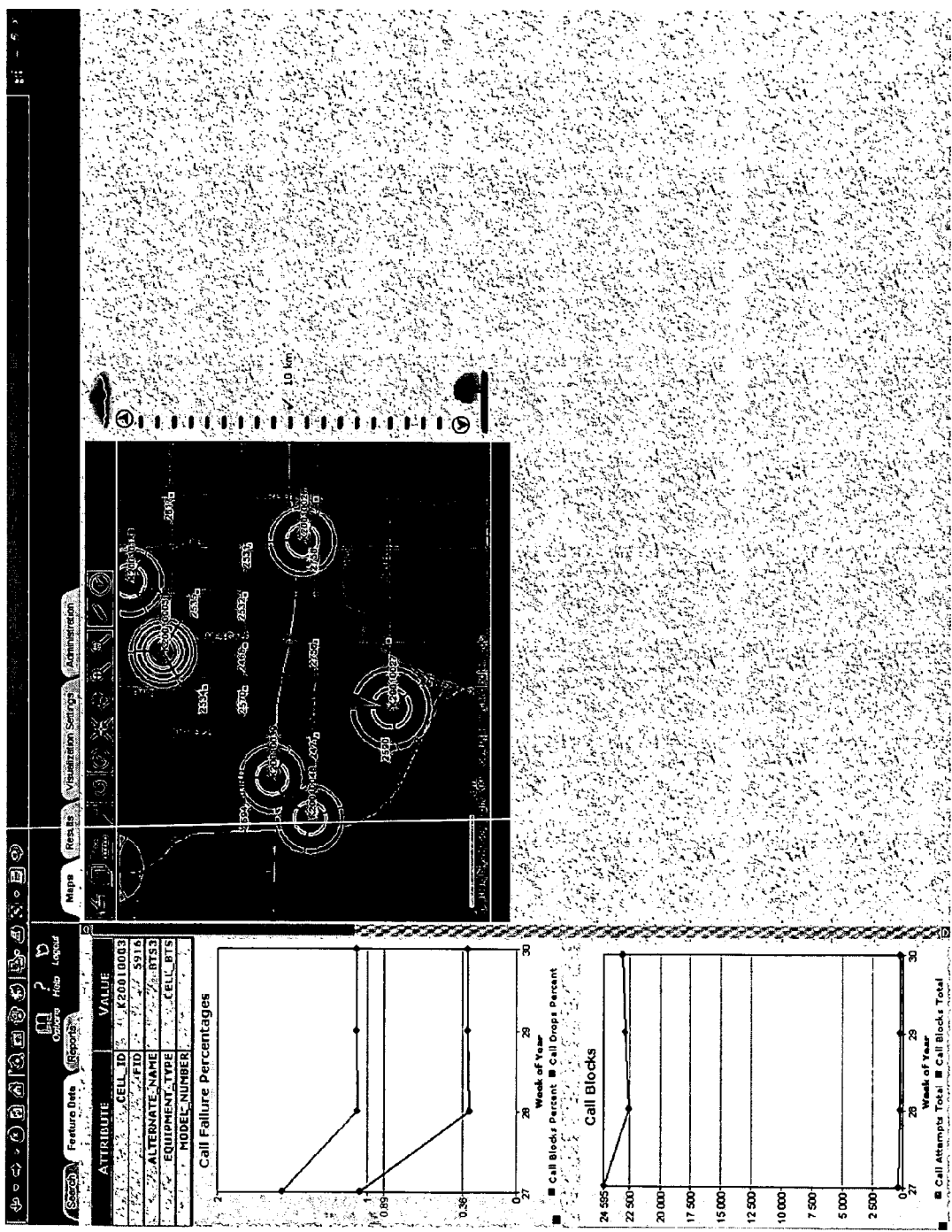
FIG. 42 is a screen view of a screen in accordance with an embodiment of the present invention.

FIG. 42 depicts an exemplary embodiment of a map viewer with cell attribute details and cell attribute graphs in the side frame 4006. The attribute data can be displayed in the feature data tab 4014 after clicking on a cell site.

Figure 43:
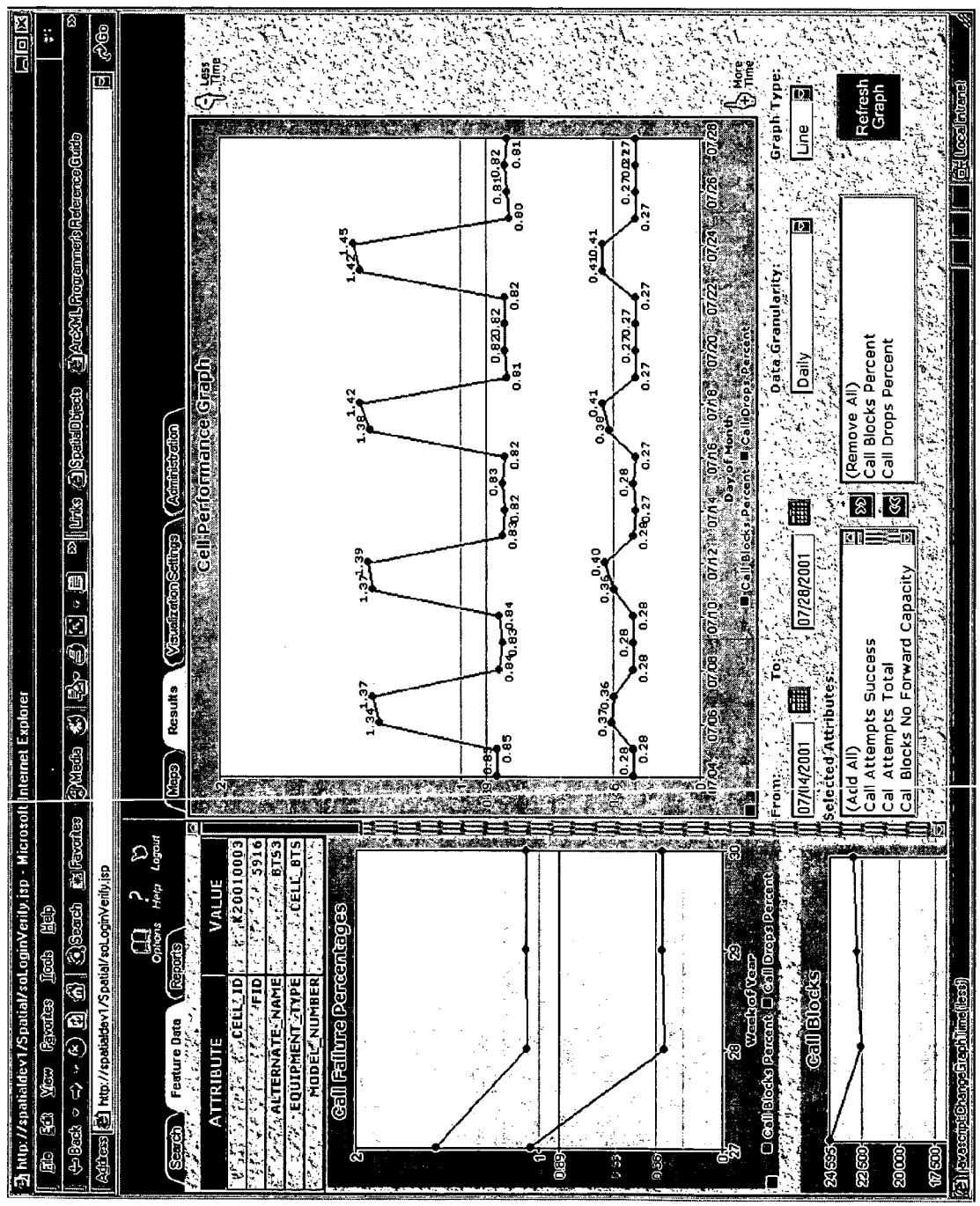
FIG. 43 is a screen view of a screen in accordance with an embodiment of the present invention.

FIG. 43 depicts an exemplary embodiment of a graph viewer. The graph viewer 4302 enables a user to graph attribute and attribute related data. The graph viewer 4302 may be used to select a set of feature attributes to be included on one or more graphs, to change a graph type, such as from line, bar, pie, etc., to increase or decrease the amount of time represented on the graph, and to change the time period represented on the graph. The graph viewer 4302 may be enabled by selecting at least one graph from the side frame 4006 or from selecting the results tab 4020.

The graph viewer enables a user to display individualized data for a specific sectored performance element, such as a specific sector on a cell. Alternately, the graph viewer 4302 may enable a user to select data for display for a whole performance element, such as a cell. Selecting a performance element or a sectored performance element causes the data attributes to be depicted in the side frame 4006 along with one or more graphs of the attribute data, specific to the performance element or the sectored performance element that was selected.

Selecting at least one graph depicted in the side frame 4006 causes the graph analysis tools for the graph viewer 4302 to be generated to the screen. Alternately, the results tab 4020 may be selected to generate the graph analysis tools to the main frame.

One or more data sets may be added to the graph. For example, percent blocks and percent drops may be located on one graph, such as in the example of FIG. 43. However, a single data set may be generated to the main frame for the detailed graph.

When more than one data set is generated to the detailed graph 4306, the scale on the vertical column automatically is adjusted to identify the appropriate scales for the range of data for the data sets.

The time frame represented by the horizontal axis may be adjusted to generate a time granularity for the detailed graph. A user may manually enter a starting (from) time, date, or other unit. Additionally, an ending (to) time, date, or other unit may be entered. Alternately, a user may select a time, date, or other granularity from the pop-up calendars that are generated from selecting the calendar icon to the right of the "from" and "to" fields. Further, the data granularity may be selected from a pull-down menu, including hourly, daily, weekly, monthly, yearly, or some other unit of granularity.

The selected unit of data granularity will cause the detailed graph 4306 to be generated starting with the "from" time or date, ending with the "to" time or date, and being generated in units identified by the data granularity. In the example of FIG. 43, the detailed graph 4306 is shown at starting on the fourth day of the month, ending on the twenty-eighth day of the month, and showing data in units of time per day.

Additionally, a graph type may be selected. The graph type may include a line graph, a bar graph, a three-dimensional bar graph, and other types of graphs.

A user may slide the detailed graph 4306 to the left or to the right by clicking and dragging the graph to the left or right. This moves the detailed graph backward or forward in time and enables a user to quickly analyze the data points that are before or after the displayed data points. Alternately, a user can select the less time icon 4320 or the more time icon 4322 located on the upper and lower right portions of the detailed graph 4306. Each time one of the two icons 4320 or 4322 is selected, a single time unit is removed or added to the detailed graph 4306. In the example of FIG. 43, the data granularity 4316 is selected as daily. Thus, if the less time icon 4320 or the more time icon 4322 is selected, the detailed graph will be decreased or increased by a granularity unit of one day.

Figure 44:
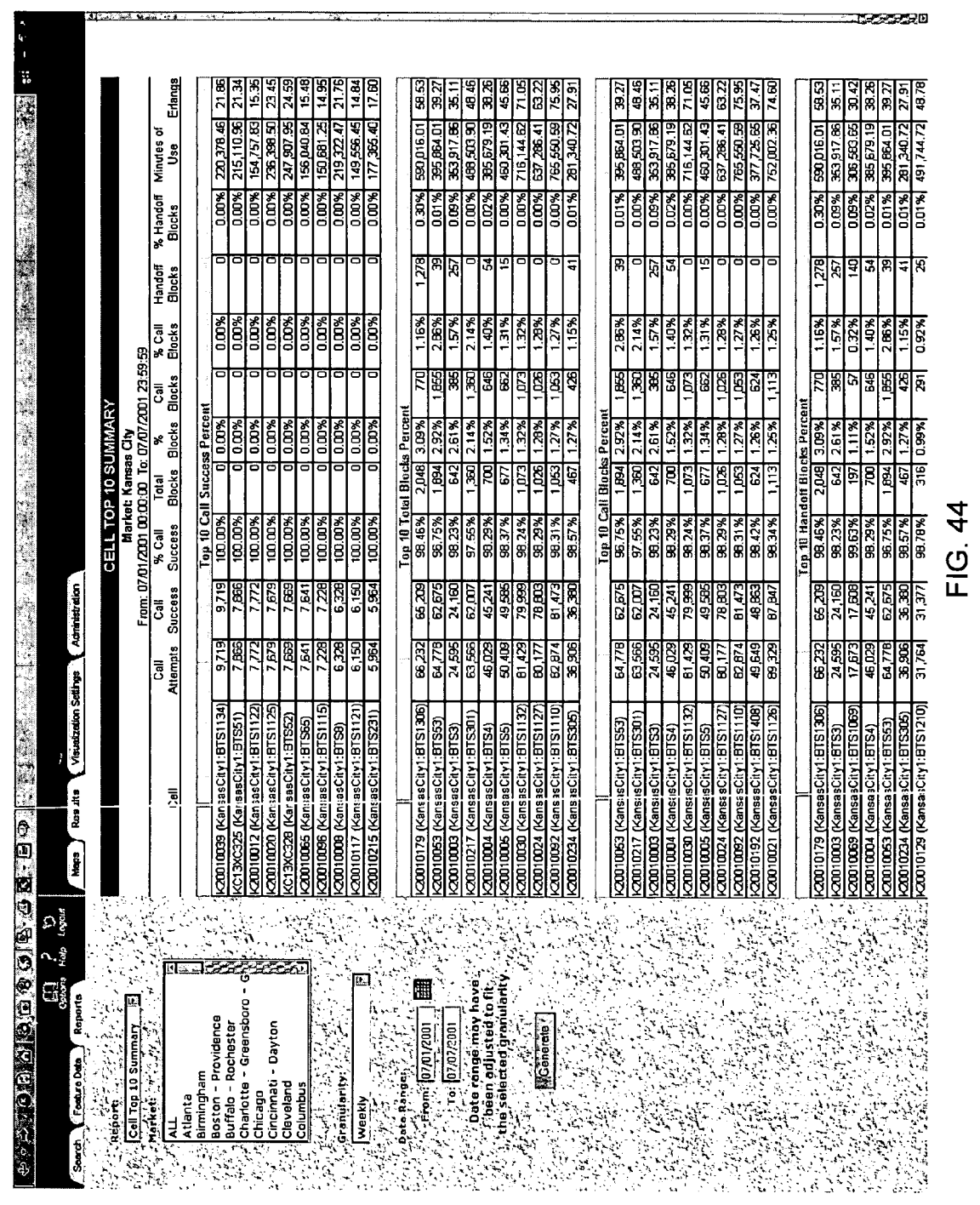

FIG. 44 depicts an exemplary embodiment of a report tool. The report tool 4402 provides detailed performance and attribute data for a network element, including a sectored performance element. The report tool 4402 may be accessed by selecting the reports tab 4016.

A report may be generated by first selecting the type of report from the report type tab 4404. The report type may include a top ten summary, a sector summary, or some other report type. The geographic area then may be selected from the market type selector 4406. For example, a user may select a city as the market type selector 4406. The granularity list 4408 includes a variety of time intervals, including daily, weekly, monthly, yearly, and other units of granularity. The date may be selected from the starting date range 4410 and the ending date range 4412. The date range may be entered manually or selected from the pop-up calendar by selecting the calendar icon 4414. Additionally, the report tool 4402 may be configured to automatically generate the ending date once the unit of granularity is selected from the granularity selector 4408. When the generate button 4416 is selected, the report will be generated in the report viewer 4418. Horizontal and vertical slider bars may be used to view data if the data is greater than the window of the report viewer 4418.

Figure 45A:
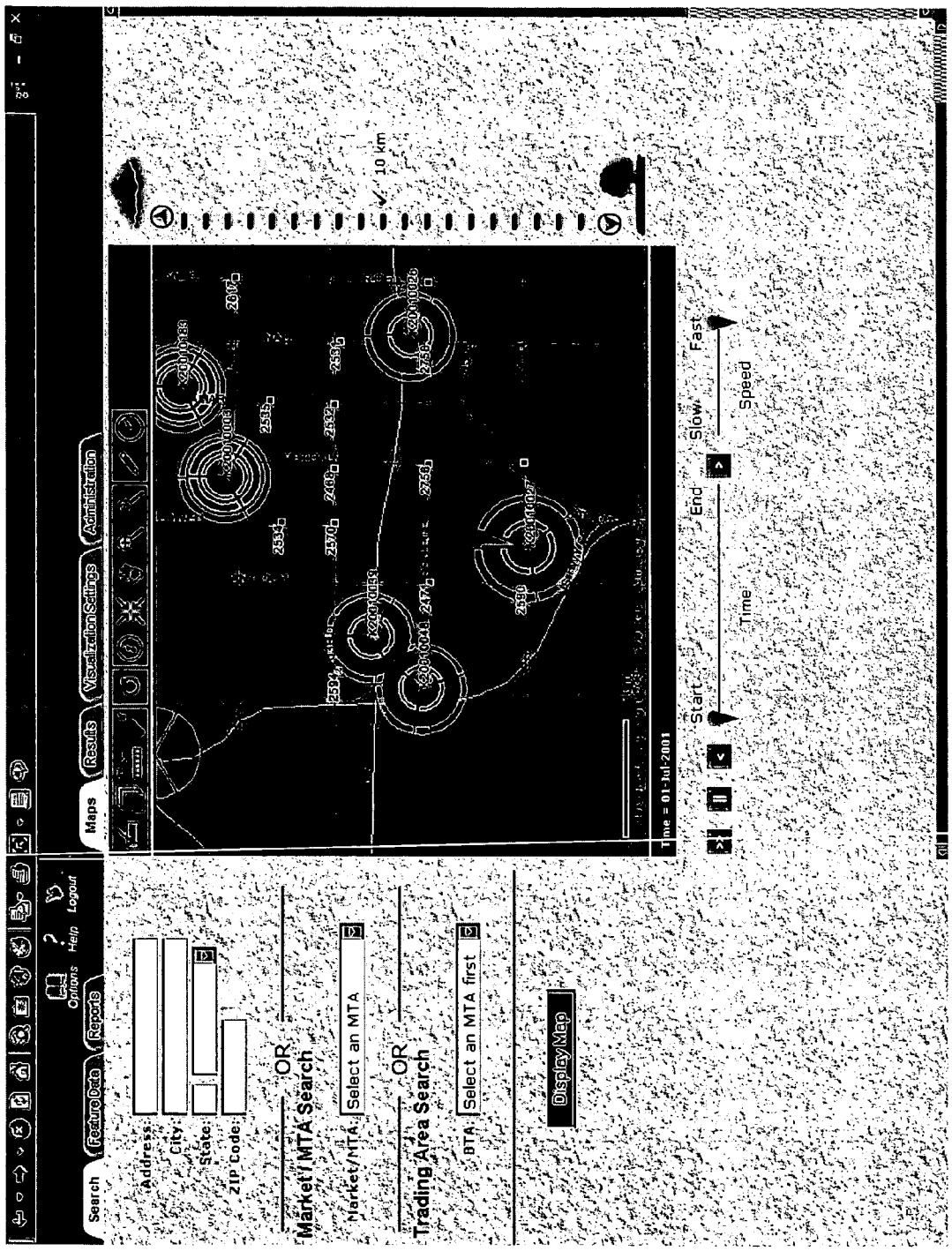
FIG. 45A is a screen view of a screen in accordance with an embodiment of the present invention.
Figure 45B:
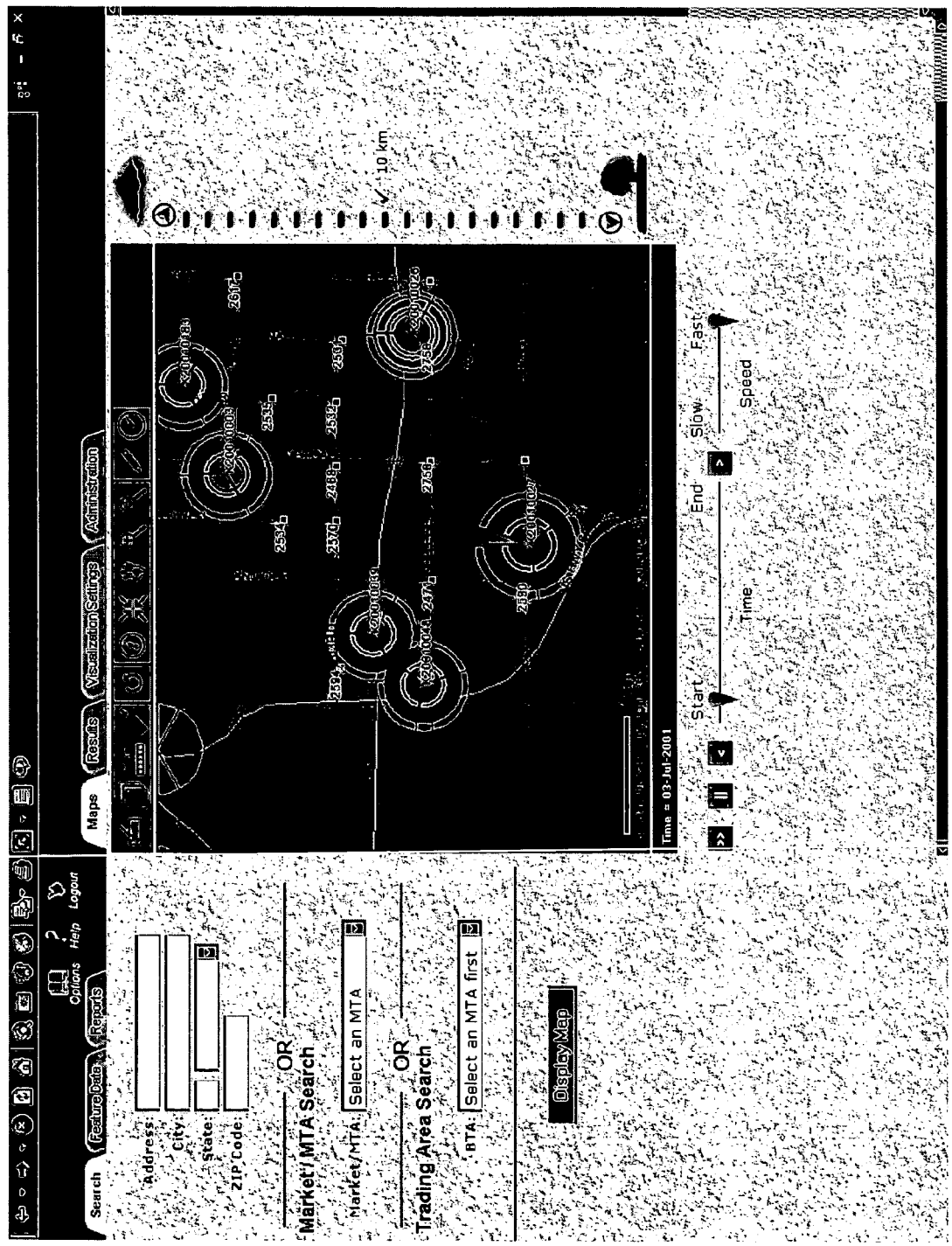
FIG. 45B is a screen view of a screen in accordance with an embodiment of the present invention.

FIG. 45A and FIG. 45B depict an exemplary embodiment of a time series viewer. The time series viewer 4502 displays a series of data over time. The time series viewer 4502 generates performance characteristics for performance elements, including sectored performance characteristics for sectored performance elements, based on selected performance levels for performance attributes. The time series viewer 4502 generates the performance characteristics and performance elements in geographic relation to other performance elements having other performance characteristics and in geographic relation to geographic elements. The time series viewer 4502 extends the ability to visualize data geographically by adding to spatial dimensions the time dimension.

The time series viewer 4502 may be enabled by selecting the time series viewer button 4048 on the menu selector 4010. Upon selecting the time series viewer button 4048, a pull-down menu enables a user to select a period of time for which data may be viewed, including daily, weekly, monthly, yearly, or some other time granularity. In the example of FIGS. 45A-45B, a monthly time granularity is selected.

The time series viewer 4502 includes time series controls, including a speed control slider 4504 and playback controls 4506. The speed control slider 4504 may be used to set the playback speed in a range between slow to fast. The playback controls 4506 may include a play button 4508, a pause button 4510, a reverse button 4512, and a forward button 4514. Further, the playback controls 4506 may include a playback slider 4516. Other time series controls, including other playback controls and sliders, may be included. Using the reverse and forward buttons 4512 and 4514, the maps can be advanced backward and forward one time unit at a time, including one day at a time. Also, the rubber band zoom may be used to enlarge an area of interest.

When the time series viewer 4502 plays back from a starting point forward in a period of time, the performance characteristics for the performance elements, including sectored performance characteristics for sectored performance elements, if any, may change depending on selected performance levels for selected performance attributes and actual data for the system. For example, FIG. 45A depicts data for a first day of a month, and FIG. 45B depicts data for a third day of the month. The sectored performance characteristics for the sectored performance elements for the cells 4050, 4058, 4060, and 4062 change between the data depicted in FIG. 45A and the data depicted in FIG. 45B. The performance characteristics, in this case the colors for the performance elements, change from day to day showing normal, moderate, and excessive usage for each cell from one day to the next.

The user may view the entire selected time granularity or use the playback controls to select a portion of the selected time. In the example in FIGS. 45A and 45B, the time for the data generated for the performance characteristics of the performance elements are depicted in the lower left corner of the map area 4518. Using the time series viewer 4502, pockets of cell traffic and congestion may be identified over time.

The data viewer may be used for multiple types of data and multiple types of networks. As used herein, the term "network" may identify one or more different types of geographic areas in which one or more types of data are to be depicted. For example, a network may include an oil or gas industry network configured to identify one or more oil wells. If circles and concentric rings are used to depict locations of oil wells and performance elements having performance characteristics for performance levels of performance attributes, an inner circle may identify a well or well classification, a first concentric ring may identify a monthly well production, and a second concentric ring may identify a well depth range. A color from a color swatch may be associated with each circle and concentric ring to identify performance characteristics.

For example, a well may be classified as a field extension well, a development well, or a wildcat well. A performance characteristic may be associated with each of the types of wells, including green for the field extension well, yellow for the development well, and red for the wildcat well. Alternately, a shade of gray, cross-hatching, or some other performance characteristic may be identified for the performance element Similarly, if a first concentric ring is used to identify monthly well production, green may be associated with production below ten billion cubic feet (BCF), yellow may be associated with production between ten and thirty BCF, and orange may be associated with production above 30 BCF. Similarly, cross-hatching, shades of gray, or some other performance characteristic may be used for a performance element.

Additionally, for a performance element identifying the well depth range, blue may be associated with well depth of between fifteen thousand and twenty-five thousand feet, green may be associated for well depth of between ten thousand and fifteen thousand feet, red may be associated with well depth between six thousand and ten thousand feet, and white may be associated with a well depth of between zero and six thousand feet.

In another example, performance elements may be applied to daily shipping costs versus daily profit versus daily customer volume at specified discount stores across the nation. Color coded concentric circles can enable a user to rapidly visually analyze historical data for a day, month, quarter, year, or some other unit of time. Filtering and rendering capabilities (i.e. the performance elements) can enable a user to pinpoint stores having high shipping costs but low profit or high customer volumes and low profit. Other examples exist.

The present system and method provide geographic map features with network elements and performance elements, including sectored performance elements, to represent different levels of attribute data associated with the various types of networks, including communication networks, oil/gas industry networks, store networks, and other types of networks. The multiple performance elements, in one case concentric circles, are unique in that performance characteristics, such as varied colors, are rendered dynamically from dynamically changing data, and the rendering data attributes (i.e. selected performance levels for selected attributes) can be selected dynamically by an end user. The dynamic rendering of data as feature attributes provides the ability to render a map of a geographic area representing feature data at any point in time that is available in a database. This enables the ability to view data from an hour, week, month, quarter, year, or some other time period. Moreover, because sectored performance elements may be used, and the sectored performance elements may be of any shape or designation, including stacked polygons, multiple data sets simultaneously may be viewed for a single network element or network element area.

Those skilled in the art will appreciate that variations from the specific embodiments disclosed above are contemplated by the invention. The invention should not be restricted to the above embodiments, but should be measured by the following claims.

What is claimed is:

1. A time series viewer encoded on a computer-readable medium:
   the time series viewer executable by a processor and configured to generate video comprising a series of time sequenced maps within a selectable time period for display, each time sequenced map comprising:
   at least one network element in relation to a geographic element; and at least one performance element corresponding to the at least one network element; wherein, a first one of the time sequenced maps comprises the performance element having a first performance characteristic for a performance attribute for a first point in time; and wherein, a second one of the time sequenced maps comprises the performance element having a second performance characteristic for the performance attribute for a second point in time.

2. The time series viewer of claim 1 wherein each time sequenced map further comprises a plurality of network elements and a plurality of performance elements, each corresponding to at least one of the plurality of network elements, each of the plurality of performance elements having a corresponding performance characteristic for a corresponding performance attribute for a specific point in time.

3. The time series viewer of claim 2 wherein:
   for the first one of the time sequenced maps, at least one of the plurality of performance elements has a first corresponding performance characteristic for a first corresponding performance attribute for the first point in time; and
   for the second one of the time sequenced maps, the at least one of the plurality of performance elements has a second corresponding performance characteristic for the first corresponding performance attribute for the second point in time.

4. The time series viewer of claim 1 wherein the at least one performance element comprises at least one sectored performance element having a first sectored performance characteristic for a sectored performance attribute for the first point in time and a second sectored performance characteristic for the sectored performance attribute at the second point in time.

5. A time series viewer encoded on a computer-readable medium, the time series viewer operable using a processor, wherein:
   the time series viewer is configured to generate video comprising a series of time sequenced maps for display to a user interface to depict a performance of a network over a selectable time period, each time sequenced map comprising:
   a plurality of geographic elements;
   a plurality of network elements in relation to the geographic elements; and
   a plurality of performance elements, each corresponding to at least one network element and each having a performance characteristic for a corresponding performance attribute;
   each time sequenced map corresponds to a specific point in time within the selectable time period; and
   each performance characteristic of each performance element generated for the time sequenced map at the specific point in time corresponds to the corresponding performance attribute at the specific point in time.

6. The time series viewer of claim 5 wherein at least one performance element comprises a sectored performance element having a sectored performance characteristic for a corresponding sectored performance attribute.

7. The time series viewer of claim 5 wherein the series of time sequenced maps are generated over the selectable period of time to depict a change in the performance characteristics for the plurality of performance elements for the network.

8. The time series viewer of claim 5 wherein a first performance characteristic is generated for a specific performance element for a first time sequenced map and a second performance characteristic is generated for the specific performance element for a second time sequenced map.

9. The time series viewer of claim 5 wherein a first performance element is generated for a specific network element for a first time sequenced map and a second performance element is generated for the specific network element for a second time sequenced map.

10. The time series viewer of claim 5 wherein a first performance element is generated for a first time sequenced map and a second performance element is generated for a second time sequenced map.

11. The time series viewer of claim 5 wherein the network comprises at least one member of a group consisting of a communication network, an oil network, a gas network, a store network, a packaging network, and another business network.

12. The time series viewer of claim 5 wherein a plurality of the plurality of performance elements correspond to at least one network element, each identifying a specific performance characteristic for a specific performance attribute associated with the at least one network element.

13. The time series viewer of claim 5 further comprising at least one control selected from a group consisting of a speed control slider configured to enable increasing and decreasing a speed at which the time sequenced maps are generated, a pause configured to enable pausing generation of the time sequenced maps, a stop configured to enable stopping generation of the time sequenced maps, a play configured to enable starting generation of the time sequenced maps, a forward configured to enable generation of the time sequenced maps at a forward point in time, a reverse configured to enable generation of the time sequenced maps at a reversed point in time, and another slider configured to enable generation of the time sequenced maps at a selected point in time.

14. The time series viewer of claim 5 further comprising a search criteria entry configured to receive a search criteria, wherein the time series viewer is configured to retrieve network data and geospatial data within a range of the search criteria and to generate each time sequenced map to depict the network data and the geospatial data in the range.

15. A method for viewing data over a time period using a processor comprising:
   generating video comprising a series of time sequenced maps to depict a performance of a network over a selectable time period, each time sequenced map comprising:
   a plurality of geographic elements;
   a plurality of network elements in relation to the geographic elements; and
   a plurality of performance elements, each corresponding to at least one network element and each having a performance characteristic for a corresponding performance attribute;
   wherein each time sequenced map corresponds to a specific point in time within the selectable time period; and
   wherein each performance characteristic of each performance element generated for the time sequenced map at the specific point in time corresponds to the corresponding performance attribute at the specific point in time.

16. The time series viewer of claim 15 further comprising a zoom selector configured to zoom into and out of the range.

17. The method of claim 15 wherein generating the plurality of performance elements each having a performance characteristic for a corresponding performance attribute comprises generating at least one sectored performance element having a sectored performance characteristic for a corresponding sectored performance attribute.

18. The method of claim 15 wherein generating the series of time sequenced maps further comprises depicting a change in the performance characteristics for the plurality of performance elements for the network.

19. The method of claim 15 further comprising generating a first performance characteristic for a specific performance element for a first time sequenced map and generating a second performance characteristic for the specific performance element for a second time sequenced map.

20. The method of claim 15 further comprising generating a first performance element for a specific network element for a first time sequenced map and generating a second performance element for the specific network element for a second time sequenced map.

21. The method of claim 15 further comprising generating a first performance element for a first time sequenced map and generating a second performance element for a second time sequenced map.

22. The method of claim 15 further comprising generating the series of time sequenced maps to depict the performance of the network wherein the network comprises at least one member of a group consisting of a communication network, an oil network, a gas network, a store network, a packaging network, and another business network.

23. The method of claim 15 further comprising generating a plurality of the plurality of performance elements to correspond to at least one of the network elements, each identifying a specific performance characteristic for a specific performance attribute associated with the at least one of the network elements.

24. The method of claim 15 further comprising enabling at least one control selected from a group consisting of a speed control slider configured to enable increasing and decreasing a speed at which the time sequenced maps are generated, a pause configured to enable pausing generation of the time sequenced maps, a stop configured to enable stopping generation of the time sequenced maps, a play configured to enable starting generation of the time sequenced maps, a forward configured to enable generation of the time sequenced maps at a forward point in time, a reverse configured to enable generation of the time sequenced maps at a reversed point in time, and another slider configured to enable generation of the time sequenced maps at a selected point in time.

25. The method of claim 15 further comprising:
enabling a search criteria entry configured to receive a search criteria;
retrieving network data and geospatial data within a range of the search criteria; and
generating each time sequenced map to depict the network data and the geospatial data in the range.

26. The method of claim 25 further comprising enabling a zoom selector configured to zoom into and out of the range.

27. A viewer operable using a at least one processor and configured to generate data for a period of time comprising:
a first component configured to manage data for a system; and
a second component configured to materialize a graphical interface and to generate for display for the graphical interface video comprising a series of time sequenced images for corresponding sequential points in time within a selectable period of time, each time sequenced image comprising at least one display element representative of the data for the system and at least one performance element for the display element, the at least one performance element having a performance characteristic for a performance attribute;
wherein the performance characteristic for each time sequenced image depicts a level of the performance attribute at the corresponding sequential point in time.

28. The viewer of claim 27 wherein the at least one performance element comprises at least one sectored performance element having a sectored performance characteristic for a corresponding sectored performance attribute.

29. The viewer of claim 27 wherein a first performance characteristic is generated for a specific performance element for a first time sequenced image and a second performance characteristic is generated for the specific performance element for a second time sequenced image.

30. The viewer of claim 27 wherein the system comprises at least one member of a group consisting of a communication system, an oil system, a gas system, a store system, a packaging system, and another business system.

31. The viewer of claim 27 further comprising at least one control selected from a group consisting of a speed control slider configured to enable increasing and decreasing a speed at which the time sequenced images are generated, a pause configured to enable pausing generation of the time sequenced images, a stop configured to enable stopping generation of the time sequenced images, a play configured to enable starting generation of the time sequenced images, a forward configured to enable generation of the time sequenced images at a forward point in time, a reverse configured to enable generation of the time sequenced images at a reversed point in time, and a slider configured to enable generation of the time sequenced images at a selected point in time.

32. A method for viewing data over a time period using a processor comprising:
materializing a graphical interface; and
sequentially generating for display for the graphical interface a series of time sequenced images as video, the series of time sequenced images corresponding to sequential points in time within a selectable period of time, each time sequenced image comprising at least one display element representative of data for a system and at least one performance element for the display element, the performance element having a performance characteristic for a performance attribute;
wherein the performance characteristic for each time sequenced image depicts a level of the performance attribute at the corresponding sequential point in time.

33. The method of claim 32 wherein generating the at least one performance element having the performance characteristic for the performance attribute comprises generating at least one sectored performance element having a sectored performance characteristic for a sectored performance attribute.

34. The method of claim 32 further comprising generating a first performance characteristic for a specific performance element for a first time sequenced image and generating a second performance characteristic for the specific performance element for a second time sequenced image.

35. The method of claim 32 wherein generating the series of time sequenced images, each time sequenced image comprising the at least one display element representative of data for the system comprises generating the at least one display element representative of data for at least one member of a group consisting of a communication system, an oil system, a gas system, a store system, a packaging system, and another business system.

36. The method of claim 32 further comprising enabling at least one control selected from a group consisting of a speed control slider configured to enable increasing and decreasing a speed at which the time sequenced images are generated, a pause configured to enable pausing generation of the time sequenced images, a stop configured to enable stopping generation of the time sequenced images, a play configured to enable starting generation of the time sequenced images, a forward configured to enable generation of the time sequenced images at a forward point in time, a reverse configured to enable generation of the time sequenced images at a reversed point in time, and a slider configured to enable generation of the time sequenced images at a selected point in time.

37. The method of claim 32 further comprising:
enabling a search criteria entry configured to receive a search criteria;
retrieving system data and geospatial data within a range of the search criteria; and
generating each time sequenced image to depict the system data and the geospatial data in the range.

38. A system for managing a network using a processor comprising:
a database component configured to manage network data;
a geocoding component configured to receive a search criteria, to geocode the search criteria, and to obtain from the database component network data within a range of the geocode; and
a communication component configured to receive the search criteria, to communicate search criteria data with the geocoding component, to receive the network data from the geocoding component, and to generate the network data for display to depict video comprising a series of time sequenced images, each time sequenced image corresponding to a point in time and comprising at least one network element and at least one performance element corresponding to the at least one network element, each time sequenced image depicting a performance characteristic for the at least one performance element, the performance characteristic representative of a level of a performance attribute associated with the network element at the corresponding point in time.

39. The system of claim 38 wherein the at least one performance element comprises at least one sectored performance element having a sectored performance characteristic for a corresponding sectored performance attribute.

40. The system of claim 38 wherein a first performance characteristic is generated for a specific performance element for a first time sequenced image and a second performance characteristic is generated for the specific performance element for a second time sequenced image.

41. The system of claim 38 wherein the network comprises at least one member of a group consisting of a communication network, an oil network, a gas network, a store network, a packaging network, and another business network.

42. The system of claim 38 further comprising at least one control selected from a group consisting of a speed control slider configured to enable increasing and decreasing a speed at which the time sequenced images are generated, a pause configured to enable pausing generation of the time sequenced images, a stop configured to enable stopping generation of the time sequenced images, a play configured to enable starting generation of the time sequenced images, a forward configured to enable generation of the time sequenced images at a forward point in time, a reverse configured to enable generation of the time sequenced images at a reversed point in time, and another slider configured to enable generation of the time sequenced images at a selected point in time.

43. A method for viewing data over a time period using a processor comprising:
receiving a search criteria;
determining a geocode for the search criteria;
obtaining network data within a range of the geocode for a plurality of points in time within a selectable period of time;
generating the network data for display as video to depict a series of time sequenced images, each time sequenced image corresponding to a point in time and comprising at least one network element and at least one performance element corresponding to the at least one network element, each time sequenced image depicting a performance characteristic for the at least one performance element, the performance characteristic representative of a level of a performance attribute associated with the network element at the corresponding point in time.

44. The method of claim 43 wherein generating the at least one performance element comprises generating at least one sectored performance element having a sectored performance characteristic for a corresponding sectored performance attribute.

45. The method of claim 43 further comprising generating a first performance characteristic for a specific performance element for a first time sequenced image and generating a second performance characteristic for the specific performance element for a second time sequenced image.

46. The method of claim 43 further generating the network data for display to depict the series of time sequenced images wherein the network comprises at least one member of a group consisting of a communication network, an oil network, a gas network, a store network, a packaging network, and another business network.

47. The method of claim 43 further comprising enabling at least one control selected from a group consisting of a speed control slider configured to enable increasing and decreasing a speed at which the time sequenced images are generated, a pause configured to enable pausing generation of the time sequenced images, a stop configured to enable stopping generation of the time sequenced images, a play configured to enable starting generation of the time sequenced images, a forward configured to enable generation of the time sequenced images at a forward point in time, a reverse configured to enable generation of the time sequenced images at a reversed point in time, and a slider configured to enable generation of the time sequenced images at a selected point in time.

48. A system for viewing data over a time period, the system comprising:
a computer-readable medium comprising a time series viewer executable by a processor to generate video comprising a series of time sequenced images for display, each time sequenced image corresponding to a point in time within the time period, each time sequenced image comprising:
at least one display element representative of business data; and
at least one performance element corresponding to the at least one display element and having a performance characteristic for a performance attribute;

wherein the performance characteristic of the at least one performance element is generated for a specific time sequenced image for a specific point in time and corresponds to a level of the performance attribute at the specific point in time.

49. A method for viewing data over a time period using a processor comprising:
    generating a first image for video, the first image sequenced for a first point in time within a selected time period, the first image comprising:
        at least one display element representative of business data; and
        at least one performance element corresponding to the at least one display element and having a first performance characteristic for a performance attribute, the first performance characteristic corresponding to the performance attribute at the first point in time; and
    generating a second image for the video, the second image sequenced for a second point in time within the selected time period, the second image comprising:
        the at least one display element; and
        the at least one performance element corresponding to the at least one display element and having a second performance characteristic for the performance attribute, the second performance characteristic corresponding to the performance attribute at the second point in time.

50. A time series viewer:
    the time series viewer operable using a processor and configured to generate video for display, the video comprising a plurality of time sequenced maps within a selectable time period, each time sequenced map comprising:
        at least one geographic element; at least one network element in relation to the geographic element; and at least one performance element corresponding to the at least one network element; wherein, a first one of the time sequenced maps comprises the performance element having a first performance characteristic for a performance attribute for a first point in time; and wherein, a second one of the time sequenced maps comprises the performance element having a second performance characteristic for the performance attribute for a second point in time.

51. A time series viewer operable using a processor, wherein:
    the time series viewer is configured to generate video comprising a plurality of time sequenced maps for display to a user interface to depict a performance of a network over a selectable time period, each time sequenced map comprising:
        a plurality of geographic elements;
        a plurality of network elements in relation to the geographic elements; and
        a plurality of performance elements, each corresponding to at least one network element and each having a performance characteristic for a corresponding performance attribute;
    each time sequenced map corresponds to a specific point in time within the selectable time period; and
    each performance characteristic of each performance element generated for the time sequenced map at the specific point in time corresponds to the corresponding performance attribute at the specific point in time.

* * * * *